(12) United States Patent
Steven et al.

(10) Patent No.: US 9,159,108 B2
(45) Date of Patent: Oct. 13, 2015

(54) FACILITATING REVENUE GENERATION FROM WHOLESALE ELECTRICITY MARKETS

(71) Applicant: Viridity Energy, Inc., Philadelphia, PA (US)

(72) Inventors: Alain P. Steven, Lansdale, PA (US); Duncan K. DeVore, Perkiomenville, PA (US)

(73) Assignee: VIRIDITY ENERGY, INC., Philadelphia, PA (US)

(*) Notice: Subject to any disclaimer, the term of this patent is extended or adjusted under 35 U.S.C. 154(b) by 274 days.

(21) Appl. No.: 13/666,898

(22) Filed: Nov. 1, 2012

(65) Prior Publication Data

US 2014/0039709 A1 Feb. 6, 2014

Related U.S. Application Data

(63) Continuation-in-part of application No. 13/451,497, filed on Apr. 19, 2012, now Pat. No. 8,892,264, and a continuation-in-part of application No. 12/850,918, filed on Aug. 5, 2010, now Pat. No. 8,457,802.

(Continued)

(51) Int. Cl.
*G06F 19/00* (2011.01)
*G06Q 50/06* (2012.01)
(Continued)

(52) U.S. Cl.
CPC ............... *G06Q 50/06* (2013.01); *G06Q 10/06* (2013.01); *H02J 3/008* (2013.01); *H02J 3/28* (2013.01);
(Continued)

(58) Field of Classification Search
CPC ......... G06Q 10/06; G06Q 50/06; H02J 3/008; H02J 3/0006; H02J 3/0062; H02J 13/006; H02J 2003/007; Y02B 70/3216; Y02B 20/221; Y02B 40/22; Y02B 10/54; G05B 15/02; G05B 2219/2642
USPC ..................... 700/291, 295; 703/18
See application file for complete search history.

(56) References Cited

U.S. PATENT DOCUMENTS 5,544,036 A 8/1996 Brown et al.
5,566,084 A 10/1996 Cmar
(Continued)

FOREIGN PATENT DOCUMENTS

EP 0791280 A1 8/1997
WO WO-2011/100736 A2 8/2011
(Continued)

OTHER PUBLICATIONS

Albadi et al., "Demand Response in Electricity Markets: An Overview", IEEE Power Engineering Society General Meeting, 2007 (5 pages).

(Continued)

*Primary Examiner* — Michael D Masinick
(74) *Attorney, Agent, or Firm* — McCarter & English, LLP

(57) ABSTRACT

The apparatus, systems and methods herein facilitate generation of energy-related revenue for an energy customer of an electricity supplier. The apparatuses and methods herein can be used to generate operating schedules for a controller of the energy assets. When implemented, the generated operating schedules facilitates derivation of the energy-related revenue, over a time period T, associated with operation of the energy assets according to the generated operating schedule. The energy-related revenue available to the energy customer over the time period T is based at least in part on a wholesale electricity market.

20 Claims, 17 Drawing Sheets

Related U.S. Application Data

(60) Provisional application No. 61/554,390, filed on Nov. 1, 2011, provisional application No. 61/477,067, filed on Apr. 19, 2011, provisional application No. 61/552,982, filed on Oct. 28, 2011, provisional application No. 61/279,589, filed on Oct. 23, 2009.

(51) Int. Cl.
  *G06Q 10/06* (2012.01)
  *H02J 3/00* (2006.01)
  *H02J 3/28* (2006.01)
  *H02J 13/00* (2006.01)

(52) U.S. Cl.
  CPC ......... *H02J 13/0006* (2013.01); *H02J 13/0062* (2013.01); *H02J 13/0075* (2013.01); *H02J 13/0079* (2013.01); *H02J 2003/007* (2013.01); *Y02B 70/3216* (2013.01); *Y02E 60/722* (2013.01); *Y02E 60/76* (2013.01); *Y02E 60/7838* (2013.01); *Y02E 60/7853* (2013.01); *Y04S 10/14* (2013.01); *Y04S 10/54* (2013.01); *Y04S 20/221* (2013.01); *Y04S 40/124* (2013.01); *Y04S 40/126* (2013.01); *Y04S 40/22* (2013.01); *Y04S 50/10* (2013.01)

(56) References Cited

U.S. PATENT DOCUMENTS

| | | |
|---|---|---|
| 5,794,172 A | 8/1998 | Matheson et al. |
| 6,076,964 A | 6/2000 | Wu et al. |
| 6,178,362 B1 | 1/2001 | Woolard et al. |
| 6,211,782 B1 | 4/2001 | Sandelman et al. |
| 6,681,155 B1 | 1/2004 | Fujita et al. |
| 6,757,591 B2 | 6/2004 | Kramer |
| 6,885,915 B2 | 4/2005 | Rehtanz et al. |
| 6,996,728 B2 | 2/2006 | Singh |
| 7,088,014 B2 | 8/2006 | Nierlich et al. |
| 7,130,719 B2 | 10/2006 | Ehlers et al. |
| 7,135,956 B2 | 11/2006 | Bartone et al. |
| 7,162,878 B2 | 1/2007 | Narayanamurthy et al. |
| 7,206,670 B2 | 4/2007 | Pimputkar et al. |
| 7,209,838 B1 | 4/2007 | Wright et al. |
| 7,222,494 B2 | 5/2007 | Peterson et al. |
| 7,274,975 B2 | 9/2007 | Miller |
| 7,315,769 B2 | 1/2008 | Balan et al. |
| 7,379,997 B2 | 5/2008 | Ehlers et al. |
| 7,393,603 B1 | 7/2008 | Schumer et al. |
| 7,474,995 B2 | 1/2009 | Masiello et al. |
| 7,489,990 B2 | 2/2009 | Fehr et al. |
| 7,529,705 B1 | 5/2009 | Bartels et al. |
| 7,580,817 B2 | 8/2009 | Bing |
| 7,620,482 B2 | 11/2009 | El-Gasseir et al. |
| 7,663,502 B2 | 2/2010 | Breed |
| 7,742,830 B1 | 6/2010 | Botes |
| 7,783,390 B2 | 8/2010 | Miller |
| 7,827,813 B2 | 11/2010 | Seem |
| 7,834,479 B2 | 11/2010 | Capp et al. |
| 7,843,184 B2 | 11/2010 | Wu et al. |
| 7,854,129 B2 | 12/2010 | Narayanamurthy |
| 7,873,442 B2 | 1/2011 | Tsui |
| 7,949,615 B2 | 5/2011 | Ehlers et al. |
| 7,957,845 B2 | 6/2011 | Chen |
| 7,967,754 B2 | 6/2011 | Knight |
| 7,970,482 B2 | 6/2011 | Srinivasan et al. |
| 7,991,513 B2 | 8/2011 | Pitt |
| 8,000,938 B2 | 8/2011 | McConnell et al. |
| 8,019,697 B2 | 9/2011 | Ozog |
| 8,024,073 B2 | 9/2011 | Imes et al. |
| 8,078,330 B2 | 12/2011 | Brickfield et al. |
| 8,090,476 B2 | 1/2012 | Dawson et al. |
| 8,126,685 B2 | 2/2012 | Nasle |
| 8,140,193 B2 | 3/2012 | Lee |
| 8,180,494 B2 | 5/2012 | Dawson et al. |
| 8,234,876 B2 | 8/2012 | Parsonnet et al. |
| 8,295,990 B2 | 10/2012 | Venkatakrishnan et al. |
| 8,367,984 B2 | 2/2013 | Besore et al. |
| 8,395,621 B2 | 3/2013 | Tung et al. |
| 8,396,602 B2 | 3/2013 | Imes et al. |
| 8,396,604 B2 | 3/2013 | Imes et al. |
| 8,412,382 B2 | 4/2013 | Imes et al. |
| 8,457,802 B1 | 6/2013 | Steven et al. |
| 8,521,337 B1 | 8/2013 | Johnson |
| 8,583,520 B1 | 11/2013 | Forbes, Jr. |
| 8,621,097 B2 | 12/2013 | Venkatakrishnan et al. |
| 8,689,020 B2 | 4/2014 | Massey et al. |
| 8,805,550 B2 | 8/2014 | Chemel et al. |
| 8,892,264 B2 | 11/2014 | Steven et al. |
| 2002/0124000 A1 | 9/2002 | Ooishi |
| 2004/0095237 A1 | 5/2004 | Chen et al. |
| 2004/0117330 A1 | 6/2004 | Ehlers et al. |
| 2004/0128266 A1 | 7/2004 | Yellepeddy et al. |
| 2004/0133314 A1 | 7/2004 | Ehlers et al. |
| 2004/0139038 A1 | 7/2004 | Ehlers et al. |
| 2004/0215529 A1 | 10/2004 | Foster et al. |
| 2005/0033707 A1 | 2/2005 | Ehlers et al. |
| 2005/0234600 A1 | 10/2005 | Boucher et al. |
| 2005/0240427 A1 | 10/2005 | Crichlow |
| 2006/0052918 A1 | 3/2006 | McLeod et al. |
| 2006/0276938 A1 | 12/2006 | Miller |
| 2007/0124026 A1 | 5/2007 | Troxell et al. |
| 2007/0168174 A1 | 7/2007 | Davari et al. |
| 2008/0000381 A1 | 1/2008 | Bartley et al. |
| 2008/0046387 A1 | 2/2008 | Gopal et al. |
| 2009/0093916 A1 | 4/2009 | Parsonnet et al. |
| 2009/0228388 A1 | 9/2009 | Axelrod et al. |
| 2009/0235097 A1 | 9/2009 | Hamilton et al. |
| 2009/0254225 A1 | 10/2009 | Boucher et al. |
| 2009/0281885 A1 | 11/2009 | Castelli et al. |
| 2009/0299537 A1 | 12/2009 | Rea et al. |
| 2009/0313034 A1 | 12/2009 | Ferro et al. |
| 2010/0063644 A1 | 3/2010 | Kansal et al. |
| 2010/0076835 A1 | 3/2010 | Silverman |
| 2010/0082172 A1 | 4/2010 | Ko et al. |
| 2010/0106342 A1 | 4/2010 | Ko et al. |
| 2010/0114387 A1 | 5/2010 | Chassin |
| 2010/0168932 A1 | 7/2010 | Van Zyl |
| 2010/0179704 A1 | 7/2010 | Ozog |
| 2010/0217651 A1 | 8/2010 | Crabtree et al. |
| 2010/0218108 A1 | 8/2010 | Crabtree et al. |
| 2010/0286937 A1 | 11/2010 | Hedley et al. |
| 2010/0324962 A1 | 12/2010 | Nesler et al. |
| 2010/0332373 A1 | 12/2010 | Crabtree et al. |
| 2010/0333105 A1 | 12/2010 | Horvitz et al. |
| 2011/0029461 A1 | 2/2011 | Hardin, Jr. |
| 2011/0066258 A1 | 3/2011 | Torzhkov et al. |
| 2011/0078092 A1 | 3/2011 | Kim et al. |
| 2011/0231320 A1 | 9/2011 | Irving |
| 2011/0246898 A1 | 10/2011 | Imes et al. |
| 2011/0246987 A1 | 10/2011 | Diwakar et al. |
| 2011/0257956 A1 | 10/2011 | Goel et al. |
| 2011/0276527 A1 | 11/2011 | Pitcher et al. |
| 2012/0010757 A1 | 1/2012 | Francino et al. |
| 2012/0245968 A1 | 9/2012 | Beaulieu et al. |
| 2012/0296482 A1 | 11/2012 | Steven et al. |
| 2013/0204443 A1 | 8/2013 | Steven et al. |
| 2013/0245847 A1 | 9/2013 | Steven et al. |
| 2013/0346139 A1 | 12/2013 | Steven et al. |
| 2014/0018971 A1 | 1/2014 | Ellis et al. |
| 2014/0039709 A1 | 2/2014 | Steven et al. |
| 2014/0039710 A1 | 2/2014 | Carter et al. |
| 2014/0039965 A1 | 2/2014 | Steven et al. |
| 2014/0067142 A1 | 3/2014 | Steven et al. |
| 2014/0257526 A1 | 9/2014 | Tiwari et al. |
| 2014/0304025 A1 | 10/2014 | Steven et al. |

FOREIGN PATENT DOCUMENTS

| | | |
|---|---|---|
| WO | WO-2012/019022 A2 | 2/2012 |
| WO | WO-2012/145563 A1 | 10/2012 |
| WO | WO-2013/063581 A1 | 5/2013 |
| WO | WO-2013/067213 A1 | 5/2013 |

(56) References Cited

FOREIGN PATENT DOCUMENTS

| WO | WO-2013/126800 A1 | 8/2013 |
|---|---|---|
| WO | WO-2013/166510 A1 | 11/2013 |
| WO | WO-2013/166511 A2 | 11/2013 |

OTHER PUBLICATIONS

Athay, "An Overview of Power Flow Analysis", American Control Conference, 1983, pp. 404-410 (7 pages).

Choi et al., "A Daily Peak Load Forecasting System Using a Chaotic Time Series", International Conference on Intelligent System Application to Power Systems, 1996, pp. 283-287 (5 pages).

Gacek et al., "Implementing the Future Today in Naperville, Illinois", Power Systems Conference: Advanced Metering, Protection, Control, Communication, and Distributed Resources, 2007 (6 pages).

International Search Report and Written Opinion corresponding to International Application No. PCT/US2012/034326 mailed Aug. 10, 2012.

International Search Report and Written Opinion corresponding to International Application No. PCT/US2012/062439 mailed Dec. 31, 2012.

International Search Report and Written Opinion corresponding to International Application No. PCT/US2012/063109 mailed Mar. 14, 2013.

Jacobson et al., "Common Issues in Discrete Optimization and Discrete-Event Simulation", IEEE Transactions on Automatic Control, vol. 47, pp. 341-345, 2002 (5 pages).

Liu et al., "Kalman Filtering with Partial Observation Losses", 43rd IEEE Conference on Decision and Control (CDC), 2004, pp. 4180-4186 (7 pages).

Mount, T. D., Videbaek, S., & Zimmerman, R. D. (2006). Testing alternative market designs for energy and VArs in a deregulated electricity market. Presented at the 25th Annual Eastern Conference, Advanced Workshop in Regulation and Competition, Rutgers Center for Research in Regulated Industries, May 17-19, Skytop, PA.

Notice of Allowance dated Mar. 7, 2013 from U.S. Appl. No. 12/850,918.

Notice of Allowance dated Apr. 11, 2013 from U.S. Appl. No. 12/850,918.

Office Action dated Aug. 16, 2012 from U.S. Appl. No. 12/850,918.

Pai et al., "A Preconditioned Iterative Solver for Dynamic Simulation of Power Systems", IEEE International Symposium on Circuits and Systems (ISCAS), 1995, pp. 1279-1282 (4 pages).

Stuart, "The Benefits of Integrated Systems: A Case Study", IEEE Seminar (Ref. No. 2002/070) on Open System Technologies for Integrated Building Control, 2002 (8 pages).

Tysseling et al., "Higher Education Facilities: The SmartGrid Earns a Doctorate in Economics", Facilities Manager, Mar./Apr. 2011, pp. 18-23 (6 pages).

Zibelman et al., "Empowering Consumers: Moving Intelligence to the Edge of the Grid", Energy Central Topic Centers, T&D Automation, Oct. 2009, vol. 4, Issue 21 (3 pages).

Zibelman et al., "Smart Markets for Smart Grids", Platts Strategic Media Solutions, Insight Magazine, Jun. 2009, pp. 8-9 (2 pages).

International Search Report and Written Opinion corresponding to International Application No. PCT/US2013/027466 mailed May 3, 2013.

Black, D. et al. "Demand Response and Building Energy Simulation." SIMUREX 2012-Conception optimisée du bâtiment par la SIMUlation et le Retour d'Expérience. EDP Sciences, 2012.

Guo et al, "Cutting Down Electrical Cost in Internet Data Centers by Using Energy Storage", University of Florida, IEEE 2011.

Guo et al, "Electricity Cost Saving Strategy in Data Centers by Using Energy Storage", IEEE Transactions on Parallel and Distributed Systems 2013.

International Search Report and Written Opinion corresponding to International Application No. PCT/US2013/039761 mailed Sep. 6, 2013.

International Search Report and Written Opinion corresponding to International Application No. PCT/US2013/039762 mailed Aug. 26, 2013.

Kempton et al., "A Test of Vehicle-to-Grid (V2G) for Energy Storage and Frequency Regulation in the PJM System", University of Delaware Industry-University Research Partnership, Nov. 2008 (32 pages).

Kiliccote, S. et al., "Dynamic controls for energy efficiency and demand response; framework concepts and a new construction study case in New York." Lawerence Berkeley National Laboratory, 2006.

Luo et al., "Data Center Energy Cost Minimization: a Spatio-Temporal Scheduling Approach", Stanford University, IEEE INFOCOM 2013.

Notice of Allowance dated Jan. 15, 2015 from U.S. Appl. No. 13/888,309.

Notice of Allowance dated Sep. 17, 2014 from U.S. Appl. No. 13/451,497.

Notice of Allowance dated Dec. 3, 2014 from U.S. Appl. No. 13/888,323.

Office Action dated Jan. 29, 2014, in U.S. Appl. No. 13/451,497.

Office Action dated Oct. 24, 2014 from U.S. Appl. No. 13/774,994.

Qureshi et al., "Cutting the Electric Bill for Internet-Scale Systems", SIGCOMM 2009.

Rao et al., "Minimizing Electricity Cost: Optimization of Distributed Internet Data Centers in a Multi-Electricity-Market Environment", IEEE INFOCOM 2010.

Surles, W. et al., "Evaluation of automatic price based thermostat control for peak energy reductio nunder seidential time-of-use utility tariffs." Energy and Buildings 49, 2012: 99-108.

Timmer, John "Saving Money by Load Balancing to Where Electricity is Cheap", arstechnica.com, Aug 17, 2009.

Vosloo, J. C. et al., "Demand Market Participation (DMP) on small energy users." Industrial and Commercial Use of Energy Conference (ICUE), 2012 Proceedings of the 9th IEEE, 2012.

Zhang et al., "Capping the Electricity Cost of Cloud-Scale Data Centers with Impacts on Power Markets", University of Tennessee, HPDC 2011.

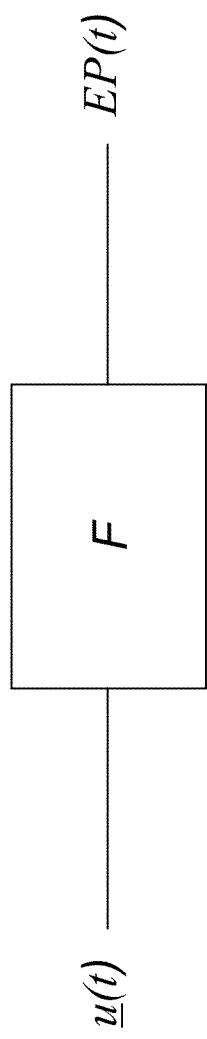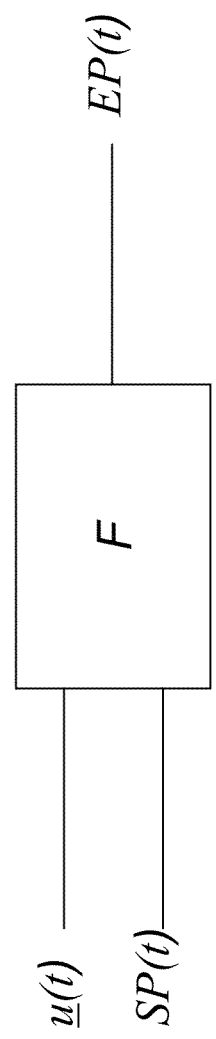

FACILITATING REVENUE GENERATION FROM WHOLESALE ELECTRICITY MARKETS

CROSS-REFERENCE TO RELATED APPLICATIONS

This application claims priority to and benefit of U.S. Provisional Application No. 61/554,390, filed on Nov. 1, 2011, entitled "METHODS, APPARATUS AND SYSTEMS FOR FACILITATING REVENUE GENERATION FROM WHOLESALE ELECTRICITY MARKETS," the entire disclosure of which is incorporated herein by reference in its entirety, including drawings.

This application is also a continuation-in-part of U.S. Nonprovisional application Ser. No. 13/451,497, filed on Apr. 19, 2012, which claims priority to U.S. Provisional Application No. 61/477,067, filed on Apr. 19, 2011, and U.S. Provisional Application No. 61/552,982, filed on Oct. 28, 2011.

This application is also a continuation-in-part of U.S. Nonprovisional application Ser. No. 12/850,918, filed on Aug. 5, 2010, which claims priority to U.S. Provisional Application No. 61/279,589, filed on Oct. 23, 2009.

The entire disclosure of each of these applications is incorporated herein by reference in its entirety, including drawings.

BACKGROUND

In various regions across the United States, "regional transmission operators" (RTOs) or "independent system operators" (ISOs) generally are responsible for obtaining electricity from electricity generators (e.g., operators of coal-fired plants, gas plants, nuclear plants, hydroelectric plants, renewable resources, etc.), and then transmitting the electricity provided by generators over particular geographic regions (e.g., New England, the greater New York area, the mid-Atlantic states) via an electricity transmission infrastructure (also commonly referred to as the electricity "grid"). RTOs generally are responsible for regional planning of grid expansion and/or ordering deployment of new electricity transmission infrastructure by transmission owners.

The Federal Energy Regulation Commission (FERC) presently requires that, in addition to generally managing the operation of the electricity grid in a given geographic area, RTOs/ISOs need to manage the price of electricity generated and consumed on the grid via "wholesale electricity markets." To this end, RTOs/ISOs establish pricing auctions to provide and support wholesale electricity markets. These pricing auctions, in addition to setting wholesale prices as a function of time, also foster sufficient electricity production for the grid at various locations to ensure that the grid is capable of delivering adequate electricity to respective locations of demand for electricity on the grid. Thus, some of the key objectives of the RTOs/ISOs in overseeing wholesale electricity markets include providing for efficient, economic and reliable operation of the grid.

In general, a given RTO/ISO supports a wholesale electricity market by allowing competing electricity generators to offer their electricity production output to the RTO/ISO. Retail electricity suppliers, also commonly referred to as "utilities," in turn supply electricity to end-users/consumers, or "energy customers" of the retail electricity suppliers, and are billed by the RTO/ISO for their purchases. With respect to the wholesale electricity market, the retail electricity suppliers make bids for the electricity production output offered by the electricity generators that, once accepted, establish market prices. The retail electricity suppliers in turn typically re-price the electricity they purchase from electricity generators on the wholesale market to sell to their retail electricity customers.

One significant issue facing RTOs/ISOs relates to various limitations that exist in connection with the grid that may impede a sufficient flow of electricity on the grid under certain circumstances. In particular, there may be time-dependent and/or geographically-dependent limitations on the grid's ability to support transmission of electricity, based on one or more of: 1) an available overall supply of electricity from electricity generators; 2) overall demand from retail electricity suppliers; 3) general conditions on the grid itself (e.g., aging, failing or dated equipment); and 4) "location-specific" or "congestion" issues, e.g., respective geographic locations on the grid of electricity generators, electricity consumers, particular demand conditions, and/or particular grid-related conditions that in some manner impede the transmission of available electricity to one or more portions of the grid). In some circumstances, a grid limitation may be caused by a particular branch of the grid reaching a thermal limit, or a failure of a generator or transformer on a branch of the grid; these limitations generally are referred to as "security constraints" (i.e., particular grid infrastructure cannot be over-loaded without jeopardizing the grid). As such, the electricity grid is sometimes referred to as a "security constrained system."

In view of the foregoing, RTOs/ISOs may employ a process known as "security constrained economic dispatch" for establishing wholesale electricity prices on a wholesale electricity market. Pursuant to this process, an RTO/ISO managing a particular geographic region of an electricity grid determines particular locations on the grid, or "nodes," at which there is a possibility for security constraints to limit electricity transmission. Wholesale electricity prices as a function of time are then established independently for each node (i.e., on a geographically-dependent, or "locational" basis) by accepting bids from energy generators in sequence from the lowest priced offer to the highest priced offer, up to an amount of electricity needed to satisfy electricity demand conditions (e.g., bids from retail electricity suppliers) at the node, so as to develop a supply and demand equilibrium price. In this manner, the wholesale electricity price at a particular node reflects the highest-priced accepted generation offer needed to provide an adequate amount of electricity to that node, taking into consideration various security constraints that may be present at the node. This location-based approach to wholesale electricity prices, which takes into consideration security constraints on the grid, commonly is referred to as "locational marginal pricing," and the wholesale electricity price at a given node is commonly referred to a Locational Marginal Price (LMP). Thus, the wholesale electricity price generally varies at different locations on the grid, based at least in part on security constraints.

While electricity generators and retail electricity suppliers make up a significant constituency of the participants in wholesale electricity markets, applicable market rules in some wholesale electricity markets also permit electricity consumers/end-users (e.g., energy customers of retail electricity suppliers) and others to participate in wholesale electricity markets so as to earn energy-related revenue and offset their energy-related expenditures. In particular, market rules now permit energy users (or their market representatives) to make offers to curtail or otherwise alter their electricity use, or to sell self-generated or stored electricity, to the wholesale market. If such an offer by an energy customer to provide an "electricity-related product or service" is accepted on the applicable wholesale market, the customer endeavors to appropriately control its various energy assets so as to make available to the grid the offered product/service, in return for payment pursuant to the terms of the offer. The concept of an energy customer providing an electricity-related product or service (e.g., electricity use curtailment) on a wholesale electricity market in exchange for payment to the energy customer by the RTO/ISO, commonly is referred to as "demand response" (DR).

Some of the currently more active wholesale electricity sub-markets in which energy customers of retail service providers may readily participate include the "energy markets" (e.g., "day-ahead" energy market, "real-time dispatched" energy market). While various pricing models exist for participation in these markets and other economic demand response wholesale electricity markets (as well as various penalty models for customer non-performance pursuant to an offer to reduce/curtail energy use), often any revenue generated by the energy customer from participation in these markets is based on the locational marginal price (LMP). The LMP may be calculated periodically at specified nodes (e.g., every 5 minutes, every half-hour, every hour) depending on the particular market in which the energy customer is participating. More generally, revenue generation relating to participation in an economic demand response wholesale electricity market is based on a prevailing "wholesale electricity price" for the particular market in question, which in turn generally is based on the LMP (calculated at various intervals), as discussed above.

To determine revenue earned by participating energy customers in a particular economic demand response wholesale electricity market such as an "energy market," the amount of electricity use reduction by the participating customer typically has to be measured; subsequently, this measured amount of electricity use reduction typically is multiplied by a price relating to the prevailing wholesale electricity price for the market in question (e.g., LMP). Electricity use reduction by the energy customer conventionally is measured against a reference electricity usage commonly referred to as a "customer baseline" (CBL). The CBL is intended to represent what the participating energy customer's electricity use normally would have been, over a particular time period and typical ("business-as-usual" or BAU) operating conditions for the customer's energy assets, absent the customer's voluntary electricity use reduction based on the incentive provided by the economic demand response wholesale electricity market.

Conventionally, a customer baseline (CBL) electricity use profile for an energy customer is derived by an RTO/ISO from an historical sample of actual electricity use by the customer over a particular time period and BAU operating conditions. In some cases, the particular time period for which an historical sample of the customer's actual electricity use is selected as a CBL may be based, at least in part, on similar conditions prevailing at the customer's site at the time of the historical sampling and participation in the economic demand response program (e.g., similar weather conditions, similar seasons/time of year, similar occupancy conditions at the customer's site, etc.). In other instances, the time period for selecting an historical sample of actual electricity usage as a CBL is based on relatively recent actual electricity use by the energy customer just prior to the customer's participation in the economic demand response program. For example, the ISO PJM Interconnect calculates a market-participating customer's CBL for a given weekday as "the average of the highest four out of the five most recent highest load (electricity use) weekdays in the 45 calendar day period preceding the relevant load reduction event." In sum, revenue generation from the economic demand response wholesale electricity "energy markets" conventionally is based on an historical actual electricity usage of a participating customer, which historical actual electricity usage serves as a customer baseline (CBL) against which electricity use reduction is measured for purposes of paying the energy customer for the use reduction.

SUMMARY

The Inventors have recognized and appreciated that new opportunities for participation in wholesale electricity markets by electricity consumers/end-users (e.g., energy customers of retail electricity suppliers) have created a need for energy management tools to facilitate energy-related revenue generation from such markets. In view of the foregoing, various embodiments are directed generally to methods, apparatus and systems for determining operating schedules for energy assets so as to facilitate revenue generation from wholesale electricity markets. These energy assets include energy storage assets, energy consuming assets and energy generating assets. In different examples herein, an energy asset can include an energy storage asset, an energy consuming asset, and/or an energy generating asset.

Wholesale electricity markets in which the energy customer may participate to earn energy-related revenue, and to which the various methods, apparatus and systems according to the concepts disclosed herein may apply, include various economic demand response wholesale electricity markets, examples of which include, but are not limited to, a "real-time energy market," a "day-ahead energy market," a "day-ahead scheduling reserve market," a "synchronized reserve" market, a "regulation" market, a "capacity" market, and an "emissions" market. The various methods, apparatus and systems according to the concepts disclosed herein may also apply to facilitate the energy customer participating in a market based on a voltage/VAR ancillary service to earn energy-related revenue. In some examples, the methods, apparatus and systems described herein may be implemented in whole or in part by a curtailment service provider (CSP) or other entity acting as a "broker" between energy customers and an RTO/ISO to facilitate participation in various demand response programs supported by wholesale electricity markets.

Suggested Operating Schedules for Energy Assets

In example implementations discussed in greater detail below, the methods, apparatus and systems described herein determine a suggested operating schedule for one or more energy assets (including energy-consuming assets for which energy usage may be curtailed), over a given time period T, that are operated by an energy customer of a retail electricity supplier. The energy assets operated by the energy customer may include electricity-consuming assets as well as electricity-generating assets (e.g., fossil-fuel-based generators, renewable energy sources) and/or electricity storage assets (e.g., batteries). The time period T over which a suggested operating schedule for the energy asset(s) may be determined according to the inventive concepts disclosed herein may be a portion of an hour, an hour, a period of multiple hours, a day, or a period of multiple days, for example (which in some instances may be based, at least in part, on time-varying wholesale electricity prices on a particular wholesale electricity market from which revenue may be generated). Similarly, the suggested operating schedule(s) for the energy assets(s) may be determined based at least in part on wholesale prices of various wholesale electricity "products" offered on the wholesale electricity markets in which the energy customer may participate (e.g., based on a geographic region in which the energy customer is located) to earn energy-related revenue.

In one example implementation, as discussed in greater detail below, the suggested operating schedule for one or more energy assets is determined via a mathematical optimization process that reduces a net energy-related cost to the energy customer over the time period T by increasing projected energy-related revenue from one or more wholesale electricity markets in which the energy customer may participate.

Energy Asset Modeling

To facilitate the mathematical optimization process for generating a suggested operating schedule for one or more energy assets, a mathematical model representing the customer's energy asset(s) is formulated and employed in the mathematical optimization process. The energy asset model is specified by one or more mathematical functions for calculating an energy profile (i.e., electricity use and/or electricity generation as a function of time over the time period T) for the asset(s), based on a proposed operating schedule for the asset(s) applied as an input to the model. In one aspect, the mathematical function(s) defining the asset model at least in part represent physical attributes of the energy asset(s) themselves that relate to electricity use and/or electricity generation. Depending on the energy asset(s) operated by the energy customer, a given model may represent a single energy asset or an aggregation of multiple energy assets operated by the customer.

Also, depending on the type of energy asset(s) being modeled, the asset model may be formulated to accept additional inputs to facilitate calculation of an energy profile based on a proposed operating schedule. Herein, in various examples, energy storage assets, energy consuming assets and/or energy generating assets are being modeled. For example, in the case of energy consuming assets such as building assets including heating, ventilation and air conditioning (HVAC) systems for temperature control in one or more buildings, and/or other assets for which thermodynamic considerations are relevant (including weather- or temperature-dependent energy generating assets including photovoltaic cells and wind turbines), the mathematical model for the asset(s) may be configured to consider as an input to the model actual or forecast ambient environmental conditions (e.g., temperature, humidity, ambient light/cloud cover, etc.) as a function of time, as well as other variables that may impact thermodynamics or the energy profile in general (e.g., building occupancy, a presence of equipment such as computers and other instrumentation that may affect heating or cooling in an environment, etc.).

Customer Baseline (CBL) Energy Profiles for Business-As-Usual (BAU) Operating Schedules In some examples, the mathematical model for the energy asset(s) first is used to generate a simulated (or "predictive") customer baseline (CBL) energy profile corresponding to a typical operating schedule (also referred to herein as a "business-as-usual" (BAU) operating schedule, or "BAU conditions"). In particular, an energy customer's BAU operating schedule for its energy asset(s) is applied to the mathematical model, which in turn provides as an output a simulated CBL energy profile representing a typical electricity consumption or generation as a function of time, over a given time period T, for the modeled energy asset(s). In one aspect, the energy customer's BAU operating schedule represents the customer's typical behavior with respect to operating its energy asset(s), absent any incentive to reduce energy costs and/or earn energy-related revenue from the wholesale electricity market.

As discussed in greater detail below, a simulated and predictive CBL energy profile based on a mathematical model according to the concepts disclosed herein provides a significant improvement over conventional approaches to determine a frame of reference for typical energy profiles of energy customers (absent an incentive to generate revenue via wholesale electricity markets); as noted above, conventional approaches are limited to considering only historical actual energy use information. In particular, it is recognized and appreciated herein that conventional backward-looking assessment of CBL is not necessarily representative of what an energy customer's electricity usage actually would have been on a given day for which economic demand response revenue is being calculated—at best, such backward-looking historical actual-use-based assessments of CBL provide inconclusive estimates.

Additionally, it has been observed empirically that an historical actual-use CBL provides incentives for some energy customers to artificially inflate energy usage (i.e., by not operating energy assets pursuant to "business-as-usual" or BAU conditions, but instead purposefully adopting higher-consumption operating conditions) prior to a period in which the customer anticipates participation in economic demand response wholesale electricity markets; an artificially higher historic actual-use-based CBL, against which energy use reduction will be measured, provides a potentially higher economic demand response revenue. In this manner, the general goal of economic demand response programs to incentivize reduced electricity usage is undermined (by an artificially-increased electricity usage to establish a higher CBL).

Furthermore, the Inventors have recognized and appreciated that an historical actual-use-based CBL provides a long-term disincentive to participate in economic demand response wholesale electricity markets. In particular, as a given energy customer participates in economic demand response wholesale electricity markets over time, their average actual electricity use from retail suppliers is expected to decrease. If revenue from such markets continues to be calculated with reference to an historical actual-use-based CBL, the potential for economic demand response revenue will decrease over time, as an economic settlement approach based on historical actual-use CBL eventually will begin to treat incentivized electricity use reduction as "business-as-usual" operating conditions for the energy customer. This type of treatment arguably will ultimately discourage participation in wholesale electricity markets. At very least, continued reliance on historical actual-use-based CBL likely will compel an extension of a "look-back" period serving as a basis for determining CBL for energy customers who actively participate in economic demand response wholesale electricity markets for significant periods of time. As longer look-back periods are adopted, the accuracy and relevance of historic actual-use-based CBLs from more distant time periods arguably will significantly decrease.

Accordingly, for at least the foregoing reasons, a simulated and predictive CBL energy profile, based on a mathematical model of an energy customer's energy asset(s) according to the concepts disclosed herein (rather than an historical actual-use-based CBL as conventionally employed), provides a significant improvement for more accurately determining revenue earned from economic demand response wholesale electricity markets. In some examples, the mathematical model for the energy asset(s) may not be predicated on any significantly historical actual electricity use information for the energy asset(s), and instead may be based in part on physical attributes of the energy asset(s) themselves that relate to electricity use and/or electricity generation, as noted above. In this manner, simulated and predictive CBL energy profiles based on such mathematical models are not substantively influenced by significantly historical actual electricity use information.

A self-tuning energy asset model according to a principle herein may adapt itself to the current conditions of an energy asset. That is, the computation of the CBL calculations may reflect temporary changes or permanent changes in the physical characteristics of an energy asset. The historical actual-use-based CBL may capture permanent changes in the energy asset as well.

In other examples, the mathematical model for energy asset(s) may be predicated on some degree of essentially real-time or near real-time feedback (e.g., from one or more control systems actually controlling the modeled energy asset(s)), which feedback may represent actual electricity use. This feedback may be used, according to some examples of the methods, apparatus and systems disclosed herein, to refine some aspects of the mathematical model; however, even when real-time or near real-time feedback representing actual electricity use is employed, in some examples the mathematical model is may be based on physical attributes of the energy asset(s) themselves relating to electricity use and/or electricity generation.

Objective Cost Functions

In some examples, the mathematical model for the energy asset(s) is employed to determine a suggested operating schedule over a given time period T for the energy asset(s) (different than the BAU operating schedule) based on a mathematical optimization of an "objective cost function" representing the net energy-related cost to the energy customer for operating the asset(s). In example implementations, the objective cost function incorporates the mathematical model for the energy asset(s) and specifies energy-related revenues from one or more wholesale energy markets (e.g., based on forecasted wholesale energy prices over the time period T for the one or more wholesale markets of interest), from which possible revenue may be available to the energy customer. In some examples, the energy-related revenues specified in the objective cost function may take into consideration a simulated customer baseline (CBL) energy profile (discussed above) as a basis for determining such revenue.

The objective cost function employed in the mathematical optimization to determine a suggested operating schedule for the energy asset(s) also may specify energy-related costs which are offset by the energy-related revenues. In particular, in some examples, the energy-related costs included in the objective cost function may include "actual" energy-related costs (e.g., retail electricity costs, wholesale electricity costs representing revenue earned by the energy customer, fuel costs to run one or more electricity generation assets, operation and/or maintenance costs that may be associated with electricity generation and/or energy storage assets, emissions costs from the greenhouse gas emissions based on operation of the system, lifetime and/or replacement costs for electricity generation and/or energy storage assets, emissions-related costs, etc.). The energy-related costs included in the objective cost function additionally or alternatively may include "indirect" energy-related costs, such as convenience/comfort costs associated with the energy customer's adoption of a suggested operating schedule different than the BAU operating schedule (the convenience/comfort cost represents an "indirect" cost associated with a change in the customer's behavior with respect to operating its asset(s), based on the incentive of possible energy-related revenue from the wholesale electricity markets).

Optimization of Objective Cost Function for Generating Energy Asset Operating Schedules In one example, the objective cost function (which incorporates the mathematical model of the energy asset(s)) may be provided to an optimizer (a particularly-programmed processor, also referred to as a "solver") that implements a mathematical optimization process to determine a suggested operating schedule for the energy asset(s) over a given time period T. In one conceptual illustration of the mathematical optimization process, some number N of candidate operating schedules are successively applied to the mathematical model to generate simulated energy profiles corresponding to the candidate operating schedules. A net energy-related cost represented by the objective cost function is calculated for each simulated energy profile, and the candidate operating schedule that minimizes the objective cost function (i.e., minimizes the net energy-related cost) is selected as the suggested operating schedule. In some implementations, the amount of revenue available from the relevant wholesale electricity markets over the given time period T is a significant factor dictating the candidate operating schedule that is provided as an output of the optimizer. The energy-related costs may also include a reliability cost (such as based on any voltage/VAR control activity in a microgrid application) and/or an emissions cost based on an emissions market.

Adopting Operating Schedules, Market Bids and Settlement

The suggested operating schedule in turn may be transmitted to the energy customer (e.g., to an energy management system of the energy customer, including a building management system), and the customer may choose to adopt or not adopt the suggested operating schedule to actually operate its energy asset(s) over the particular time period T for which the optimization is performed. In some implementations, a given operating schedule is transmitted to the energy customer in the form of one or more bias signals representing a change in an operating set point of one or more assets, as a function of time over the time period T, from the typical or "business-as-usual" (BAU) operating set point for the asset(s). In some examples, the energy customer makes a choice to adopt a given suggested operating schedule in tandem with making an offer (a "bid") to provide one or more wholesale electricity market products to the appropriate market pursuant to the adopted operating schedule.

If the energy customer adopts the suggested operating schedule to actually operate its energy asset(s) so as to provide a particular wholesale electricity market product pursuant to an accepted bid (e.g., reduce its energy consumption), various information ultimately is obtained from the energy customer to facilitate a "settlement" process pursuant to which the customer is paid by the wholesale market operator (i.e., the RTO/ISO overseeing the wholesale electricity market(s) in which the customer is participating). For example, in one example relating to energy markets (wherein the "product" is energy use curtailment), the energy customer's "metered load" (i.e., actual energy use during the time period T in which the suggested operating schedule is adopted) is measured, and compared to a simulated CBL based on the mathematical model for the customer's energy asset(s). The energy customer may then be paid for its economic demand response electricity use reduction based on a difference between the simulated CBL and the actual metered load, multiplied by the actual wholesale energy price during the time period T for the market in question (e.g., LMP).

Apparatus, systems, methods and computer-readable media are described for determining an operating schedule for at least one energy asset operated by an energy customer of an electricity supplier, so as to generate energy-related revenue, over a time period T, associated with operation of the at least one energy asset according to the operating schedule. The energy-related revenue available to the energy customer over the time period T is based at least in part on a wholesale electricity market. In an example, the apparatus includes at least one communication interface, at least one memory to store processor-executable instructions and an objective function for the at least one energy asset, and at least one processing unit. The at least one energy asset includes at least one energy consuming asset, where the objective function facilitates a determination of the operating schedule for the at least one energy asset based at least in part on an operation characteristic of the at least one energy asset and a forecast wholesale electricity price associated with the wholesale electricity market, The at least one processing unit is communicatively coupled to the at least one communication interface and the at least one memory. Upon execution of the processor-executable instructions, the at least one processing unit (A) determines the operating schedule for the at least one energy asset using the objective function and a customer baseline (CBL) energy profile for at least one energy consuming asset of the energy assets, over the time period T, where the CBL energy profile is computed based on applying a business-as-usual (BAU) operating schedule for the at least one energy consuming asset to a mathematical model of the operation of the at least one energy consuming asset, and (B) controls the at least one communication interface to transmit to the energy customer the operating schedule for at least one energy asset determined in (A), and/or controls the at least one memory so as to store the determined operating schedule.

In any example, the mathematical model can include at least one differential equation modeling at least one of a material composition of the at least one energy consuming asset, a thermal property of the at least one energy consuming asset, an occupancy of the at least one energy consuming asset, and an ambient temperature of the at least one energy consuming asset.

In any example, the mathematical model can be used to model at least one of a thermal property, a mechanical property, and an electrical property of the at least one energy asset based on the BAU operating schedule.

For example, the mathematical model can include at least one differential equation modeling the physical operation of the at least one energy consuming asset.

In any example, the at least one energy asset can be at least one building.

In an example, the operation characteristic of the at least one energy asset can be a load use schedule. In an example, the load use schedule may impose a maximum allowable load drawn by the at least one energy consuming asset over a time interval that is less than time period T. In this example, the load use schedule may impose a different value of maximum allowable load at different intervals during time period T. In another example, the operation characteristic of the at least one energy consuming asset can be an energy consumption profile as a function of time of the at least one energy consuming asset. In another example, the at least one energy consuming asset can be a controllable energy consuming asset, where the operation characteristic of the at least one controllable energy consuming asset is a set point.

In an example implementation, upon execution of the processor-executable instructions, the at least one processing unit can determine the operating schedule for the at least one energy asset using the objective function in (A) by minimizing a net energy-related cost over the time period T. The net-energy related cost can be based at least in part on an electricity consumption by the at least one energy consuming asset and the CBL energy profile. In an example, the energy-related revenue available to the energy customer is based at least in part on the minimized net energy-related cost. The net energy-related cost can be specified as a difference between an electricity supply cost and a demand response revenue over the time period T.

In another example implementation, the at least one processing unit can be used to determine the operating schedule for the at least one energy asset determined in (A) as at least one bias signal, and controls the at least one communication interface in (B) to transmit to the energy customer the at least one bias signal.

In another example implementation, the at least one processing unit can be used to control the at least one communication interface in (B) to transmit to the energy customer the at least one bias signal at regular time intervals during the time period T.

Apparatus, systems, methods and computer-readable media also are described for determining an operating schedule for at least one energy asset operated by an energy customer of an electricity supplier, so as to generate energy-related revenue, over a time period T, associated with operation of the at least one energy asset according to the operating schedule, where the energy-related revenue available to the energy customer over the time period T is based at least in part on a wholesale electricity market. In an example, the apparatus includes at least one communication interface, at least one memory to store processor-executable instructions and an objective function for the at least one energy asset, and at least one processing unit. The at least one energy asset can include at least one energy consuming asset, and the objective function facilitates a determination of the operating schedule for the at least one energy asset based at least in part on an operation characteristic of the at least one energy asset and a forecast wholesale electricity price associated with the wholesale electricity market. The at least one processing unit can be communicatively coupled to the at least one communication interface and the at least one memory, where upon execution of the processor-executable instructions, the at least one processing unit (A) determines the operating schedule for the at least one energy asset using the objective function and a customer baseline (CBL) energy profile for at least one energy consuming asset of the energy assets, over the time period T, where the CBL energy profile is computed based on applying a business-as-usual (BAU) operating schedule for the at least one energy consuming asset to a mathematical model of the operation of the at least one energy consuming asset, and where the CBL energy profile is an energy consumption profile as a function of time for the at least one energy consuming asset, and (B) controls the at least one communication interface to transmit to the energy customer the operating schedule for at least one energy asset determined in (A), and/or controls the at least one memory so as to store the determined operating schedule.

In an example implementation, upon execution of the processor-executable instructions, the at least one processing unit determines the operating schedule for the at least one energy asset using the objective function in (A) by minimizing a net energy-related cost over the time period T. The net-energy related cost can be computed based at least in part on an electricity consumption by the at least one energy consuming asset and the CBL energy profile. The energy-related revenue available to the energy customer is based at least in part on the minimized net energy-related cost.

In an example, the net energy-related cost can be specified as a difference between an electricity supply cost and a demand response revenue over the time period T.

In an example, the economic demand response revenue over the time period T is determined based on the forecast wholesale electricity price, an electricity consumption by the at least one energy consuming asset, and the CBL energy profile for the at least one energy consuming asset.

In an example, the at least one energy consuming asset can include at least one controllable energy consuming asset, and in (A), the at least one processing unit determines both the operating schedule for the at least one energy based at least in part on minimizing the net energy-related cost, over the time period T, associated with the electricity consumption by the at least one controllable energy consuming asset.

In an example, the economic demand response revenue over the time period T is determined based on the forecast wholesale electricity price and a difference between the electricity consumption by the at least one controllable energy consuming asset and the CBL energy profile for the at least one controllable energy consuming asset.

In an example, the at least one controllable energy consuming asset can include at least one building having a variable internal temperature controlled by a heating, ventilation and air conditioning (HVAC) system, the operating schedule for the at least one controllable energy consuming asset specifies a candidate temperature set point for the HVAC system as a function of time, and the BAU operating schedule for the at least one controllable energy consuming asset is specified by a business-as-usual (BAU) temperature set point for the HVAC system as a function of time.

Apparatus, systems, methods and computer-readable media also are described for determining an operating schedule for at least one energy asset operated by an energy customer of an electricity supplier, so as to generate energy-related revenue, over a time period T, associated with operation of the at least one energy asset according to the operating schedule, where the energy-related revenue available to the energy customer over the time period T is based at least in part on a wholesale electricity market. In an example, the apparatus includes at least one communication interface, at least one memory to store processor-executable instructions and an objective function for the at least one energy asset, and at least one processing unit. The at least one energy asset includes at least one energy consuming asset. The objective function facilitates a determination of the operating schedule for the at least one energy asset based at least in part on an operation characteristic of the at least one energy asset, a forecast wholesale electricity price associated with the wholesale electricity market, and an emissions cost associated with the operation of the at least one energy asset. The at least one processing unit is communicatively coupled to the at least one communication interface and the at least one memory. Upon execution of the processor-executable instructions, the at least one processing unit (A) determines the operating schedule for the at least one energy asset using the objective function and a customer baseline (CBL) energy profile for at least one energy consuming asset of the energy assets, over the time period T, and (B) controls the at least one communication interface to transmit to the energy customer the operating schedule for at least one energy asset determined in (A), and/or controls the at least one memory so as to store the determined operating schedule.

In an example, the emissions cost can be computed based on a prorated amount of a penalty cost leveled due to an amount of emissions, over time period T, associated with the operation of the at least one energy asset.

In another example, the emissions cost can be computed based on a trading price of a carbon credit based on an amount of carbon dioxide gas emission, over time period T, associated with the operation of the at least one energy asset.

In an example, the emissions cost can be computed based on a base emissions cost for a minimal level of operation of the at least one energy asset, over time period T, and a marginal emissions cost per megawatt with each increase or decrease in megawatt of operation. For example, the marginal emissions cost can be computed based on a change in amount of emissions generated by an energy generating asset, in communication with the at least one energy asset, associated with the increase or decrease in megawatt of operation. As another example, the marginal emissions cost can be computed based on a marginal supplier emissions cost associated with a change in electricity usage by the energy customer associated with the increase or decrease in megawatt of operation, and where the marginal supplier emissions cost is based on an amount of emissions from an electricity generating facility of the electricity supplier per megawatt-hour of electricity supplied.

In an example, the emissions cost can be computed based on a change in the energy customer's behavior in reducing its electricity usage based on an operation of the at least one energy consuming asset. For example, the emissions cost can be specified as a cost function based at least in part on at least one difference between the energy customer's behavior in reducing its usage of at least one energy consuming asset and the BAU operating schedule. As another example, where the at least one energy asset includes at least one building having a variable internal temperature controlled by a HVAC system, the emissions cost can be based at least in part on a difference between a candidate temperature set point for the HVAC system as a function of time and the BAU temperature set point.

In an example, the emissions cost can be computed as proportional to a magnitude of deviation a temperature of the building from a BAU temperature set point.

In an example, the CBL energy profile can be computed based on applying a business-as-usual (BAU) operating schedule for the at least one energy consuming asset to a mathematical model of the operation of the at least one energy consuming asset.

The mathematical model can include at least one differential equation modeling at least one of a material composition of the at least one energy consuming asset, a thermal property of the at least one energy consuming asset, an occupancy of the at least one energy consuming asset, and an ambient temperature of the at least one energy consuming asset. For example, the mathematical model can be used to model at least one of a thermal property, a mechanical property, and an electrical property of the at least one energy asset based on the BAU operating schedule. In another example, the mathematical model can include at least one differential equation modeling the physical operation of the at least one energy consuming asset.

In an example, the operation characteristic of the at least one energy consuming asset is an energy consumption profile as a function of time of the at least one energy consuming asset.

In an example, the at least one energy consuming asset is a controllable energy consuming asset, where the operation characteristic of the at least one controllable energy consuming asset is a set point.

In an example implementation, upon execution of the processor-executable instructions, the at least one processing unit can be used to determine the operating schedule for the at least one energy asset using the objective function in (A) by minimizing a net energy-related cost over the time period T, where the net-energy related cost is based at least in part on an electricity consumption by the at least one energy consuming asset, the emissions cost associated with the electricity consumption by the at least one energy consuming asset, and the CBL energy profile. The energy-related revenue available to the energy customer can be based at least in part on the minimized net energy-related cost.

In an example, the net energy-related cost can be specified as a difference between an electricity supply cost and an economic demand response revenue over the time period T.

In an example, the CBL energy profile can be an energy consumption profile as a function of time for the at least one energy consuming asset.

In an example, the economic demand response revenue over the time period T can be determined based on the forecast wholesale electricity price, an electricity consumption by the at least one energy consuming asset, the emissions cost associated with the electricity consumption by the at least one energy consuming asset, and the CBL energy profile for the at least one energy consuming asset.

In an example, the at least one energy consuming asset can include at least one controllable energy consuming asset, and in (A), the at least one processing unit determines both the operating schedule for the at least one energy based at least in part on minimizing the net energy-related cost, over the time period T, associated with the electricity consumption by the at least one controllable energy consuming asset.

In an example, the at least one processing unit can be used to determine the operating schedule for the at least one energy asset determined in (A) as at least one bias signal, and controls the at least one communication interface in (B) to transmit to the energy customer the at least one bias signal.

In an example, the at least one processing unit can be used to control the at least one communication interface in (B) to transmit to the energy customer the at least one bias signal at regular time intervals during the time period T.

Apparatus, systems, methods and computer-readable media also are described for determining an operating schedule for at least one energy asset operated by an energy customer of an electricity supplier, so as to generate energy-related revenue, over a time period T, associated with operation of the at least one energy asset according to the operating schedule, where the energy-related revenue available to the energy customer over the time period T is based at least in part on a wholesale electricity market. In an example, the apparatus includes at least one communication interface, at least one memory to store processor-executable instructions, and at least one processing unit. The processor-executable instructions include an optimizer module, and an objective function for the at least one energy asset. The at least one energy asset includes at least one energy consuming asset, where the objective function facilitates a determination of the operating schedule for the at least one energy asset based at least in part on an operation characteristic of the at least one energy asset and a forecast wholesale electricity price associated with the wholesale electricity market. The at least one processing unit is communicatively coupled to the at least one communication interface and the at least one memory. Upon execution of the processor-executable instructions, the at least one processing unit (A) applies the optimizer module to determine the operating schedule for the at least one energy asset using the objective function and a comfort cost attributed to a change in the energy customer's behavior in adopting the operating schedule, over the time period T, for the at least one energy asset in lieu of the business-as-usual (BAU) operating schedule, and (B) controls the at least one communication interface to transmit to the energy customer the operating schedule for at least one energy asset determined in (A), and/or controls the at least one memory so as to store the determined operating schedule.

In an example, the comfort cost can be specified as a cost function based at least in part on at least one difference between the operating schedule and the BAU operating schedule.

In an example, the least one energy asset includes at least one building having a variable internal temperature controlled by a HVAC system. The operating schedule can include a candidate temperature set point for the HVAC system as a function of time, the BAU operating schedule can include a BAU temperature set point for the HVAC system as a function of time, and the comfort cost can be determined based at least in part on a difference between the candidate temperature set point and the BAU temperature set point.

In an example, the at least one energy asset can be at least one building.

In an example, the change in the energy customer's behavior can be monitored based on a difference in a return-air-temperature of a section of the at least one energy asset as compared to a return-air-temperature with the BAU operating schedule.

In an example, the at least one building has a variable internal temperature controlled by a HVAC system, the operating schedule includes a candidate return-air-temperature for the HVAC system as a function of time, the BAU operating schedule includes a BAU return-air-temperature for the HVAC system as a function of time, and the comfort cost can be determined based at least in part on a difference between the candidate return-air-temperature and the BAU return-air-temperature.

In an example, the at least one energy asset includes a controllable energy consuming asset, and the comfort cost is determined as proportional to a magnitude of deviation a temperature of the building from a BAU temperature set point.

In an example, the at least one energy asset includes a controllable energy consuming asset, and the comfort cost is proportional to a magnitude of deviation a humidity of the building from a BAU humidity set point.

Apparatus, systems, methods and computer-readable media also are described for determining a suggested operating schedule over a time period T for at least one energy asset operated by an energy customer of a retail electricity supplier, so as to reduce a net energy-related cost, over the time period T, associated with electricity consumption and/or electricity generation by the energy customer, where the net energy-related cost is based at least in part on an energy-related revenue available to the energy customer over the time period T from a wholesale electricity market. In an example, the apparatus includes at least one input device, at least one communication interface, at least one memory to store processor-executable instructions and a mathematical model for the at least one energy asset, and at least one processing unit. The mathematical model specifies at least one function that calculates an energy profile for the at least one energy asset based at least in part on an operating schedule for the at least one energy asset applied to the mathematical model. The at least one processing unit is communicatively coupled to the at least one input device, the at least one communication interface, and the at least one memory. Upon execution of the processor-executable instructions, the at least one processing unit (A) generates a first simulated customer baseline (CBL) energy profile for the at least one energy asset, over the time period T, based on a typical operation of the at least one energy asset by the energy customer, where (A) includes: (A1) controlling the at least one input device and/or the at least one communication interface to provide or receive a business-as-usual (BAU) operating schedule for the at least one energy asset over the time period T, and (A2) applying the BAU operating schedule to the mathematical model so as to generate the first simulated CBL energy profile. Upon execution of the processor-executable instructions, the at least one processing unit also (B) determines the suggested operating schedule for the at least one energy asset based at least in part on the first simulated CBL energy profile generated in (A) and a forecast wholesale electricity price associated with the wholesale electricity market; and (C) controls the at least one communication interface to transmit to the energy customer the suggested operating schedule determined in (B), and/or controls the at least one memory so as to store the suggested operating schedule.

In an example, the mathematical model includes at least one differential equation modeling at least one of a material composition of the at least one energy asset, a thermal property of the at least one energy asset, an occupancy of the at least one energy asset, and an ambient temperature of the at least one energy asset.

In an example, the mathematical model models at least one of a thermal property, a mechanical property, and an electrical property of the at least one energy asset based on the BAU operating schedule.

In an example, the mathematical model includes at least one differential equation modeling the physical operation of the at least one energy asset.

The at least one energy asset can be at least one building.

In an example, the operation characteristic of the at least one energy asset can be a load use schedule. For example, the load use schedule can impose a maximum allowable load drawn by the at least one energy asset over a time interval that is less than time period T. As another example, the load use schedule can impose a different value of maximum allowable load at different intervals during time period T.

In an example, the operation characteristic of the at least one energy asset can be an energy consumption profile as a function of time of the at least one energy asset.

In an example, the at least one energy asset can be a controllable energy consuming asset, and the operation characteristic of the at least one controllable energy consuming asset is a set point.

In an example implementation, upon execution of the processor-executable instructions, the at least one processing unit can be used to determine the suggested operating schedule for the at least one energy asset using an objective function by minimizing a net energy-related cost over the time period T. The net-energy related cost can be based at least in part on the forecast wholesale electricity price associated with the wholesale electricity market, an electricity consumption by the at least one energy asset, and the first simulated CBL energy profile. The energy-related revenue available to the energy customer can be based at least in part on the minimized net energy-related cost.

In an example, the net energy-related cost can be specified as a difference between an electricity supply cost and a demand response revenue over the time period T.

In an example implementation, the at least one processing unit can be used to determine the operating schedule for the at least one energy asset determined in (A) as at least one bias signal, and control the at least one communication interface in (B) to transmit to the energy customer the at least one bias signal.

In an example implementation, the at least one processing unit can be used to control the at least one communication interface in (B) to transmit to the energy customer the at least one bias signal at regular time intervals during the time period T.

In an example implementation, the at least one processing unit can be used to determine the suggested operating schedule for the at least one energy asset based at least in part on the CBL energy profile generated in (A), the wholesale electricity price, and a comfort cost attributed to a change in the energy customer's behavior in adopting the suggested operating schedule in lieu of the BAU operating schedule.

In an example, the comfort cost can be specified as a cost function based at least in part on at least one difference between the suggested operating schedule and the BAU operating schedule.

In an example, the at least one energy asset can include at least one building having a variable internal temperature controlled by a HVAC system, each of the candidate operating schedules selected in (B1) includes a candidate temperature set point for the HVAC system as a function of time, the BAU operating schedule includes a BAU temperature set point for the HVAC system as a function of time, and the comfort cost is based at least in part on a difference between the candidate temperature set point and the BAU temperature set point.

Apparatus, systems, methods and computer-readable media also are described for determining a suggested operating schedule over a time period T for at least one energy asset operated by an energy customer of a retail electricity supplier, so as to reduce a net energy-related cost, over the time period T, associated with electricity consumption and/or electricity generation by the energy customer, where the net energy-related cost is based at least in part on an energy-related revenue available to the energy customer over the time period T from a wholesale electricity market. In an example, the apparatus includes at least one input device, at least one communication interface, at least one processing unit, and at least one memory to store processor-executable instructions, a mathematical model for the at least one energy asset and an objective function. The processor-executable instructions include an optimizer module. The mathematical model for the at least one energy asset specifies at least one function that calculates an energy profile for the at least one energy asset based at least in part on an operating schedule for the at least one energy asset applied to the mathematical model. The objective cost function represents the net energy-related cost, and the objective cost function specifies the energy-related revenue and at least one energy-related cost associated with operation of the at least one energy asset. The objective cost function calculates the net energy-related cost based at least in part on the energy profile calculated via the mathematical model and a forecast wholesale electricity price associated with the wholesale electricity market. The at least one processing unit is communicatively coupled to the at least one input device, the at least one communication interface, and the at least one memory. Upon execution of the processor-executable instructions including the optimizer module, the at least one processing unit (A) determines the suggested operating schedule for the at least one energy asset based at least in part on the objective cost function, and (B) controls the at least one communication interface to transmit to the energy customer the suggested operating schedule determined in (A), and/or controls the at least one memory so as to store the suggested operating schedule.

The following patent applications are hereby incorporated herein by reference in their entirety:

U.S. Provisional Application No. 61/477,067, filed on Apr. 19, 2011;

U.S. Provisional Application No. 61/552,982, filed on Oct. 28, 2011;

U.S. Non-provisional application Ser. No. 12/850,918, filed on Aug. 5, 2010; and U.S. Provisional Application No. 61/279,589, filed on Oct. 23, 2009.

The entire disclosure of these applications is incorporated herein by reference in its entirety, including drawings, It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 8 illustrates an example block diagram representing another asset model according to a principle described herein;

FIG. 9 illustrates an example block diagram representing another asset model according to a principle described herein;

DETAILED DESCRIPTION

Figure 1:
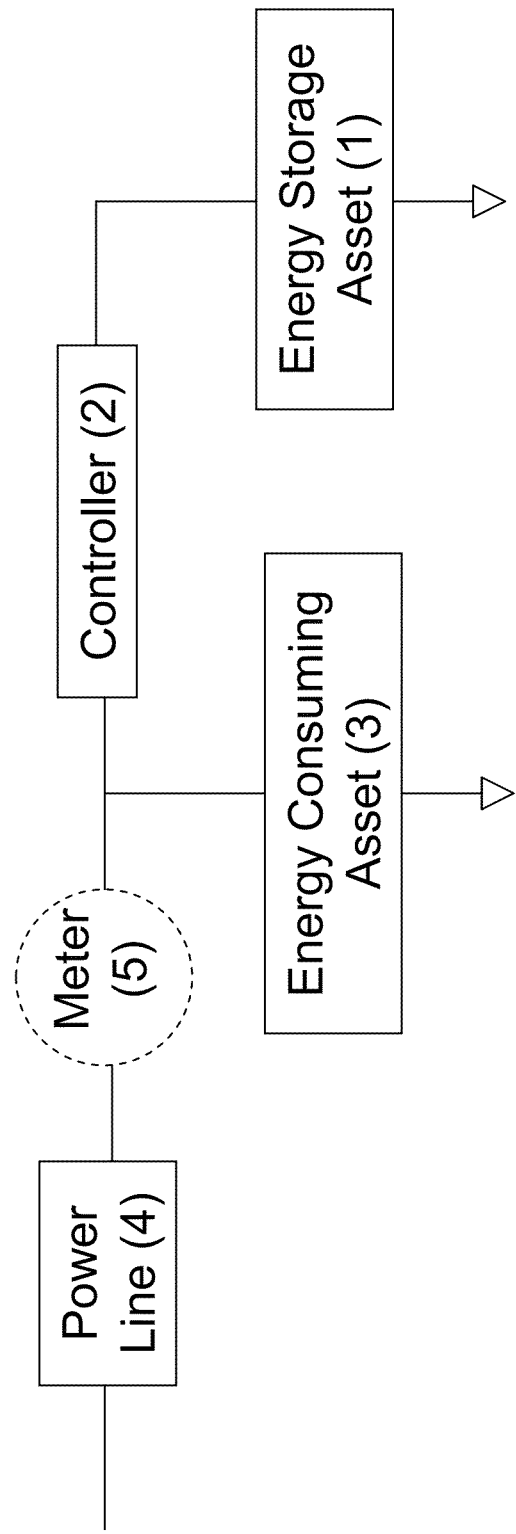
FIG. 1 shows an example system that includes an energy storage asset, a controller, and an energy consuming asset, according to a principle described herein.

Following below are more detailed descriptions of various concepts related to, and embodiments of, inventive methods, apparatus, and systems for determining a suggested operating schedule for energy assets to facilitate revenue generation from wholesale electricity markets. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means includes but not limited to, the term "including" means including but not limited to. The term "based on" means based at least in part on.

As used herein, the term "in communication with" includes direct communication between elements as well as indirect communication between the elements, such as by means of at least one intermediate component. As used herein, the term "in electrical communication with" includes direct electrical communication between elements as well as indirect electrical communication between the elements, such as by means of at least one intermediate component.

The methods, apparatus, and systems disclosed herein provide resources by which a certain environment that includes one or more energy assets is modeled, energy use and/or generation profiles of the assets may be simulated based on the model(s), and operating schedules for the energy asset(s) may be suggested, based on such simulations, to facilitate revenue generation from one or more wholesale electricity markets for energy customers overseeing the environment (e.g., operating the energy asset(s) within the environment). Environments including one or more of a wide variety of energy assets are contemplated, examples of which include, but are not limited to, a building or group of buildings that include one or more energy-consuming and/or energy-generating assets (e.g., heaters, HVAC systems, chillers/ice makers, fossil-fuel-based and/or renewable electricity generators, energy storage devices), as well as other environments in which one or more building may not be involved (but which may nonetheless include one or more energy assets).

In some examples, optimization software constituting an "optimizer" module (also referred to as a "solver" or simply "optimizer") is used to perform an optimization process to determine suggested operating schedules for one or more energy assets that minimize net energy-related costs for the energy customer. In one aspect, the optimization process is based at least in part on balancing respective energy-related costs and energy-related revenues in connection with the energy customer's operating environment and assets therein, in consideration of wholesale electricity prices as a function of time. In other aspects, an "objective cost function" that represents the net energy-related cost as a function of an operating schedule for the energy asset(s) and a mathematical model for the energy asset(s) may include multiple constituent components, examples of which include, but are not limited to:

1. a convenience or comfort cost associated with deviation from the business-as-usual (BAU) operating schedule,
2. a cost associated with deviation from an emissions target,
3. a cost associated with electric power production by the customer's energy generating assets (if any),
4. a cost associated with electric power supply from a retail electricity supplier, and
5. a cost associated with economic demand response (DR) revenue from one or more wholesale electricity markets.

Accordingly, salient aspects of example methods, apparatus and systems according the principles described herein are to provide energy asset management capabilities for reducing retail electricity costs by optimizing electricity usage, generation, and storage, while at the same time providing significant revenue opportunities in wholesale electricity markets and/or in emissions markets.

The apparatuses and methods described herein are applicable to a system that includes an energy storage asset 1, a controller 2 in communication with the energy storage asset 1, and an energy consuming asset 3 in communication with a power line 4 (as depicted in the example of FIG. 1). The controller 2 facilitates charging of the energy storage asset 31 using the electricity supplied by power line 4 or feeding power generated by a discharge of the energy storage asset 31 to the power line 4. As depicted in the non-limiting example of FIG. 1, the controller 2, the energy storage asset 1 and the energy consuming asset 3 may be located behind a power meter 5. For example, all of the controller 2, the energy storage asset 1 and the energy consuming asset 3 may be located at one or more facilities of the energy consumer.

Non-limiting examples of energy storage assets include batteries, ice units, and compressed air. Non-limiting examples of batteries include lithium ion batteries, lead-acid batteries, flow batteries, or dry cell technology batteries.

In the non-limiting example of FIG. 1, the controller 2 facilitates the communication between the energy consuming asset and the energy storage asset. In another example, the energy consuming asset may communicate with the energy storage asset via one or more other components including the controller 2.

The apparatuses and methods herein facilitate generation of energy-related revenue for an energy customer of an electricity supplier, where the energy customer commits an amount of energy from the at least one energy storage asset to an energy market. In an example, the electricity supplier may be a retail electricity supplier that supplies the electricity to the energy customer at a retail price. In another example, the electricity supplier may supply the electricity to the energy customer at a contracted for or negotiated price. In various examples herein, the energy customer may allow an amount of capacity of the energy storage asset to be committed to the energy market. When implemented, the apparatuses and methods described herein may allow the energy customer to generate an amount of energy-related revenue over a time period that an amount of capacity of the energy storage asset is committed to the energy market.

In a non-limiting example, an apparatus or a method described herein can be used to generate an operating schedule for a controller that communicates with the energy storage asset. The controller is capable of exercising an amount of control over the rate of charging or energy generation of the energy storage asset. As a result, the controller can be used to maintain the state of charge of the energy storage asset, or change its state of charge controllably. Operation of the controller, and hence the energy storage asset, according to the operating schedule generated by an apparatus or a method herein over the time period may make available to the energy customer an amount of energy-related revenue based at least in part on a wholesale electricity market.

Figure 2:
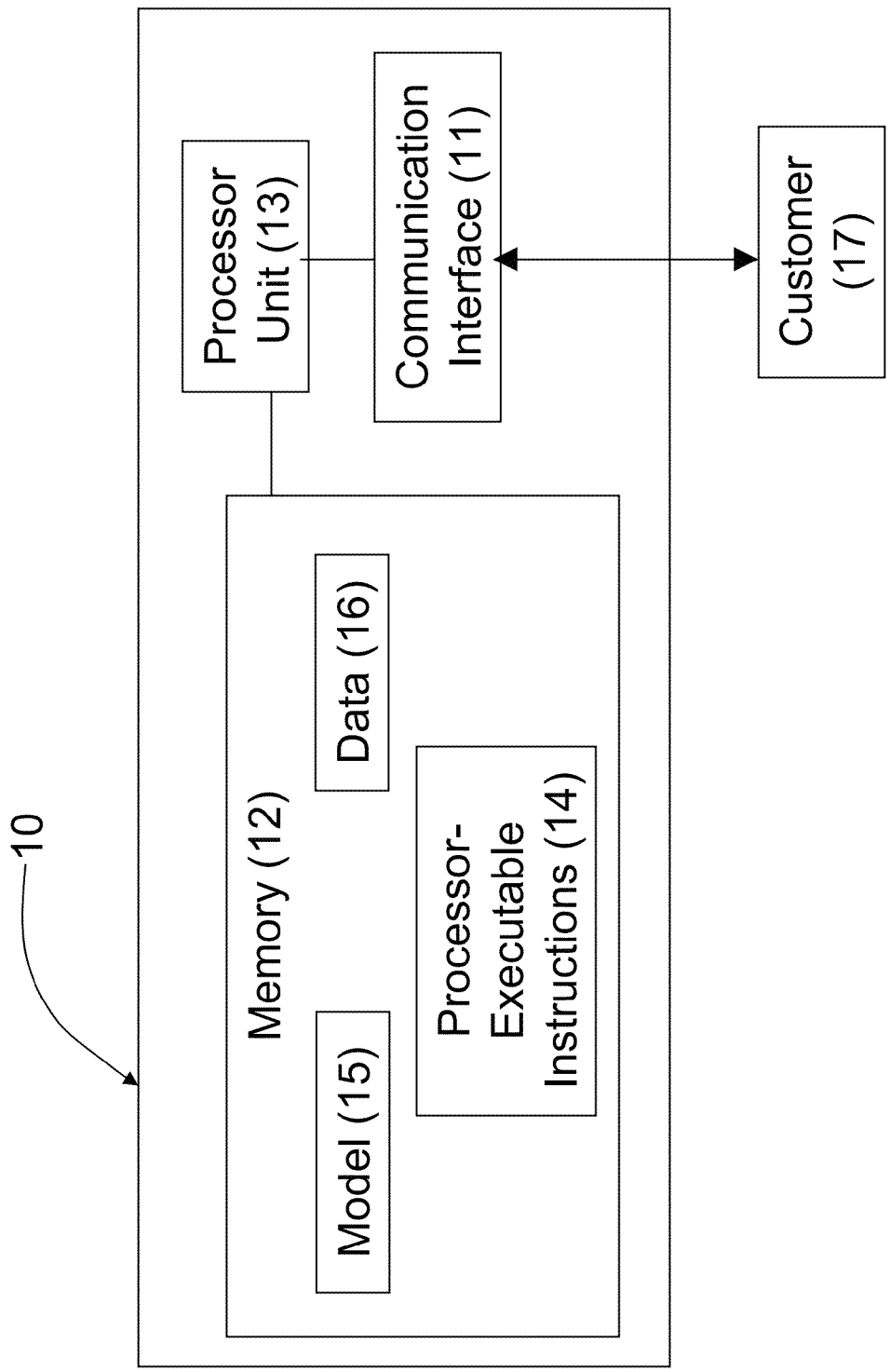
FIG. 2 shows an example apparatus according to a principle described herein.

A non-limiting example of the apparatus 10 according to the principles described herein is illustrated in FIG. 2. The apparatus 10 includes at least one communication interface 11, at least one memory 12, and at least one processing unit 13. The at least one processing unit 13 is communicatively coupled to the at least one communication interface 11 and the at least one memory 12.

The at least one memory 12 is configured to store processor-executable instructions 14 and a mathematical model 15 for the at least one energy storage asset. As described in greater detail below, the mathematical model determines the operating schedule for the controller based on data 16 associated with parameters, including but not limited to, an operation characteristic of the energy storage asset, an operation characteristic of an energy consuming asset in communication with the energy storage asset and a forecast wholesale electricity price associated with the wholesale electricity market.

In a non-limiting example, the at least one processing unit 13 executes the processor-executable instructions 14 stored in the memory 12 at least to determine the operating schedule for the controller of the energy storage asset using the mathematical model 15. The at least one processing unit 13 also executes processor-executable instructions 14 to control the communication interface 11 to transmit to the energy customer 17 the operating schedule that has been determined for the controller and/or controls the memory 12 to store the determined operating schedule for the controller. In a non-limiting example, the processing unit 13 may execute processor-executable instructions 14 to control the communication interface 11 to transmit to the operating schedule directly to the controller.

The operation characteristic of the energy storage asset may be its state of charge, charge rate, the degree of non-linearity of the charge rate, discharge rate, degree of non-linearity of the discharge rate, round trip efficiency, and degree of life reduction. In an example where the operation characteristic of the energy storage asset is its charge rate and/or discharge rate, the operating schedule for the controller may include suggested different time intervals for charging the energy storage asset or discharging the energy storage asset during the time period T that the system is in operation. As a non-limiting example, the operating schedule for the controller may indicate a time interval for charging the energy storage asset that coincides with a corresponding time interval during which the forecast wholesale electricity price falls below a predetermined threshold value. As another non-limiting example, the operating schedule for the controller may indicate a time interval of discharging the energy storage asset that coincides with a corresponding time interval during which the forecast wholesale electricity price exceeds a predetermined threshold value.

The operation characteristic of the energy consuming asset may be its load use schedule. For example, the operation characteristic of the energy consuming asset can be its energy consumption profile as a function of time. The energy consuming asset may be a controllable asset or a fixed-load asset. A fixed-load asset is an energy consuming asset whose energy consumption characteristics may not be readily modified, even if it varies over time. The energy consumption characteristics of a controllable energy consuming asset may be modified by changing parameters of operation of the system. A non-limiting example of an operation characteristic for a controllable energy consuming asset is its set point. The set point may be a controllable set point, e.g., it may be controllable as a function of time or temperature. For example, where the controllable energy consuming asset is a building with a variable internal temperature controlled by a heating, ventilation and air conditioning (HVAC) system, the operation characteristic may be a temperature set point for the HVAC system.

As described herein, in an example, an amount of energy of the energy storage asset may be generated and supplied to the power line at a discharge rate to generate energy-related revenue for the energy customer in an energy market. The energy-related revenue can depend on a forecast wholesale electricity price associated with the wholesale electricity market, and may be determined based on computation of a net-energy related cost. The net energy related cost may be computed based on the supply costs for supplying electricity to the customer and a demand response revenue. An apparatus and method herein can be implemented to generate an operating schedule for the controller of the energy storage asset that provides recommendations for the timing of charging and discharging of the energy storage asset.

In an example, the processing unit can be configured to determine the operating schedule for the controller of the at least one energy storage asset using the mathematical model by minimizing a net energy-related cost over the relevant time period (7). The net energy-related cost can be associated with electricity generation by the energy storage asset, electricity consumption by the energy storage asset, and electricity consumption by the energy consuming asset. Here, the energy-related revenue available to the energy customer may be computed based at least in part on the minimized net energy-related cost.

The net energy-related cost may be specified as a difference between the electricity supply cost and the economic demand response revenue over the pertinent time period.

In an example, the processing unit can be configured to determine the operating schedule for the controller using the mathematical model and a representative customer baseline (CBL) energy profile for the energy consuming asset over the time period (7). As used herein, the term "representative customer baseline energy profile" or "representative CBL energy profile" encompasses representations of the energy customer's energy usage in the absence of change of behavior according to the principles described herein. As non-limiting examples, the "representative customer baseline energy profile" or "representative CBL energy profile" includes an estimation based on the energy customer's business-as-usual (BAU) operations, including any form of averaged or weighted measure based on measures of historical BAU operations. Herein, the representative CBL energy profile represents a typical operation of the at least one energy consuming asset by the energy customer. For example, where the energy consuming asset is a fixed-load asset, the representative CBL may be determined as the energy consumption profile for the energy consuming asset.

Where the operating schedule for the controller is generated based on using the mathematical model and a representative customer baseline (CBL) energy profile, the economic demand response revenue may be computed based on the forecast wholesale electricity price, the electricity generation by the energy storage asset, the electricity consumption by the energy storage asset, and the representative CBL energy profile for the energy consuming asset.

In an example herein, a portion of the energy of the energy storage asset may be committed to the regulation market. That is, the wholesale electricity market for the energy customer would include an energy market and a regulation market. In an example where the forecast wholesale electricity price is for the energy market, the operating schedule for the controller may specify optimal time intervals for use of the energy storage asset in the regulation market. For example, if the forecast wholesale electricity price for the energy market is projected to fall below a predetermined threshold value during a time interval, the operating schedule for the controller may recommend of the energy storage asset in the regulation market during that time interval. Where the forecast wholesale electricity price for the energy market is projected to fall below a predetermined threshold value during a time interval, the operating schedule for the controller may recommend use of the energy storage asset in the regulation market during that time interval.

According to an example of the principles herein, the wholesale electricity market may include both the energy market and the regulation market, and the operating schedule generated may facilitate implementation of the energy storage asset in both the energy market and the regulation market. According to a principle of virtual partitioning described herein, the operating schedule for the controller may be configured so that the energy customer may participate in both the energy market and the regulation market concurrently the energy storage asset. In a non-limiting example, the operating schedule for the controller of the energy storage asset may specify that, during a given time interval, a first portion of an available state of charge (SOC) of the energy storage asset may be used in the energy market and a second portion of the available SOC of the energy storage asset may be committed to the regulation market. The operating schedule generate for the controller may be used to energy-related revenue for the energy consumer based on both the energy market and the regulation market. The principles and implementations described above in connection to FIG. 1 are also applicable to a system operating according to the principles of virtual partitioning.

The apparatus 10 illustrated in FIG. 2 may be used to implement the virtual partitioning described herein. In this non-limiting example, the at least one memory 12 is configured to store processor-executable instructions 14 and a mathematical model 15 for the at least one energy storage asset, where the mathematical model determines the operating schedule for the controller based on data 16 associated with parameters, including but not limited to, an operation characteristic of the energy storage asset, an operation characteristic of the energy consuming asset in communication with the at least one energy storage asset, and a forecast wholesale electricity price associated with the wholesale electricity market.

In this non-limiting example of virtual partitioning, the at least one processing unit 13 executes the processor-executable instructions 14 stored in the memory 12 at least to determine the operating schedule for the controller of the energy storage asset using the mathematical model 15, where the operating schedule specifies, during a time interval less than time period T, a proportion of an available state of charge (SOC) of the energy storage asset for use in the energy market and a remaining proportion of the available SOC of the energy storage asset for use in the regulation market. The at least one processing unit 13 also executes processor-executable instructions 14 to control the communication interface 11 to transmit to the energy customer 17 the operating schedule that has been determined for the controller and/or controls the memory 12 to store the determined operating schedule for the controller. In a non-limiting example, the processing unit 13 may execute processor-executable instructions 14 to control the communication interface 11 to transmit to the operating schedule directly to the controller.

In a non-limiting example, the operation characteristic of the at least one energy storage asset can be at least one of a state of charge, a charge rate, a degree of non-linearity of charge rate a discharge rate, a degree of non-linearity of discharge rate, a round trip efficiency, and a degree of life reduction. The proportion of the available SOC of the energy storage asset for use in the energy market may be supplied as a direct-current (DC) signal, while the remaining proportion of the available SOC of the energy storage asset for use in the regulation market may be delivered at a variable charge rate or variable discharge rate.

In an example where the energy storage asset is used in both the energy market and the regulation market, constraints may be placed on the total amount of energy used. For example, the total SOC of the energy storage asset over the time that it is used in both markets can be constrained to be depleted to no less than a minimum allowed SOC value or charged to no more than a maximal allowed SOC value. In an example, the sum of the proportion of the available SOC of the at least one energy storage asset for use in the energy market and the remaining proportion of the available SOC of the at least one energy storage asset for use in the regulation market can be constrained to be no less than a minimal allowed SOC and no more than a maximal allowed SOC. As a non-limiting example, the maximal allowed SOC of the energy storage asset may be set at 80%, and the minimal allowed SOC may be set at 20%.

Figure 3:
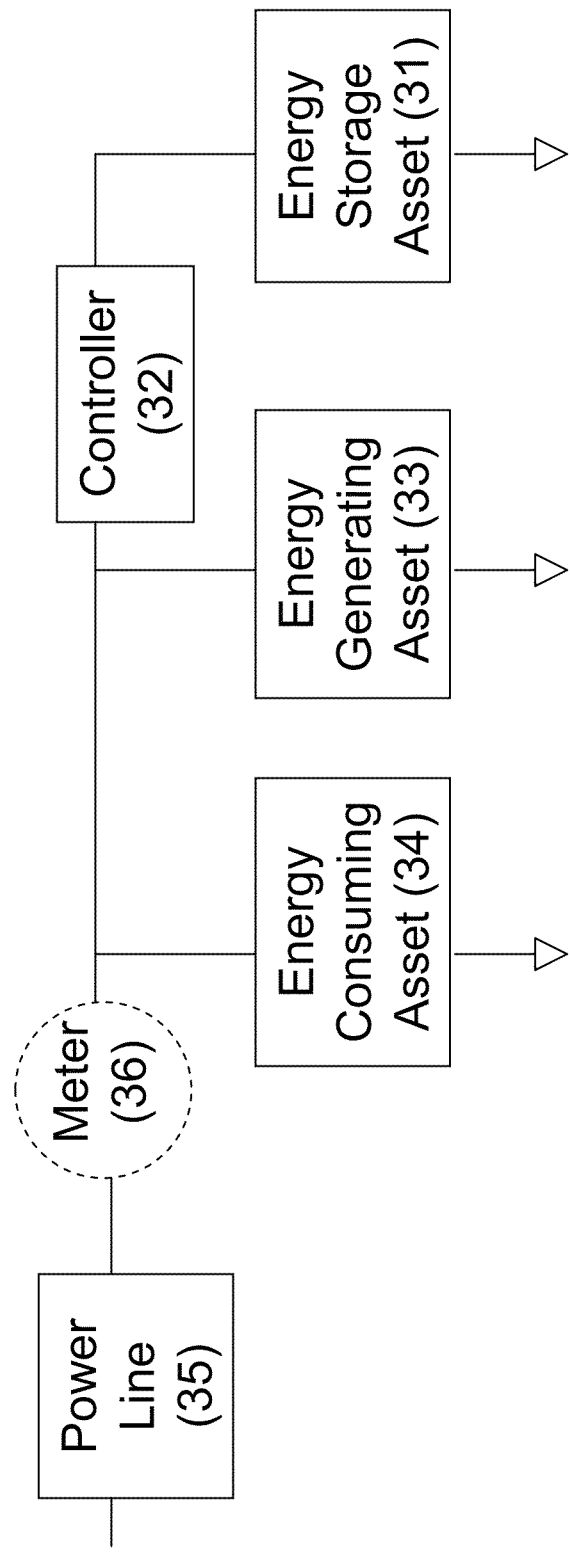
FIG. 3 shows an example system that includes an energy storage asset, a controller, an energy generating asset, and an energy consuming asset, according to a principle described herein.

The apparatuses and methods described herein are also applicable to a system as depicted in the example of FIG. 3. In this example, the apparatus includes an energy storage asset 31, a controller 32 in communication with the energy storage asset 31, an energy generating asset 33 and an energy consuming asset 34 in communication with a power line 35. The controller 32 in communication with the energy storage asset 31 facilitates charging of the energy storage asset 31 using the electricity supplied by power line 35. The controller 32 also facilitates feeding power generated by a discharge of the energy storage asset 31 to the power line 35. Non-limiting examples of energy generating assets include photovoltaic cells, fuel cells, gas turbines, diesel generators, flywheels, electric vehicles, and wind turbines. As depicted in the non-limiting example of FIG. 1, the controller 32, the energy storage asset 31, the energy generating asset 33, and the energy consuming asset 34 may be located behind a power meter 35. For example, all of the controller 32, the energy storage asset 31, the energy generating asset 33, and the energy consuming asset 34 may be located at one or more facilities of the energy consumer.

In the non-limiting example of FIG. 3, the controller 32 facilitates the communication between the energy consuming asset, the energy storage asset, and the energy generating asset. In other examples, the energy consuming asset may communicate with the energy storage asset via one or more other components including the controller 32.

An apparatus according to the principles of FIG. 2 may be implemented relative to the system of FIG. 3 to generate an operating schedule for the controller 32. In this example, the mathematical model facilitates determination of the operating schedule for the controller of the at least one energy storage asset further based at least in part on an expected energy-generating schedule of the energy generating asset in communication with the energy storage asset and the energy consuming asset. Any principles and/or implementations described herein, including above, in connection with FIG. 1 are also applicable to the system of FIG. 3.

Figure 4:
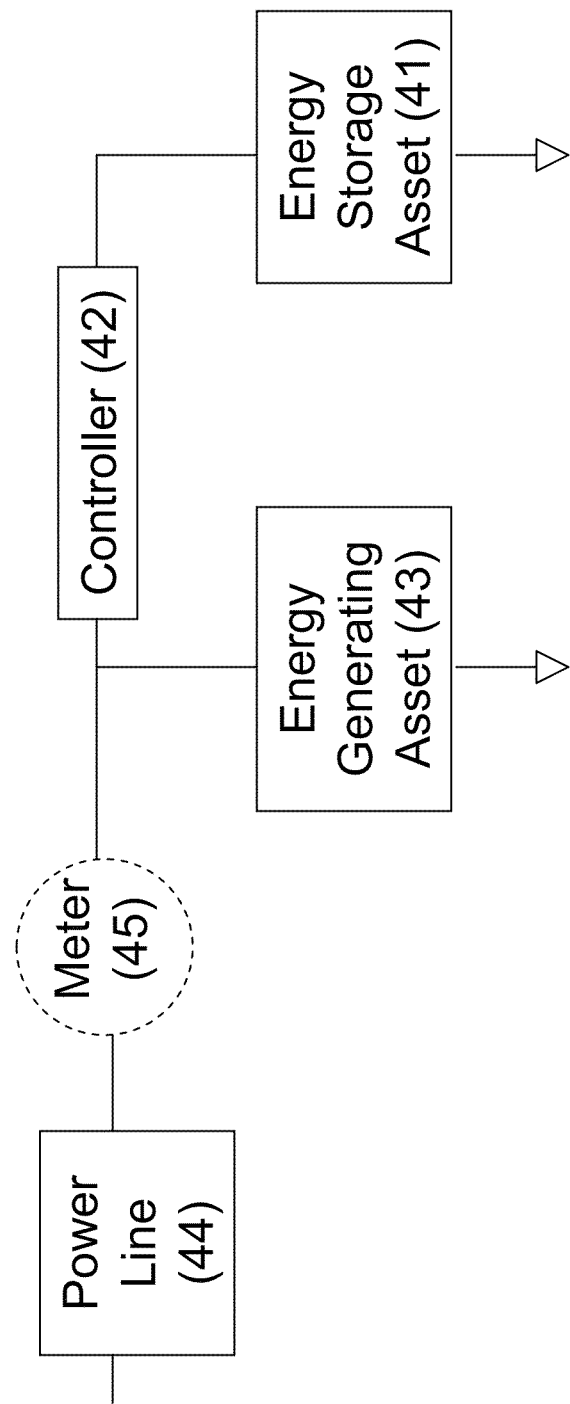
FIG. 4 shows an example system that includes an energy storage asset, a controller, and an energy generating asset, according to a principle described herein.

The apparatuses and methods described herein are also applicable to a system as depicted in the example of FIG. 4. In this example, the apparatus includes an energy storage asset 41, a controller 42 in communication with the energy storage asset 41, and an energy generating asset 43 in communication with a power line 44. The controller 42 facilitates charging of the energy storage asset 31 using the electricity supplied by power line 44. The controller 42 also facilitates feeding power generated by a discharge of the energy storage asset 41 to the power line 44. Non-limiting examples of energy generating assets include photovoltaic cells, fuel cells, gas turbines, diesel generators, flywheels, electric vehicles, and wind turbines. As depicted in the non-limiting example of FIG. 4, the controller 42, the energy storage asset 41, and the energy generating asset 43 may be located behind a power meter 45. For example, all of the controller 42, the energy storage asset 41, and the energy generating asset 33 may be located at one or more facilities of the energy consumer.

In the non-limiting example of FIG. 4, the controller 42 facilitates the communication between the energy storage asset and the energy generating asset. In other examples, the energy consuming asset may communicate with the energy storage asset via one or more other components including the controller 42.

An apparatus according to the principles of FIG. 2 may be implemented relative to the system of FIG. 4 to generate an operating schedule for the controller 42. In this example, the mathematical model facilitates determination of the operating schedule for the controller of the at least one energy storage asset further based at least in part on an expected energy-generating schedule of the energy generating asset in communication with the energy storage asset. Any principles and/or implementations described herein, including above, in connection with FIG. 1 are also applicable to the system of FIG. 4.

In a non-limiting example, the apparatus of FIG. 2 can be used for determining an operating schedule of a controller of at least one energy storage asset operated by an energy customer of an electricity supplier, so as to generate energy-related revenue, over a time period T, associated with operation of the at least one energy storage asset according to the operating schedule, wherein the energy-related revenue available to the energy customer over the time period T is based at least in part on a wholesale electricity market. In this example, the apparatus includes at least one communication interface, at least one memory to store processor-executable instructions and a mathematical model for the at least one energy storage asset, and at least one processing unit. The mathematical model facilitates determination of the operating schedule for the controller based at least in part on an operation characteristic of the at least one energy storage asset, an expected energy-generating schedule of the energy generating asset in communication with the energy storage asset, and a forecast wholesale electricity price associated with the wholesale electricity market. The at least one processing unit can be configured to determine the operating schedule for the controller of the at least one energy storage asset using the mathematical model, and control the at least one communication interface to transmit to the energy customer the operating schedule for the controller of the at least one energy storage asset and/or controls the at least one memory so as to store the determined operating schedule for the controller.

In this example, the at least one processing unit can be configured to determine the operating schedule for the controller of the at least one energy storage asset using the mathematical model by minimizing a net energy-related cost over the time period T. The net-energy related cost is based at least in part on the amount of energy generation by the at least one energy generating asset, electricity generation by the at least one energy storage asset; and electricity consumption by the at least one energy storage asset. The energy-related revenue available to the energy customer is based at least in part on the minimized net energy-related cost. The net energy-related cost may be specified as a difference between an electricity supply cost and an economic demand response revenue over the time period T. The energy generating asset may be a photovoltaic cell, a fuel cell, a gas turbine, a diesel generator, a flywheel, an electric vehicle, or a wind turbine. The operation characteristic of the at least one energy storage asset may be a state of charge, a charge rate, a degree of non-linearity of charge rate a discharge rate, a degree of non-linearity of discharge rate, a round trip efficiency, or a degree of life reduction.

In another non-limiting example, the apparatus of FIG. 2 can be used for determining an operating schedule of a controller of at least one energy storage asset operated by an energy customer of an electricity supplier, so as to generate energy-related revenue, over a time period T, associated with operation of the at least one energy storage asset according to the operating schedule. The energy-related revenue available to the energy customer over the time period T is based at least in part on a wholesale electricity market, and the wholesale electricity market includes an energy market and a regulation market. In this example, the apparatus includes at least one communication interface, at least one memory to store processor-executable instructions and a mathematical model for the at least one energy storage asset, and at least one processing unit. The mathematical model facilitates a determination of the operating schedule for the controller based at least in part on an operation characteristic of the at least one energy storage asset, an expected energy-generating schedule of an energy generating asset in communication with the energy storage asset, a forecast wholesale electricity price associated with the energy market, and a regulation price associated with the regulation market. The at least one processing unit is configured to determine the operating schedule for the controller of the at least one energy storage asset using the mathematical model by minimizing a net energy-related cost over the time period T. The net-energy related cost is based at least in part on the amount of energy generation by the at least one energy generating asset, duration of energy storage asset participation in the regulation market, electricity generation by the at least one energy storage asset and electricity consumption by the at least one energy storage asset. The energy-related revenue available to the energy customer is based at least in part on the minimized net energy-related cost. The operating schedule specifies, during a time interval within the time period T, a first portion of an available output of the controller for use in the energy market and a second portion of the available output of the controller for use for use in the regulation market. The at least one processing unit is also configured to control the at least one communication interface to transmit to the energy customer the operating schedule for the controller of the at least one energy storage asset and/or controls the at least one memory so as to store the determined operating schedule for the controller.

In this example, the available output of the controller may be a charge rate of the at least one energy storage asset or a discharge rate of the at least one energy storage asset. The net energy-related cost is specified as a difference between an electricity supply cost and an economic demand response revenue over the time period T. The operation characteristic of the at least one energy storage asset may be a state of charge, a charge rate, a degree of non-linearity of charge rate a discharge rate, a degree of non-linearity of discharge rate, a round trip efficiency, and a degree of life reduction.

Figure 5:
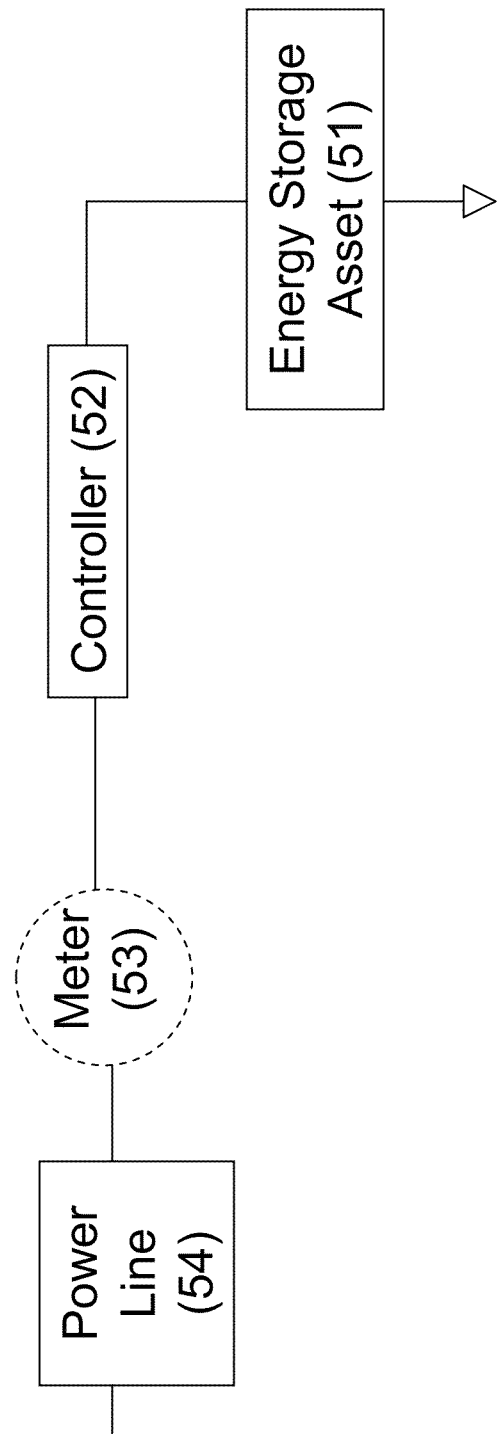
FIG. 5 shows an example system that includes an energy storage asset and a controller, according to a principle described herein.

The apparatuses and methods described herein are also applicable to a system as depicted in the example of FIG. 5. In this example, the apparatus includes an energy storage asset 51, and a controller 52 in communication with the energy storage asset 51 and in communication with a power line 54. The controller 52 facilitates charging of the energy storage asset 31 using the electricity supplied by power line 54. The controller 52 also facilitates feeding power generated by a discharge of the energy storage asset 51 to the power line 54. Non-limiting examples of energy generating assets include photovoltaic cells, fuel cells, gas turbines, diesel generators, flywheels, electric vehicles, and wind turbines. As depicted in the non-limiting example of FIG. 5, the controller 52, and the energy storage asset 51 may be located behind a power meter 53. For example, the controller 52 and the energy storage asset 51 may be located at one or more facilities of the energy consumer.

In the non-limiting example of FIG. 5, the controller 52 facilitates the communication between the energy storage asset and the energy generating asset. In other examples, the energy consuming asset may communicate with the energy storage asset via one or more other components including the controller 52.

An apparatus according to the principles of FIG. 2 may be implemented relative to the system of FIG. 5 to generate an operating schedule for the controller 52. In this example, the mathematical model facilitates determination of the operating schedule for the controller of the at least one energy storage asset further based at least in part on an expected energy-generating schedule of the energy generating asset in communication with the energy storage asset. Any principles and/or implementations described herein, including above, in connection with FIG. 1 are also applicable to the system of FIG. 5.

In another non-limiting example, the apparatus of FIG. 2 can be used for determining an operating schedule of a controller of at least one energy storage asset operated by an energy customer of an electricity supplier, so as to generate energy-related revenue, over a time period T, associated with operation of the at least one energy storage asset according to the operating schedule, wherein the energy-related revenue available to the energy customer over the time period T is based at least in part on a wholesale electricity market, and wherein the wholesale electricity market includes an energy market and a regulation market. The apparatus includes at least one communication interface, at least one memory to store processor-executable instructions and a mathematical model for the at least one energy storage asset, and at least one processing unit. The mathematical model facilitates a determination of the operating schedule for the controller of the at least one energy storage asset based at least in part on an operation characteristic of the at least one energy storage asset, a forecast wholesale electricity price associated with the energy market, and a regulation price associated with the regulation market. The at least one processing unit is configured to determine the operating schedule for the controller of the at least one energy storage asset using the mathematical model by minimizing a net energy-related cost over the time period T. The net-energy related cost is based at least in part on the duration of energy storage asset participation in the regulation market, electricity generation by the at least one energy storage asset, and electricity consumption by the at least one energy storage asset. The energy-related revenue available to the energy customer is based at least in part on the minimized net energy-related cost. The operating schedule specifies, during a time interval within the time period T, a first portion of an available output of the controller for use in the energy market and a second portion of the available output of the controller for use for use in the regulation market. The at least one processing unit is also configured to control the at least one communication interface to transmit to the energy customer the operating schedule for the controller of the at least one energy storage asset and/or controls the at least one memory so as to store the determined operating schedule for the controller.

In this example, the available output of the controller is a charge rate of the at least one energy storage asset or a discharge rate of the at least one energy storage asset. The net energy-related cost may be specified as a difference between an electricity supply cost and an economic demand response revenue over the time period T. The operation characteristic of the at least one energy storage asset is a state of charge, a charge rate, a degree of non-linearity of charge rate a discharge rate, a degree of non-linearity of discharge rate, a round trip efficiency, or a degree of life reduction.

Energy Asset Modeling

To facilitate the mathematical optimization process for generating a suggested operating schedule for one or more energy assets according to various examples of the principles herein, a mathematical model representing an energy customer's energy asset(s) is formulated and employed to simulate an "energy profile" for the asset(s). In one aspect, the model is essentially specified by one or more mathematical functions that at least in part represent physical attributes of the energy asset(s) themselves as they relate to electricity use and/or electricity generation. Depending on the energy asset(s) operated by the energy customer, the mathematical function(s) defining an asset model may represent a single energy asset or an aggregation of multiple energy assets operated by the customer. For purposes of the discussion herein, the term "asset model," unless otherwise qualified, is used generally to denote a model representing either a single energy asset or an aggregation of multiple energy assets.

To illustrate the general concept of an asset model, a model is first considered for one or more energy assets that not only may be turned "on" or "off," but that may be controlled at various "operating set points." For example, consider the case of a "building asset," e.g., one or more buildings including a heating, ventilation and air conditioning (HVAC) system for temperature control, for which the customer may choose different temperature set points at different times (e.g., thermostat settings); accordingly, in this example, the temperature set points constitute "operating set points" of the building asset. In this example, the magnitude of the operating set point may vary as a function of time t, in a continuous or step-wise manner (e.g., Temp(t)=72 degrees F. for 9 PM<t<9 AM; Temp(t)=68 degrees F. for 9 AM<t<9 PM). In other examples of energy assets that merely may be turned "on" or "off," the magnitude of the operating set point may be binary (i.e., on or off), but the respective on and off states may vary as a function of time t (e.g., over a given time period T).

Based on the notion of time-varying operating set points for energy assets, the term "operating schedule" as used herein refers to an operating set point of one or more energy assets as a function of time, and is denoted by the notation SP(t):

$SP(t)$=operating schedule for one or more energy assets.

Figure 6:
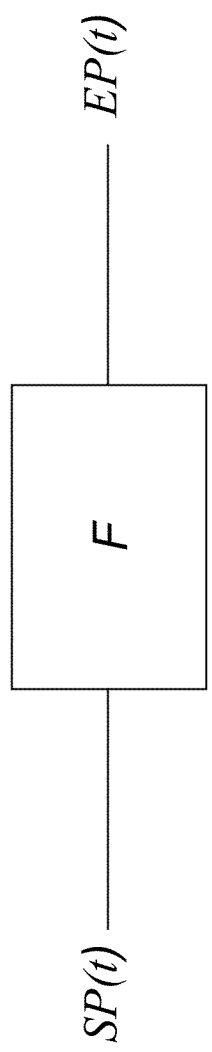
FIG. 6 illustrates an example block diagram representing an asset model according to a principle described herein.

The amount of energy used (and/or generated) by a particular asset or group of assets in a given time period T is referred to herein as an "energy profile." In various implementations discussed herein, the energy profile of one or more assets often depends at least in part on a given operating schedule SP(t) for the asset(s) during the time period T. For a fixed-load asset, the energy profile may not depend on a given operating schedule SP(t). Accordingly, an energy asset model specifies one or more mathematical functions for calculating an energy profile (i.e., electricity use and/or electricity generation as a function of time) for the asset(s), based on a proposed operating schedule for the asset(s) applied as an input to the model. The one or more functions constituting the asset model are denoted herein generally as F (and for simplicity the term "function" when referring to F may be used in the singular), and the model may be conceptually represented using mathematical notation as:

$$F(SP(t))=EP(t), \qquad \text{Eq. 1}$$

where the operating schedule SP(t) is an argument of the function F, and the energy profile of the modeled asset(s) as a function of time is denoted as EP(t). In a non-limiting example, EP(t) has units of MWh. FIG. 6 illustrates a simple block diagram representing the asset model given by Eq. 1.

In various examples, the function(s) F defining a particular asset model may be relatively simple or arbitrarily complex functions of the argument SP(t) (e.g., the function(s) may involve one or more constants, have multiple terms with respective coefficients, include terms of different orders, include differential equations, etc.) to reflect how the asset(s) consume or generate energy in response to the operating schedule SP(t). In general, the particular form of a given function F, and/or the coefficients for different terms, may be based at least in part on one or more physical attributes of the asset(s), and/or the environment in which the asset(s) is/are operated, which may impact the energy profile of the asset(s) pursuant to the operating schedule. More specifically, depending on the type of energy asset(s) being modeled, the mathematical model may be formulated to accept other inputs (in addition to the operating schedule SP(t)), and/or to accommodate variable parameters of a given function F (e.g., via time-dependent coefficients of different terms of the function), to facilitate calculation of the energy profile EP(t) based on a proposed operating schedule SP(t).

For example, in the case of the building asset discussed above, and/or other assets for which thermodynamic considerations are pertinent, various internal factors that may impact the asset's energy profile in general (e.g., building occupancy; a presence of equipment such as computers and other instrumentation that may affect heating or cooling in an environment; thermal inertia due to insulation, building materials, windows; etc.) may be considered in the formulation of the form of the function F itself, and/or coefficients for different terms of the function F. In some examples discussed in further detail below, the function F may be dynamically adjusted based on observing actual energy usage over time by the asset(s) pursuant to control via a particular operating schedule (i.e., coefficients of function terms initially may be estimated, and subsequently adjusted over time based on real-time feedback from controlled assets).

Figure 7:
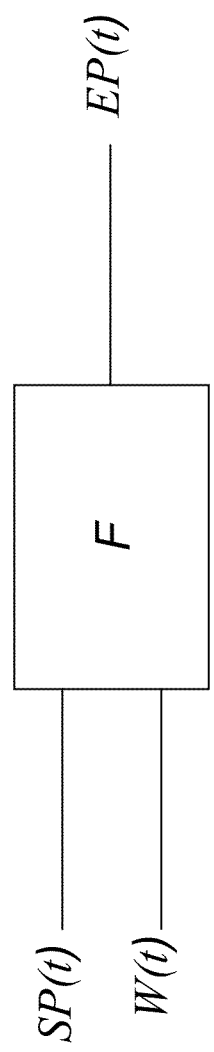
FIG. 7 illustrates an example block diagram representing another asset model according to a principle described herein.

Similarly, the mathematical model for the asset(s) may be configured to consider as an input to the model actual or forecast ambient environmental conditions (e.g., temperature, humidity, ambient light/cloud cover, etc.) as a function of time, collectively denoted as "weather information" W(t), which may impact the energy profile of one or more assets. In this case, the model may be conceptually represented as:

$$F(SP(t),W(t))=EP(t), \qquad \text{Eq. 2}$$

where both the operating schedule SP(t) and the weather information W(t) are arguments of the function F. FIG. 7 illustrates a simple block diagram representing the asset model given by Eq. 2. It should be appreciated that, while weather information W(t) is noted above as providing another possible input to the model in addition to the operating schedule SP(t), in other examples one or more other inputs to the model may be provided and considered as arguments to the function F (and accordingly taken into consideration in the function) for purposes of calculating an energy profile EP(t) for the asset(s).

In another example herein, the mathematical model for a system that includes a controllable asset, such as an energy storage asset and an associated controller, may be configured to consider as an input to the model the control vector for the controller as a function of time, denoted as $\underline{u}(t)$, which may impact the energy profile. In this case, the model may be conceptually represented as:

$$F(\underline{u}(t))=EP(t), \qquad \text{Eq. 3}$$

where both the control vector of the controller is an argument of the function F. FIG. 8 illustrates a simple block diagram representing the asset model given by Eq. 3. It should be appreciated that, while the control vector u(t) is noted above as providing input to the model, in other examples, one or more other inputs to the model may be provided and considered as arguments to the function F (and accordingly taken into consideration in the function) for purposes of calculating an energy profile EP(t) for the asset(s). An energy storage asset herein generally refers to an asset that can store a form of energy and release it as usable energy (or power) over time. Non-limiting examples of energy storage assets include batteries, ice units, compressed air, flywheel, heated liquids, and heated solids. Non-limiting examples of batteries include lithium ion batteries, lead-acid batteries, flow batteries, or dry cell technology batteries.

In yet another example herein, the mathematical model for a system that includes an energy consuming asset, such as but not limited to a building asset, and a controllable asset, such as but not limited to an energy storage asset and an associated controller, may be configured to consider as an input to the model the control vector for the controller as a function of time, denoted as $\underline{u}(t)$, and temperature dependent operating set points for the energy consuming asset (its operating schedule). In this case, the model may be conceptually represented as:

$$F(\underline{u}(t),SP(t))=EP(t), \qquad \text{Eq. 4}$$

where both the control vector of the function F. FIG. 9 illustrates a simple block diagram representing the asset model given by Eq. 4. The control vector for a controller, $\underline{u}(t)=C_t+D_t$, may be expressed as:

$$C_t=u_{1,t}*C/D_{max}$$

$$D_t=u_{2,t}*C/D_{max} \qquad \text{Eq. 5}$$

with the constraints that $u_{1,t}*u_{2,t}=0$ and $0 \le u_{1,t}, u_{2,t} \le 1$, where represents $C/D_{max}$ the maximum charge rate or discharge rate capacity of the controller in communication with the energy storage asset.

Figure 10:
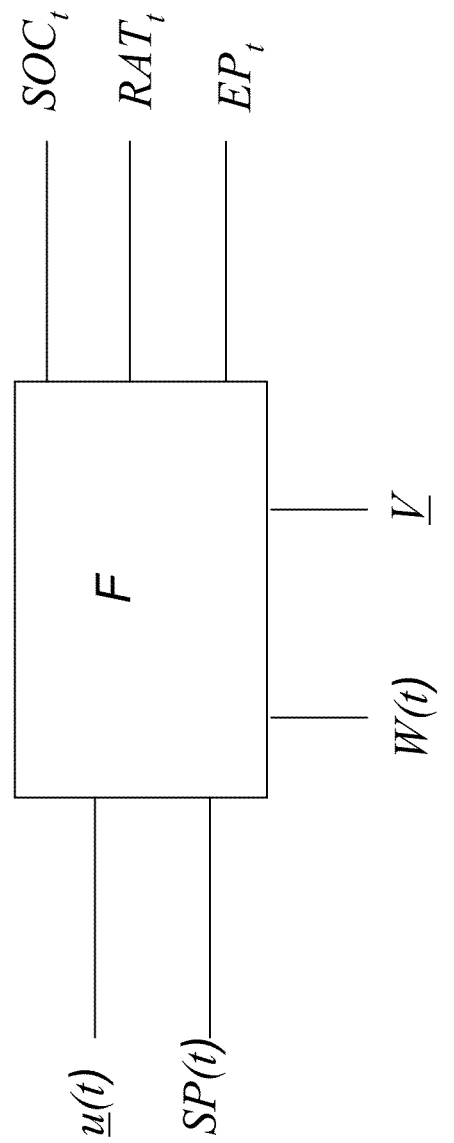
FIG. 10 illustrates an example block diagram representing another asset model according to a principle described herein.

In yet another example herein, the mathematical model for a system that includes an energy consuming asset, such as but not limited to a building asset, and a controllable asset, such as but not limited to an energy storage asset and an associated controller, may be configured to consider as an input to the model the control vector for the controller as a function of time, denoted as $\underline{u}(t)$, and temperature dependent operating set points for the energy consuming asset (its operating schedule). FIG. 10 illustrates a simple block diagram representing the asset model for such as system according to the principles herein. In this case, the model may have outputs of the state of charge (SOC) of the energy storage asset as a function of time t, the return-a-temperature (RAT) as a function of time t (for, e.g., a HVAC or other similar equipment), and the energy profile of the energy consuming asset (e.g., the building asset). Other inputs to the system can be weather information (W(t)) and/or feedback from other energy assets in the system ($\underline{V}$). This model can be used, e.g., for co-optimization of an energy storage asset and an energy consuming asset for the energy market.

In an example according to a principle herein, once an appropriate asset model is established for a given energy asset or group of energy assets, different candidate operating schedules may be applied to the model to simulate how the energy profile EP(t) of the asset(s) is affected as a function of time, over a given time period T, by the different operating schedules.

An example technique for facilitating determination of optimal operating schedule for energy cost reduction and/or revenue generation from wholesale electricity markets according to various examples disclosed herein is as follows. In this example, the system includes an energy consuming asset, a controller of the energy storage asset, and a controllable energy consuming asset. A plurality of first candidate operating schedules is selected for the controller, and a plurality of second candidate operating schedules is selected for the energy consuming asset. Each second candidate operating schedule for the energy consuming asset is different from the BAU operating schedule for the energy consuming asset. The plurality of first and second candidate operating schedules are successively applied to the mathematical model to generate corresponding plurality of simulated energy profiles for the energy storage asset and the energy consuming asset. A plurality of projected net energy-related costs to the energy customer are computed, where each projected net energy-related cost is computed based at least in part on the representative CBL energy profile and the simulated energy profiles corresponding to the respective first and second candidate operating schedules and the forecast wholesale electricity price. Respective ones of the first and second candidate operating schedules corresponding to one simulated energy profile of the plurality of simulated energy profiles that results in a minimum net energy-related cost of the plurality of net energy-related costs calculated are selected as an optimal first operating schedule and an optimal second operating schedule. That is, namely, this technique can be implemented to simulate how energy assets consume/generate electricity based on different candidate operating schedules for the asset(s), and to select a particular operating schedule that facilitates a particular economic goal of the energy customer.

In another example, the operating schedules for the energy storage asset and energy consuming asset can be calculated in tandem based on minimizing the net energy-related costs (NEC), as discussed in greater detail below.

Operating Schedules and Constraints

In considering various operating schedules SP(t) that may be applied to the asset model so as to simulate a corresponding energy profile EP(t), in some instances SP(t) may not be varied freely. Such limitations on candidate operating schedules may be due at least in part to physical limitations of the asset(s) being modeled, and/or limitations on operation of the asset(s) dictated by the energy customer itself. For example, in some instances the customer may want to constrain the range in which the magnitude of SP(t) may be varied at any given time, and/or the customer may wish to designate particular periods of time (e.g., within the given time period T of interest) during which particular values of SP(t) cannot be changed (or only changed in a limited manner).

For purposes of illustration, again consider a building asset with an HVAC system. The customer may specify that, in considering candidate operating schedules SP(t) for the building asset, temperature set points (i.e., the magnitude of SP(t) in this example) must remain in a range of from between 65 to 75 degrees F. in any proposed operating schedule; furthermore, the customer may dictate that during a certain time frame, the temperature set point may not exceed 70 degrees F. In general, magnitude and/or timing limitations placed on a candidate operating schedule SP(t) for one or more modeled assets are referred to herein as "constraints" on the operating schedule.

The concept of candidate operating schedules for one or more modeled energy assets subject to one or more "constraints" is denoted herein as:

$SP(t)|_{Constraints}$=operating schedule for one or more energy assets subject to constraints In an example, the system includes an energy storage asset, and constraint may be placed on the allowed state of charge (SOC) of the energy storage asset. For example, the constraint may be placed that the SOC does should not be allowed to fall below a minimal SOC value (i.e., not too depleted) and/or that the SOC does should not be allowed to go above a maximal SOC (i.e., not overly-charged).

Business-As-Usual (BAU) Conditions and Customer Baseline (CBL) Energy Profiles

Once an appropriate asset model is established for a given energy asset or group of energy assets, a particular operating schedule of interest in some examples is referred to herein as a "typical" or "business-as-usual" (BAU) operating schedule (also referred to herein as "BAU conditions"), denoted as $SP(t)_{BAU}$. In particular, "BAU conditions" refer to an operating schedule that an energy customer would typically adopt for its energy asset(s), absent the incentive to reduce energy costs and/or earn energy-related revenue from wholesale electricity markets. Again turning to the example of a building asset for purposes of illustration, absent any incentive to change its behavior, during a summer season in which cooling is desired an energy customer may typically set the thermostat (i.e., temperature set points) for the building asset at 72 degrees F. from 9 PM to 9 AM, and at 68 degrees F. from 9 AM to 9 PM; this can be represented conceptually using the notation adopted herein as:

$$SP(t)_{BAU} = \begin{Bmatrix} 72, & 9 \text{ PM} < t < 9 \text{ AM} \\ 68, & 9 \text{ AM} < t < 9 \text{ PM} \end{Bmatrix}.$$

When a typical operating schedule $SP(t)_{BAU}$ is applied to the asset model, the particular energy profile generated by the model is a special case referred to herein as a simulated "customer baseline" (CBL) energy profile, denoted as CBL (t). Using the example relationship given in Eq. 2 above (which includes consideration of weather information), the special case of a CBL energy profile may be conceptually represented mathematically as:

$$F(SP(t)_{BAU}, W(t))=CBL(t), \qquad \text{Eq. 6}$$

where the typical operating schedule $SP(t)_{BAU}$ is an argument of the function F (in this example together with the weather information W(t)), and the CBL energy profile of the modeled asset(s) as a function of time is denoted as CBL(t).

Although consideration of weather information W(t) is included in the example above, it should be appreciated that the simulation of a customer baseline (CBL) energy profile in other examples may not consider weather information (as such information may not be relevant to the energy profile of the asset(s) in question). It should also be appreciated that while the simulation of a CBL energy profile may be useful for mathematical optimization techniques employed in some examples to facilitate energy cost reduction and/or revenue generation from particular wholesale electricity markets (e.g., economic demand response "energy markets"), simulation of a CBL energy profile may not be applicable or necessary in other examples to facilitate energy cost reduction and/or revenue generation from wholesale electricity markets.

Objective Cost Functions and Optimal Control

For purposes of the present disclosure, an "objective cost function" specifies all energy-related costs and energy-related revenues associated with operating one or more modeled energy assets of an energy customer so as to achieve a particular economic goal (an economic "objective"). In one aspect, an objective cost function incorporates the function(s) F representing the mathematical model for one or more energy assets, and specifies an energy customer's "net energy-related cost" (e.g., in dollars) associated with operating the modeled asset(s) over a given time period T. The energy customer's net energy-related cost as given by the objective cost function is denoted herein as NEC$:

NEC$=net energy-related cost to operate one or more energy assets.

As discussed in greater detail below, objective cost functions providing a net energy-related cost NEC$ according to different examples may have a variety of respective cost and revenue terms, based at least in part on the types of asset(s) being operated and the particular revenue-generation objective(s) (e.g., the particular wholesale electricity market(s) from which revenue is being sought).

For example, in some examples, the energy-related costs included in the objective cost function may include "actual" energy-related costs (e.g., retail electricity costs, wholesale electricity costs representing revenue earned by the energy customer, etc.). In some examples, the energy-related costs included in the objective cost function additionally or alternatively may include "indirect" energy-related costs, such as convenience/comfort costs associated with the energy customer's adoption of a suggested operating schedule different than the BAU operating schedule (the convenience/comfort cost represents an "indirect" cost associated with a change in the customer's behavior with respect to operating its asset(s), based on the incentive of possible energy-related revenue from the wholesale electricity markets). In an example, energy-related costs included in the objective cost function may include reliability costs associated with voltage/VAR control in a microgrid application. Similarly, an objective cost function may include one or more terms specifying energy-related revenues corresponding to one or more wholesale electricity markets (e.g., "energy markets," "synchronized reserve," "regulation").

To provide a preliminary illustration of concepts germane to an objective cost function specifying a net energy-related cost NEC$, an example relating to economic demand response revenue from the wholesale electricity "energy markets" is first considered. To this end, retail electricity prices (i.e., what the energy customer pays a "utility" for electricity usage) and wholesale electricity-related product prices available to the energy customer respectively are denoted as:

Retail$($t$)=price of electricity from a retail electricity provider ("utility"); and Wholesale$($t$)=price of electricity-related product on applicable wholesale electricity market, where the retail electricity price Retail$(t) and the wholesale electricity-related product price Wholesale$(t) may vary independently of each other as a function of time. In an example, the units of the retail electricity price Retail$(t) and the wholesale electricity-related product price Wholesale$(t) are $/MWh.

The wholesale price Wholesale$(t) can be dictated by (e.g., based at least in part on) the "locational marginal price" (LMP) as a function of time, as noted above (see Background section). However, depending on a given wholesale electricity market and/or a particular electricity-related product in question, it should be appreciated that the wholesale price Wholesale$(t) may be based on other and/or additional factors. Also, practically speaking, wholesale prices are not continuous functions of time; rather, as discussed above, wholesale prices based on the LMP may be calculated periodically at specified nodes of the grid (e.g., every 5 minutes, every half-hour, every hour) depending on the particular market in which the energy customer is participating. Accordingly, it should be appreciated that Wholesale$(t) typically is a discrete function of time, with t having some periodicity (e.g., 5 minutes, 30 minutes, 60 minutes).

Given the notation above for retail and wholesale prices, the energy customer's modeled retail electricity costs (or "supply costs"), for operating one or more modeled electricity-consuming assets pursuant to a particular operating schedule SP(t) applied to an asset model, is denoted herein as Supply$(t), given by:

Supply$($t$)=EP($t$)*Retail$($t$), Eq. 7 wherein EP(t) is the energy profile of the modeled asset(s) (e.g., given by any of Eqs. 1-4 above).

For the energy storage asset, the energy customer's "supply costs" for charging the asset can be denoted herein as Supply$ $(t)_{ES}$, given by:

Supply$($t$)_{ES}=EP($t$)*Retail$($t$), Eq. 8 wherein EP(t) is the energy profile of the modeled energy storage asset(s). Since the energy profile for an energy storage asset can be represented based on a charge rate ($C_t$) for a time step (t<T) over the amount of time of charging ($\Delta t$), the supply costs can be expressed as:

Supply$($t$)_{ES}=C_t*\Delta t*Retail$($t$). Eq. 9

The charge rate ($C_t$) may be the maximum charge rate of the energy storage asset, or a charge rate less than the maximum charge rate. For example, in different examples herein, the output of the controller may modify the charge rate of the energy storage asset to values that are less than the maximum charge rate.

If the system includes an energy storage asset and an energy generating asset, the total supply costs can be expressed, in a non-limiting example, as the energy storage asset (Supply$(t)$_{ES}$) reduced by a cost amount based on the amount of energy provided by the energy generating asset ($EG_k$). In an example, the total supply costs can be expressed as:

Supply$($t$)_{total}=(C_k-EG_k)*\Delta t*Retail$($t$). Eq. 10

Supply costs may also apply to the system by virtue of an emissions cost associated with the operation of at least one of the energy assets. That is, the net-energy related cost can include a term based on the emissions costs (Emissions$) associated with, as non-limiting examples, the electricity consumption by an energy consuming asset or an emissions cost based on operation of an energy generating asset. The emissions costs can be associated with greenhouse gas emissions during operation of the system. Non-limiting examples of such emissions are $CO_x$ emissions (e.g., carbon monoxide and carbon dioxide emissions), $NO_x$ emissions (e.g., nitrogen dioxide and related pollutant emissions), $SO_x$ emissions (e.g., sulfur dioxide and related pollutant emissions), particulates, and methane ($CH_4$) and related pollutant emissions. In an example, the contribution to the supply costs (Supply$(t)) based on the emissions costs (Emissions$) may be computed based on an economic benefit, such as but not limited to a prorated amount of a penalty cost leveled due to an amount of emissions, over a time period T, associated with the operation of the at least one energy asset. The penalty cost may be in staged amounts. For example, a first penalty may be imposed for an amount of emissions above a first threshold value but below a second threshold emissions value, and a second (higher) penalty may be imposed for an amount of emissions above the second threshold emissions value. Such penalties may be leveled by a government agency (in a command-and-control program, a regulation program, or a voluntary program) or may be determined based on participation in a non-governmental voluntary emissions reduction program. In another example, the contribution to the supply costs based on the emissions costs may be computed based on a trading price of an emissions credit based on an amount of emissions, such as but not limited to a trading price of a carbon credit based on $CO_x$ emission (also an economic benefit). For example, trading on financial markets may be performed under the Kyoto Protocol. As another example, trading may occur under a U.S. regional emissions reduction program, such as but not limited to the Regional Greenhouse Gas Initiative (RGGI).

The contribution to the (Supply$(t)) based on the emissions costs (Emissions$) may be computed based on base emissions cost for a minimal level of operation of the energy asset(s), over time period T, and a marginal emissions cost per megawatt with each increase or decrease in megawatt of operation. In an example, the marginal emissions cost can be computed based on a change in the amount of emissions generated by an energy generating asset that is in communication with the at least one energy asset, associated with the increase or decrease in megawatt of operation. As a non-limiting example, where the energy generating asset is a diesel generator, the emissions costs can include a term representing the amount of emissions by virtue of use of diesel fuel. In an example, the marginal emissions cost can be computed based on a marginal supplier emissions cost associated with a change in electricity usage by the energy customer associated with the increase or decrease in megawatt of operation. The marginal supplier emissions cost can be quantified based on an amount of emissions from an electricity generating facility of the electricity supplier per megawatt-hour of electricity supplied. The marginal supplier emissions cost can very based on the type of electricity generation facility. As an example, the emissions from a coal-based electricity generation facility can be higher than the emissions from a hydro-power electricity generation facility or a gas-powered electricity generation facility. In this example, the marginal supplier emissions cost for a coal-based electricity generation facility for each incremental increase or decrease in megawatt-hour of electricity supplied can be higher than the marginal supplier emissions cost for a hydro-power electricity generation facility or the marginal supplier emissions cost for a gas-powered electricity generation facility.

The emissions costs (Emissions$) can be computed based on a change in the energy customer's behavior in reducing its electricity usage based on an operation of the at least one energy asset. For example, the emissions cost can be specified as a cost function based at least in part on at least one difference between the energy customer's behavior in reducing its usage of the energy asset(s) and their BAU operating schedule. In an example, the energy asset(s) can include at least one building having a variable internal temperature controlled by a HVAC system, and the emissions cost is based on a difference between a candidate temperature set point for the HVAC system as a function of time and the BAU temperature set point. The emissions cost can be computed as proportional to the magnitude of deviation of the temperature of the building from a BAU temperature set point.

Supply costs may also apply to the system by virtue of the reduction in life of the energy storage asset. An energy storage asset may have a limited life depending on its rating of expected charge/discharge cycles. A portion of the costs associated with ultimately replacing an energy storage asset at the end of its lifetime may be included in the supply costs based on the number of charge/discharge cycles it is expected to undergo when implemented in an energy market and/or a regulation market as described herein. The lifetime reduction supply costs may also depend on the number of kWh is used in each charge or discharge cycle, and/or for what length of time the energy storage asset is used in a market (energy, regulation, etc.). For example, the contribution to the supply costs based on the replacement cost (Replacement$) may be computed according to the expression:

$$\text{Supply}\$(t)_{LIFE} = \text{Replacement}\$/n \qquad \text{Eq. 11}$$

where n represents an effective number of charge/discharge cycles. The effective number of charge/discharge cycles can depend on the number of cycles the asset is expected to undergo when implemented in an energy market and/or a regulation market, the number of kWh is used in each charge or discharge cycle, and/or for what length of time the energy storage asset is used in a given market. This lifetime supply cost would be additive to any of the expressions for supply costs described herein for a system that includes an energy storage asset.

With respect to economic demand response revenue from the wholesale electricity energy markets, in the present example it is presumed that the energy customer is amenable to operating its energy asset(s) pursuant to a candidate operating schedule that is different than its "typical operating schedule" or BAU conditions (i.e., $SP(t)_{BAU}$), such that the energy profile EP(t) of the asset(s) will be on average lower than the customer baseline CBL(t) (see Eq. 6 and related description above). Altering the energy profile of the asset(s) with respect to the customer baseline, pursuant to a change in behavior represented by a candidate operating schedule different than BAU conditions, provides the source of opportunity for generating economic demand response revenue from the wholesale electricity energy markets. Accordingly, a wholesale electricity energy market "demand response revenue," denoted herein as $DR\$(t)_{EM}$, is given generally by:

$$DR\$(t)_{EM} = \max\{0, [(CBL(t) - EP(t))*\text{Wholesale}\$(t)]\}. \qquad \text{Eq. 12}$$

In an example, the DR$(t) represents the net difference between actual net metered load and the BAU load. The participation of any component of the energy asset in the energy market, regulation market or spinning reserve market is included in the computation of DR$(t) to the extent they affect the value of the metered load. In addition, the energy generated by any energy generating asset that is part of the energy asset may also be included in the computation of DR$(t) to the extent this behind-the-meter generated energy affects the value of the metered load.

For an energy storage asset in an energy market, a demand response revenue may be denoted herein as $DR\$(t)_{ES}$, is given generally by:

$$DR\$(t)_{ES} = (0 - (-(D_t))) * \Delta t * \text{Wholesale}\$(t). \qquad \text{Eq. 13}$$

As described herein, a system that includes an energy storage asset can participate in both an energy market (at a price of Wholesale$(t)) and in a regulation market (at a price of regulation$(t)). In this example, the demand response revenue may be computed herein as $DR\$(t)_{ES}$, denoted by:

$$DR\$(t)_{ES} = (\epsilon D_t) * \Delta t * \text{Wholesale}\$(t) + (\gamma D_t) * \Delta t * \text{regulation}\$(t) \qquad \text{Eq. 14}$$

where $D_t$ denotes the discharge rate of the energy storage asset at a time step. Where the system participates in the energy market and the regulation market at different points in time during overall time period T, both multipliers of the discharge rate, $\epsilon$ and $\gamma$, may be equal to 1. In different examples herein, the output of the controller may modify the discharge rate of the energy storage asset to values that are less than the maximum discharge rate. Using the principles of virtual partitioning described herein, by apportioning an output of the controller in communication with the energy storage asset, a portion of the discharge rate may be directed to the regulation market and another portion directed to the energy market during a given time step. As a non-limiting example, the operating schedule determined as described herein may cause the controller to discharge the energy storage asset at a discharge rate of $\epsilon D_t$ to the energy market, while concurrently respond to the regulation market at a discharge rate of $\gamma D_t$ along shorter timescales (such as but not limited to at 2-second intervals or minute-by-minute time intervals). Here, the constraint on the values may be $\epsilon + \gamma \leq 1$ if $D_t$ represents the maximum discharge rate of the energy storage asset.

In a non-limiting example, where the regulation price is not based on the discharge rate, but rather depends only on the time period of commitment of the energy storage asset to the regulation market, the demand response revenue may be computed as:

$$DR\$(t)_{ES} = (\epsilon D_t) * \Delta t * \text{Wholesale}\$(t) + \text{regulation}\$(t) * \Delta t \qquad \text{Eq. 15}$$

In another example, the demand response revenue for a system that includes an energy storage asset and an energy generating asset participating in an energy market may be computed as:

$$DR\$(t)_{ES+EG} = (D_t))*\Delta t*\text{Wholesale}\$(t) + (E_{EG})*\text{Wholesale}\$(t) \quad \text{Eq. 16}$$

where $D_t$ denotes the discharge rate of the energy storage asset at a time step and $E_{EG}$ denotes the energy provided by the energy generating asset.

According to the principles described herein, a demand response may also be generated for a system that includes an energy storage asset and an energy generating asset participating in both an energy market and a regulation market.

Based on the equations for supply costs and demand response above, an example of an objective cost function to provide a net energy-related cost NEC$ over a given time period T for operating the modeled asset(s), considering both retail electricity supply costs and demand response revenue can be computed based on the expression:

$$NEC\$ = \sum_t^T (\text{Supply}\$(t) - DR\$(t)). \quad \text{Eq. 17}$$

In one example, an objective cost function as exemplified by Eq. 17 may be provided to an optimizer (a particularly-programmed processor, also referred to as a "solver"; such as processor unit 13 of FIG. 2) that implements a mathematical optimization process to determine a suggested operating schedule for the energy asset(s) over the time period T that minimizes the net energy-related cost NEC$. Accordingly, the optimizer solves for:

$$\text{Min}\left[\sum_t^T (\text{Supply}\$(t) - DR\$(t))\right] \quad \text{Eq. 18}$$

By substituting the pertinent equations for supply costs and demand response (which depends on the energy assets in a given system) back into Eq. 18, the various informational inputs provided to the optimizer may be readily ascertained.

As a non-limiting example, for a system that is participating in the energy market, the various informational inputs provided to the optimizer may be readily ascertained as follows:

$$\text{Min}\left[\sum_t^T \{(EP(t)*\text{Retail}\$(t)) - (\max\{0, [(CBL(t) - EP(t))*\text{Wholesale}\$(t)]\})\}\right], \quad \text{Eq. 19}$$

where from Eq. 2

$$EP(t) = F(SP(t)|_{Constraints}, W(t)),$$

and from Eq. 6

$$CBL(t) = F(SP(t)_{BAU}, W(t)),$$

where again it is presumed for purposes of illustration that weather information W(t) is relevant in the present example. From the foregoing, it may be seen that one or more of the following inputs may be provided to the optimizer in various examples:

F—one or more functions defining the mathematical model for the energy asset(s);
$SP(t)_{BAU}$—BAU or "typical" operating schedule for the energy asset(s);
Constraints—any timing and/or magnitude constraints placed on candidate operating schedules for the energy asset(s);
W(t)—weather information as a function of time (if appropriate given the type of energy asset(s) being operated);
u(t)—control vector for the controller in communication with the energy storage asset;
Retail$(t)—retail price of electricity as a function of time;
Wholesale$(t)—wholesale price of electricity-related product as a function of time;
Regulation$(t)—regulation price in regulation market as a function of time; and
NEC$—the objective cost function describing the energy customer's net energy-related cost associated with operating the modeled energy asset(s).

Based on the foregoing inputs, the optimizer solves Eq. 19 by finding an "optimal" operating schedule for the energy asset(s), denoted herein as $SP(t)_{opt}$, that minimizes the net energy-related cost NEC$ to the energy customer:

$SP(t)_{opt}$="optimal" or suggested operating schedule for one or more energy assets In various implementations described herein, the optimizer may receive one or more inputs, including but not limited to, the weather information W(t), the retail electricity price Retail$(t), and the wholesale price of the electricity-related product Wholesale$(t) (and the regulation price (regulation$(t))) as forecasted values provided from a third-party source, for the time period T over which the optimization is being performed.

While a given optimizer in a particular implementation may employ various proprietary techniques to solve for the minimization of an objective cost function according to various examples of the principles herein, conceptually the optimization process may be generally understood as follows. In various implementations discussed herein, the optimizer generates the operating schedule using the model of the system through an optimal control procedure. In the various example implementations, the optimizer determines an optimal operating schedule over the defined time period (I) by optimizing an objective cost function. For example, the optimizer can be implemented to determine the operating schedule that generates the energy-related revenue by minimizing a function representing the net energy-related costs of the system over the time period (I). The net energy-related costs can be computed based on the supply costs and the demand response revenue as described herein, including in Eqts. 1-19 above. The optimizer optimizes the objective cost function over the entire defined time period (T) to generate the operating schedule. The generated operating schedule can include suggestions, for different specific time intervals within the overall time period T, for when the controller can be used to implement the energy storage asset in the energy market, in the regulation market, or in both the energy market and regulation market (through dynamic partitioning).

In a non-limiting example of an implementation of the optimizer, some number N of candidate operating schedules $SP(t)|_{Constraints}$ for the modeled asset(s) (together with weather information W(t), if appropriate based on a given objective function) can be successively applied to the asset model given by the function(s) F to generate simulated energy profiles EP(t) corresponding to the candidate operating schedules (see Eqs. 1-4). A net energy-related cost NEC$ given by the objective cost function is calculated for each such simulated energy profile EP(t) (see Eq. 17), and the candidate operating schedule that minimizes the objective cost function (i.e., the "optimal" operating schedule $SP(t)_{opt}$ that minimizes the net energy-related cost NEC$) is selected as the suggested operating schedule to be provided to the energy customer.

As noted earlier, the example above in connection with the objective cost function of Eq. 17 is based on actual energy-related costs (e.g., retail electricity cost) Supply$(t). In other examples, the energy-related costs included in a given objective cost function additionally or alternatively may include "indirect" energy-related costs, such as "convenience/comfort" costs associated with the energy customer's adoption of a suggested operating schedule $SP(t)_{opt}$ different than its typical operating schedule $SP(t)_{BAU}$. In one aspect of such examples, a convenience/comfort cost represents an "indirect" cost in that it does not necessarily relate to actual energy-related expenditures, but rather attributes some cost (e.g., in dollars) relating to a change in the customer's behavior with respect to operating its asset(s), based on the incentive of possible energy-related revenue from the wholesale electricity markets.

Accordingly, in some examples, an alternative objective cost function similar to that shown in Eq. 17 may be given as:

$$NEC\$ = \sum_{t}^{T} (Comfort\$(t) + Supply\$(t) - DR\$(t)),\qquad\text{Eq. 20}$$

where Comfort$(t) represents a convenience/comfort cost associated with a change in the energy customer's behavior with respect to operating its asset(s). In an example where the energy-related costs included in the objective cost function include reliability costs, they would be included in the computation (such as in Eq. 12) similarly to the Comfort$(t).

A convenience/comfort cost Comfort$(t) may be defined in any of a variety of manners according to different examples. For example, in one implementation, a convenience/comfort cost may be based at least in part on a difference (e.g., a "mathematical distance") between a given candidate operating schedule and the typical operating schedule (BAU conditions) for the modeled asset(s)—e.g., the greater the difference between the candidate operating schedule and the typical operating schedule, the higher the convenience/comfort cost (there may be more inconvenience/discomfort attributed to adopting a "larger" change in behavior). This may be conceptually represented by:

$$\text{Comfort\$}(t)=G[|SP(t)|_{Constraints}-SP(t)_{BAU}|],\qquad\text{Eq. 21}$$

where G specifies some function of the absolute value of the "difference" between a candidate operating schedule (e.g., in a given iteration of the optimization implemented by the optimizer) and the typical operating schedule.

To provide an example of how Eqs. 20 and 21 may be employed in an optimization process to determine a suggested operating schedule $SP(t)_{opt}$ for an energy customer according to one example, again consider a building asset operated by the energy customer, for which a given operating schedule SP(t) is constituted by a temperature set point as a function of time. If $T(t)_{BAU}$ represents the temperature set points constituting a typical operating schedule, and $T(t)|_{Constructs}$ represents different temperature set points constituting a candidate operating schedule that may be adopted to facilitate energy-cost reduction and/or revenue generation, the convenience/comfort cost Comfort$(t) in this example may be defined as a "temperature set point deviation" $T_{dev}(t)$, according to:

$$\text{Comfort\$}(t)\equiv T_{dev}(t)=A(|T(t)|_{Constraints}-T(t)_{BAU}|),\qquad\text{Eq. 22}$$

where A is a constant that converts temperature units to cost units (e.g., degrees F. to dollars). In an example, A may be adjustable for each individual time step, so A may be represented as a vector. Eq. 22 specifies that there is a greater "indirect" cost associated with candidate operating schedules having temperature set points that deviate more significantly from the typical temperature set points (albeit within the constraints provided by the energy customer). In this manner, as part of the optimization process, potential revenue from the wholesale electricity markets may be "tempered" to some extent by a perceived cost, included in the objective cost function (see Eq. 20), that is associated with the inconvenience/discomfort of deviating significantly from the typical operating schedule.

In the example above, although the multiplier A in Eq. 22 is discussed as a conversion constant, it should be appreciated that in other examples A may be an arbitrary function having as an argument the absolute value of the difference between a candidate operating schedule and the typical operating schedule as a function of time. More generally, it should be appreciated that a convenience/comfort cost Comfort$(t) is not limited to the "temperature-related" example provided above in connection with a building asset, and that other formulations of a convenience/comfort cost as part of an objective function are possible according to various examples of the principles herein.

In yet other examples of objective cost functions, different cost and revenue terms of a given objective cost function may include corresponding "weighting factors" (e.g., specified by the energy customer), so as to ascribe a relative importance to the energy customer of the respective terms of the objective cost function in arriving at a suggested operating schedule $SP(t)_{opt}$. For example, in some instances, an energy customer may want to emphasize the importance of increasing prospective demand response revenue DRS(t) vis a vis decreasing supply costs Supply$(t) in solving the optimization problem to arrive at a suggested operating schedule; similarly, in other instances, an energy customer may want to emphasize convenience/comfort costs Comfort$(t) vis a vis increasing prospective demand response revenue DR$(t) in solving the optimization problem to arrive at a suggested operating schedule. The ability of an energy customer to tailor a given objective cost function according to weighting factors for respective terms of the objective cost function provides an "elasticity" to the optimization process. Using the objective cost function given in Eq. 20 above as an example, in one example such weighting factors may be included in the specification of an objective cost function as respective term multipliers:

$$NEC\$ = \sum_{t}^{T} [(\alpha * Comfort\$(t)) + (\beta * Supply\$(t)) - (\gamma * DR\$(t))],\qquad\text{Eq. 23}$$

where $\alpha$, $\beta$, and $\gamma$ constitute the weighting factors. In an example, $\alpha+\beta+\gamma=1$. In another example, $\alpha+\beta+\gamma\neq 1$.

In another example, the value of a weighting factor may differ at various points during the day. For example, if it is preferred that the Comfort$(t) takes a bigger part in the objective cost function computation at certain points during the day, the factor $\alpha$ may be increased relative to the other weighting factors.

In an example, the comfort cost is attributed to a change in the energy customer's behavior in adopting the operating schedule, over the time period T, for the at least one energy asset in lieu of the BAU operating schedule. The comfort cost can be specified as a cost function based at least in part on at least one difference between the operating schedule and the BAU operating schedule. For example, the comfort cost can be based at least in part on a difference between the candidate temperature set point and the BAU temperature set point. In an example where the energy asset is a building, the change in the energy customer's behavior can be monitored based on a difference in a return-air-temperature of a section of the building as compared to a return-air-temperature with the BAU operating schedule. In an example, the comfort cost can be computed as proportional to a magnitude of deviation a temperature of the building from a BAU temperature set point. In another example, the comfort cost can be computed as proportional to a magnitude of deviation a humidity of the building from a BAU humidity set point.

In an example implementation, the operating schedule can be generated through applying an optimization using a net-energy related cost function based only on the energy market. The result of the optimization can be used to provide recommendation for time intervals for the energy customer to participate in the energy market, regulation market, or both the energy market and the regulation market. For example, based on the results of the optimization, the operating schedule may determine that any excess charge/discharge capacity of the controller of the energy storage system may be committed to the regulation market on an hour-by-hour basis. For example, it can be determined that the any excess charge/discharge capacity of the controller may be committed to the regulation market during the first 15 time intervals. The optimization may make such a determination depending on whether the forecast regulation price in the regulation market in this time interval offers opportunity for energy-related revenue during this time interval or if considered in the context of the global optimization over time period T. In an example, such a determination may be made depending on whether the SOC of the energy storage asset is feasible for its use in the regulation market. For example, it may be preferable for the energy storage asset to be near around a 50% SOC for it to be applicable to the regulation market. In addition, if it is decided to commit the energy storage asset to the regulation market for a time interval, e.g., for one or more 1-hour time intervals, the optimization described herein may be re-performed based on the new input state of the system. Such new inputs can include the state of charge of the energy storage asset after its commitment to the regulation market ends. In another non-limiting example, the optimization may evaluate different SOC initial inputs to assess whether "recovery" from the regulation market is feasible for later participation in the energy market.

In an example, a predetermined threshold value of wholesale electricity price can be set at which it is decided that the excess charge/discharge capacity of the controller will be committed to the regulation market. Based on the results of the optimization, a predetermined threshold value of the LMP price, indicated by the dashed horizontal line, may be set. In addition, it may be determined that the first time interval of charging the energy storage asset occurs during the time period that T coincides with the time interval during which the forecast wholesale electricity price falls below the predetermined threshold value. It may also be determined in the operating schedule that a second time interval of discharging the energy storage asset occurs coincides with a time interval during which the forecast wholesale electricity price exceed the predetermined threshold value.

While the discussion above of example objective cost functions and optimization of same to generate suggested operating schedules for energy assets has been based at least in part on economic demand response revenue from wholesale electricity energy markets (and in some particular examples involving building assets), it should be appreciated that the disclosure is not limited in this respect; namely, according to other examples, objective cost functions may be formulated and optimized to achieve a wide variety of energy-related objectives associated with different types of energy assets and revenue generation opportunities from wholesale electricity markets. For example, computation based on revenue from the regulation market has also been described herein above, and optimization based on the wholesale price and the regulation price are described herein below. In other examples, the principles herein can be applied to other markets, such as the spinning reserve market.

Generating an Operating Schedule for Deriving Energy-Related Revenue

As discussed above, the output of an optimization process to minimize an energy customer's net energy-related cost NEC$ (e.g., as specified by an objective cost function) is typically provided as a suggested operating schedule $SP(t)_{opt}$ for one or more energy assets. Generally speaking, the suggested operating schedule $SP(t)_{opt}$ may comprise one or more set point values as a function of time that take into consideration all of the energy customer's modeled and controllable energy assets.

For example, in some instances involving multiple individually modeled and controllable energy assets, the suggested operating schedule $SP(t)_{opt}$ may comprise multiple time-varying control signals respectively provided to corresponding controllers for the different energy assets. In other cases, the energy customer may have an energy management system (EMS) that oversees control of multiple energy assets, and the suggested operating schedule $SP(t)_{opt}$ may comprise a single control signal provided to the energy customer's EMS, which EMS in turn processes/interprets the single control signal representing the suggested operating schedule $SP(t)_{opt}$ to control respective energy assets.

In examples in which the energy customer normally operates its energy asset(s) according to a typical operating schedule $SP(t)_{BAU}$ (absent any economic incentive to change its energy-related behavior), the suggested operating schedule $SP(t)_{opt}$ may be conveyed to the energy customer in the form of one or more "bias signals," denoted herein by Bias(t). In particular, one or more bias signals Bias(t) may represent a difference between the suggested operating schedule and the typical operating schedule as a function of time, according to:

$$\text{Bias}(t)=SP(t)_{opt}-SP(t)_{BAU}. \qquad \text{Eq. 24}$$

Eq. 24 applies in certain cases. In a more general case, the Bias offsets the "demand level" over components of the energy asset. The bias signal (sent to a EMS) may cause controllers to take actions such as but not limited to load sheddings (including shutting off non-essential loads) and modifying the amount of energy used to push a train (e.g., out of a station) or to start a car of a carriage system.

In an example, in response to the bias signal is sent to the EMS, the EMS may make changes to operation settings of components of the energy asset.

Figure 11:
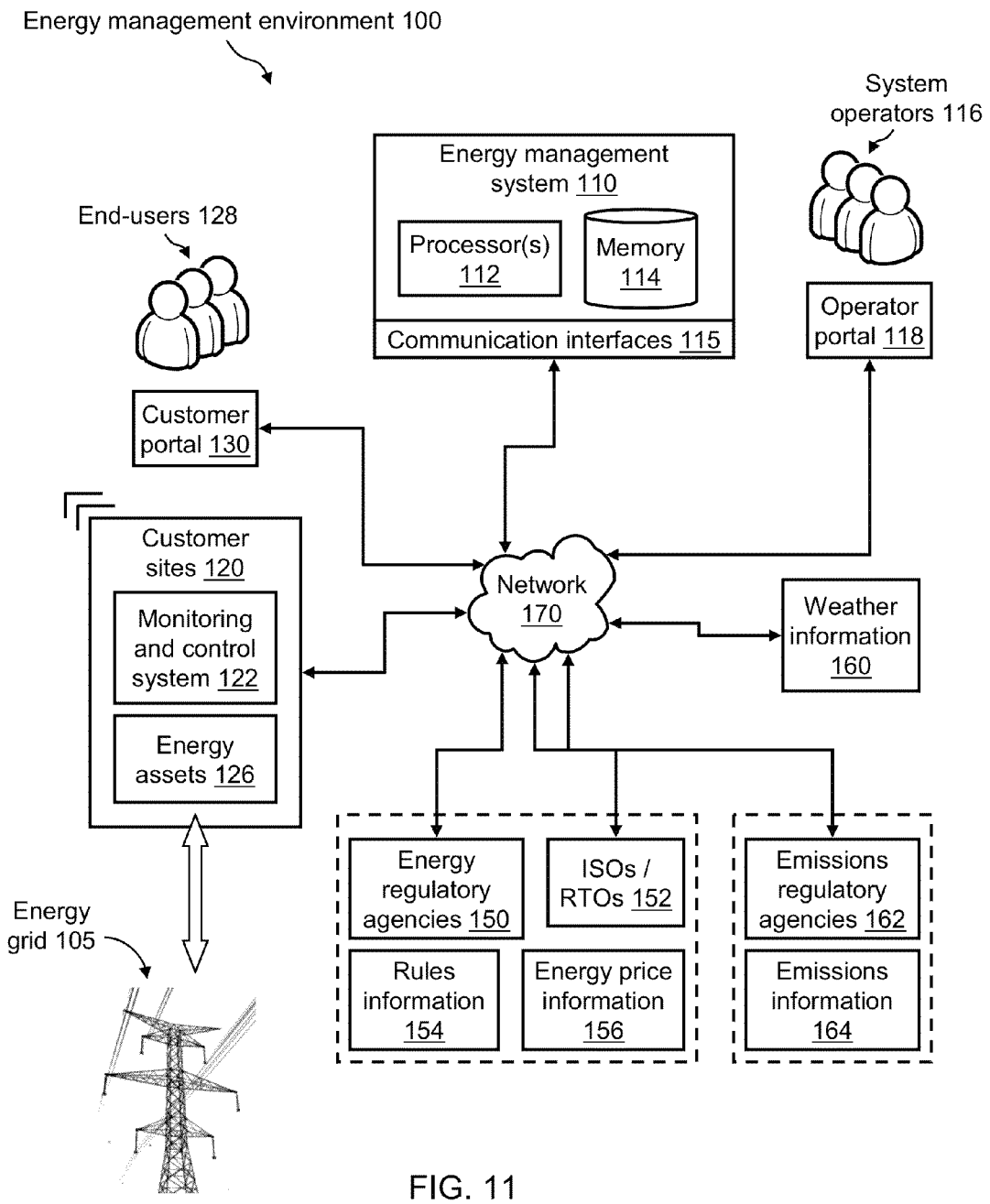
FIG. 11 illustrates a block diagram of an energy management environment that includes an energy management system to facilitate generation of revenue from wholesale electricity markets, according to a principle herein.

FIG. 11 illustrates a block diagram of an energy management environment 100 that includes an energy management system 110 to facilitate generation of revenue from energy markets, including wholesale electricity markets, according to the principles described herein. In FIG. 11, energy customers are the end-users and/or consumers of electricity supplied by a retail electricity supplier (via electricity grid 105). Additionally, some customers may have electricity generation capabilities for providing electricity back to the grid and/or for supplying electricity to the customers' own electricity-consuming assets.

Energy management system 110 may include one or more processors 112, one or more memory devices 114, and one or more communication interfaces 115. Processors 112 may be configured to execute software applications (e.g., processor-executable instructions stored in one or more memory devices 114), and/or work in tandem with other hardware components, for managing the overall operations of energy management system 110. In a service-oriented architecture (SOA), processors 112 may implement a variety of functionality for supporting the SOA. In one example, communication interfaces 115 may include a web interface and an enterprise service bus. Additional details regarding processors 112, memory 114, and communication interfaces 115 are described with reference to FIG. 12.

One or more system operators 116 may be associated with energy management system 110. System operators 116 may access energy management system 110 via an operator portal 118. Operator portal 118 is the user interface by which a system operator 116 may manage the process of creating an energy assets operating schedule. The optimized operating schedule covers a chosen period of time. Once an optimized operating schedule is transmitted to and accepted by the customer, in some examples operator portal 118 may be used by a system operator 116 for monitoring and/or controlling a customer's energy assets in real time.

Customer sites 120 and end-users (energy customers) 128 of energy management environment 100 represent the customers and/or consumers of the electricity supplied by retail electricity suppliers via the grid 105. Customer sites 120 may be any electricity-consuming and/or electricity-generating environments, such as, but not limited to, a building or group of buildings belonging to energy grid customers. End-users 128 may be any individuals associated with customer sites 120. Examples of end-users 128 may include building supervisors, company employees, company executives, and the like. Each customer site 120 may include one or more energy assets 126. Energy assets 126 may be any configuration of one or more energy usage assets, one or more energy storage assets, one or more energy generation assets, one or more renewable energy assets, and any combinations thereof. Groups of energy assets 126 and/or buildings associated with a certain customer site 120 may be in close physical proximity to each other or may be physically distant and even separated by time zones.

Examples of energy usage assets may include, but are not limited to, heating, ventilation, and air conditioning (HVAC) systems; chillers; ventilators; heaters; lighting; any electric powered equipment, and the like. Examples of energy storage assets may include, but are not limited to, electric storage mechanisms (e.g., batteries), thermal storage mechanisms (e.g., ice, hot water), compressed air storage mechanisms, and water pumped to storage containers for later generation. Examples of energy generation assets may include, but are not limited to, gas turbines, industrial diesel generators, and the like. Examples of renewable energy assets may include, but are not limited to, wind power generation, solar thermal generation, photovoltaic (PV) power generation, geothermal power generation, and the like. Accordingly, certain energy assets 126 may consume energy from energy grid 105, while other energy assets 126 may supply energy back to energy grid 105 and/or supply energy to the customer site 120's own energy assets 126.

A monitoring and control system 122 may be installed at each customer site 120. One example of monitoring and control system 122 is a building management system (BMS). Another example of monitoring and control system 122 is a building automation system (BAS). The main function of a BMS and BAS is to manage the environment within a building or group of buildings. For example, the BMS or BAS may control temperature, carbon dioxide levels, and humidity within a building via certain energy assets 126. In one example, an end-user 128 of a certain customer site 120 uses monitoring and control system 122 to monitor and/or manage the energy assets 126 thereof. Monitoring and control system 122 may be any commercially available BMS or BAS, such as those supplied by Johnson Controls, Inc (Milwaukee, Wis.), Automated Logic Corporation (Kennesaw, Ga.), and Honeywell International, Inc (Morristown, N.J.).

The web-based operator portal 118 and/or the web-based customer portal 130 may be accessed via any web-enabled device, such as, but not limited to, any desktop computer, laptop computer, tablet computer, net-book computing device, handheld computing device, personal digital assistant, enterprise digital assistant, portable digital assistant, cell phone, smart phone, and the like.

Additionally, energy management environment 100 may include any other entities that may be useful to (and communicate with from time to time, e.g., via network 170) energy management system 110 for operating, using, and/or controlling energy assets 126 of customer sites 120. Examples of other entities may include, but are not limited to, energy regulatory agencies 150 (e.g., FERC) and ISOs/RTOs 152. The energy regulatory agencies 150 and/or ISOs/RTOs 152 may be a source of any information that is useful to energy management system 110 for operating, using, and/or controlling energy assets 126 of customer sites 120. Examples of useful information sources may include, but are not limited to, rules information 154, and/or energy price information 156. Rules information 154 may be any rules, regulations, and/or guidelines according to any authorized entity related to the electric power industry, such as, but not limited to, energy regulatory agencies 150 and/or ISOs/RTOs 152.

In energy markets, mechanisms exist to facilitate energy trading. Certain energy trading may involve ISOs and RTOs. For example, ISOs/RTOs 152 may manage the price of energy that is generated and energy that is consumed on the grid using pricing principles that value the price of energy based on supply and demand. In this example, energy price information 156 may be any wholesale and/or retail electricity price information that is supplied by ISOs/RTOs 152, which is established on a regional basis. Additionally, energy price information 156 may be supplied by a third party service and/or calculated by energy management system 110. Further, certain energy price information 156 may be related to the day-ahead energy market, while different energy price information 156 may be related to the real-time energy market.

Energy price information 156 may be useful to an optimization function (not shown) of energy management system 110 with respect to reducing energy costs. For example, for a hot summer day scenario, if the optimization function determines from energy price information 156 that energy prices will be lowest in the morning and highest in the afternoon for a certain day, the output of the optimization function may indicate to cool a certain environment below its business as usual (or default) temperature in the morning and then allow the environment to rise above its business as usual (or default) temperature in the afternoon. The extra cooling in the morning may mitigate a certain amount of the reduced cooling that is allowed in the afternoon. In this scenario, certain energy assets 126 (e.g., HVAC assets) may be operating more in the morning when the energy prices are lowest and operating less in the afternoon when energy prices are highest. This is an example of the optimization function of energy management system 110 facilitating opportunities for reducing energy costs of a customer site 120.

In an example involving rechargeable batteries, which is an example of an energy storage asset, if the optimization function determines from energy price information 156 that energy prices will be lowest in the morning and highest in the afternoon for a certain day, the output of the optimization function may indicate to charge the batteries in the morning and to utilize (discharge) the energy from the batteries in the afternoon. This is another example of the optimization function of energy management system 110 facilitating opportunities for reducing energy costs of a customer site 120.

Additionally, energy price information 156 may be useful to the optimization function of energy management system 110 with respect to generating revenue from energy markets. For example, if the optimization function determines from energy price information 156 that energy prices will be lowest in the morning and highest in the afternoon for a certain day, the output of the optimization function may indicate to make the energy generation assets of a customer site 120 available to the grid in the afternoon. In this way, if the customer site 120 is able to supply energy back to the grid in the afternoon, the customer site 120 may receive revenue in the real-time energy market at a time of day when energy prices are highest. This is an example of the optimization function of energy management system 110 facilitating opportunities for a customer site 120 to increase revenue from energy markets.

Additionally, energy management environment 100 may include a source of weather information 160. In one example, weather information 160 may be information supplied by a third party service, such as, but not limited to, AWIS Weather Services, Inc. (Auburn, Ala.). In another example, weather information 160 may be information supplied by a national and/or regional weather service that may be accessed using the Internet via a network 170. Examples of weather websites may include, but are not limited to, the NOAA National Weather Service website (at nws.noaa.gov), the Weather Channel website (at weather.com), and the Weather Underground website (at wunderground.com).

Weather information 160 may be useful to the optimization function of energy management system 110 with respect to predicting the actual environmental conditions in a building or group of buildings. For example, the optimization function may factor in the delta between the outside temperature and inside temperature. Additionally, the optimization function may factor in the amount of cloudiness with respect to solar gain calculations. For example, the solar gain may be lowest on a cloudy day, highest on a day that is not cloudy, and anything in between.

Additionally, energy management environment 100 may include certain emissions regulatory agencies 162 that may be the source of certain emissions information 164. Emissions regulatory agencies 162 may be any federal, regional, state, and/or municipal regulatory bodies that facilitate emissions trading programs. In the United States, the Environmental Protection Agency (EPA) is an example of an emissions regulatory agency 162. In Europe, the European Union (EU) is an example of an emissions regulatory agency 162. Emissions information 164 may include emissions cap information, cost information for buying emissions credits, and/or price information for selling emissions credits. Additionally, emissions information 164 may include any published information about the local energy grid (e.g., energy grid 140) with respect to the emission of pollutants and/or greenhouse gases (GHG).

Emissions information 164 may be useful to the optimization function of energy management system 110 with respect to calculating the amount of emissions produced at any customer site 120 and/or by consuming energy from the local energy grid, determining opportunities for customer sites 120 to buy emissions credits, and/or determining opportunities for customer sites 120 to sell emissions credits.

Network 170 may be, for example, any local area network (LAN) and/or wide area network (WAN). Network 170 provides the communication link between any and/or all entities of energy management environment 100. For example, energy management system 110, operator portal 118, customer sites 120, customer portal 130, regulatory agencies 150, ISOs/RTOs 152 and/or emissions regulatory agencies 162 may be connected via network 170. Entities may connect to network 170 using any wired and/or wireless networking protocols. Additionally, rules information 154, energy price information 156, weather information 160, and/or emissions information 164 may be accessed via network 170.

Referring again to FIG. 11, energy management system 110 provides mechanisms by which the environment at each customer site 120, which includes one or more energy assets 126, is modeled and simulated to determine an energy assets operating schedule that is optimized with respect to reducing energy costs, reducing emissions costs, and/or generating revenue from energy markets. The modeling and simulation function may use information (e.g., attributes, specifications, etc) about energy assets 126, which may be in a building or group of buildings. In addition to information about energy assets 126, the modeling and simulation function may use other information, such as, but not limited to, building information; solar gain information; energy price information 156; weather information 160; and/or emissions information 164.

Once a model is created, the environmental conditions within the building or group of buildings of a certain customer site 120 may be simulated based on the input criteria of the model. The simulation results are then fed into an optimization function, which is a cost minimization function that includes a combination of multiple sub-functions, of energy management system 110 that processes the information and generates an optimized operating schedule, within a set of constraints. That is, the optimization function of energy management system 110 is used to create an operating schedule (for a chosen period of time) for energy assets 126 of a customer site 120, wherein the operating schedule for the energy assets 126 is optimized for reducing energy costs, reducing emissions costs, and/or generating revenue from energy markets. Additional details about the optimization function of energy management system 110 are described with reference to FIGS. 2 through 7.

Energy management system 110 may also include a markets component (see FIGS. 2 and 7) for interacting with any entities in the energy markets. In one example, the markets component processes settlements in any energy markets between the ISOs/RTOs and consumers. Energy management system 110 also provides a simplified and/or automated process of managing the energy assets in any energy-consuming and/or energy-producing environment, such as, but not limited to, a group of energy assets and/or a building or group of buildings. Energy management system 110 is used to facilitate an energy management service to customer sites 120 of energy management environment 100. Additional details about energy management system 110 are described with reference to FIGS. 2 through 7.

With respect to energy assets management, the operation of energy management system 110 may be summarized as follows. A modeling and simulation function of energy management system 110 collects information or maintains models concerning the energy assets 126 of a certain customer site 120 along with other information, such as, but not limited to, building information, building zone information, solar gain information, weather information, and/or energy price information for the customer site 120. The modeling and simulation function processes this information and passes the simulation results with respect to the environment inside the building and/or group of buildings of the customer site 120, which includes certain energy assets 126, to an optimization function of energy management system 110. The optimization function then processes the simulation results and generates an optimized operating schedule for the energy assets 126 for a chosen period of time. That is, using the optimized operating schedule that is generated by the optimization function, energy assets 126 of the customer site 120 are optimized with respect to reducing energy costs, reducing emissions costs, and/or generating revenue from energy markets. The operating schedule may be developed for various periods of time including a schedule by minute, hour, day, week, month and year. The optimization process may be an iterative process and may occur continuously, at scheduled intervals, and/or by command of the system operator 116.

Again, the optimization function facilitates a financial objective of minimizing cost with respect to the overall energy costs of a customer site 120. The financial objective may be achieved by the combination of (1) minimizing cost of deviation from BAU comfort levels, (2) minimizing cost of deviation from the emissions target, (3) minimizing cost of electric power production by the customer energy generating assets, (4) minimizing cost of electric power supply from the load serving entity or the electric distribution company, and (5) maximizing demand response (DR) revenue; all for a chosen period of time.

Because the optimization function is a cost minimization function that includes a combination of multiple sub-functions, it may include certain financial weighting factors that give importance to each objective. For example, there may be a weighting factor with respect to minimizing cost of deviation from BAU comfort levels, a weighting factor with respect to minimizing cost of deviation from the emissions target, a weighting factor with respect to minimizing cost of electric power production by the customer energy generating assets, a weighting factor with respect to minimizing cost of electric power supply from the load serving entity or the electric distribution company, and a weighting factor with respect to maximizing demand response (DR) revenue. In one example, if reducing cost of deviation from the emissions target is more important to the customer site 120 than reducing cost of electric power supply, the weighting factor with respect to the emissions may be greater than the weighting factor for reducing energy costs. The optimization function incorporates this into the solution accordingly. Again, the optimization function facilitates a financial objective of minimizing cost with respect to the overall energy costs of a customer site via the combination of multiple sub-functions (see Eqs. 25 and 26 below).

The optimized operating schedule for the chosen period of time is stored at energy management system 110 and then transmitted (i.e., deployed) to the monitoring and control system 122 of the customer site 120. The energy assets 126 are then operated and/or controlled according to the optimized operating schedule. In the deployment process, the process of an end-user 128 of a customer site 120 accepting an optimized operating schedule from energy management system 110 may be iterative. Once the optimized operating schedule is deployed and in service, system operators 116 may use operator portal 118 to monitor and/or control the operation of the energy assets 126 of customer site 120. Likewise, end-users 128 may use customer portal 130 to monitor and/or process information about the operation of the energy assets 126 of customer site 120. Additional details of an example of a process of creating and optimizing a schedule for managing energy assets of any energy-consuming and/or energy-producing environment are described with respect to FIG. 16.

Figure 12:
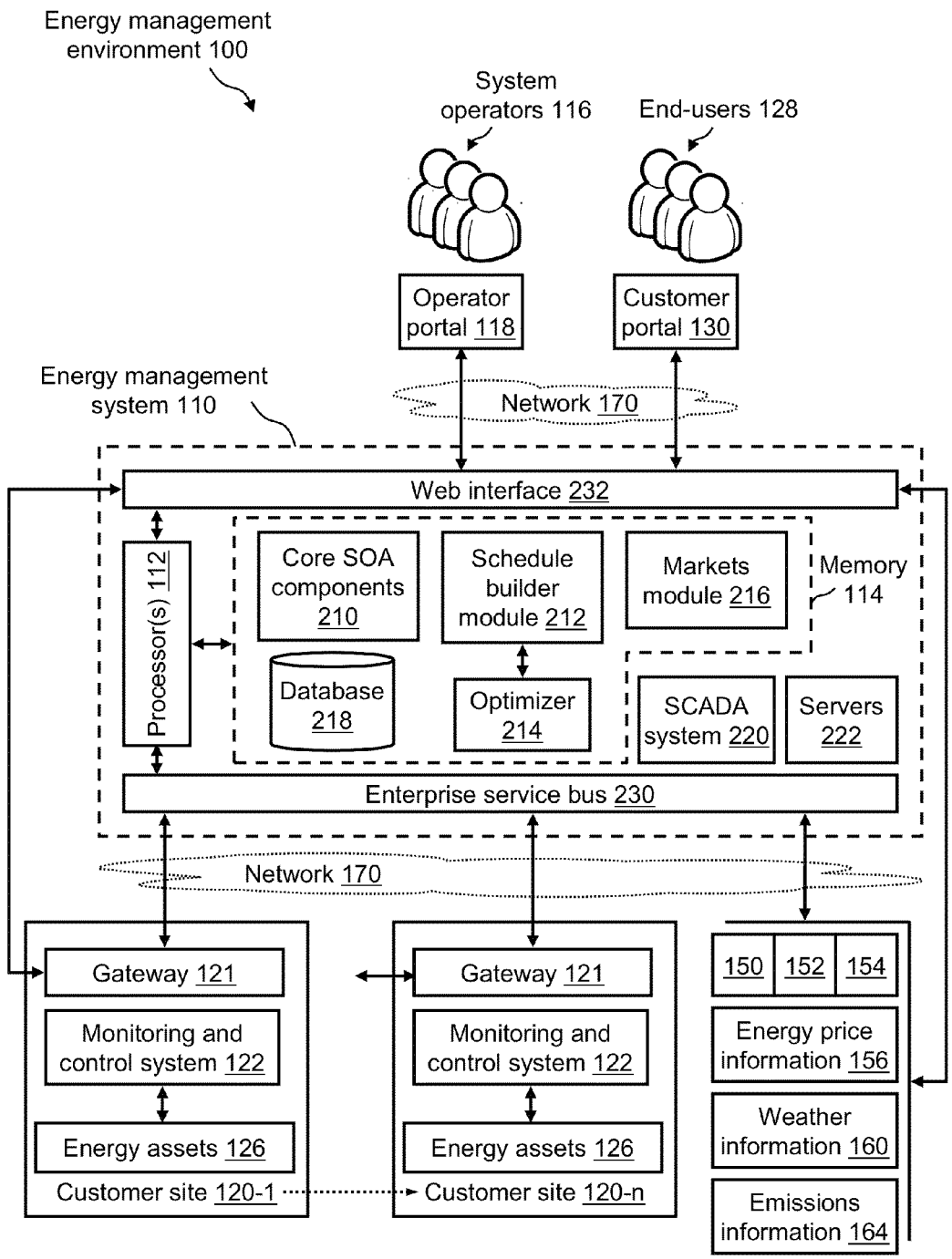
FIG. 12 illustrates a block diagram showing additional details of the energy management system of FIG. 11, according to a principle herein.

FIG. 12 illustrates a block diagram showing additional details of energy management system 110 of FIG. 11. For example, FIG. 12 shows energy management environment 100 of FIG. 11 implemented in a service-oriented architecture (SOA). In the service-oriented architecture shown in FIG. 12, the server side of energy management environment 100 is energy management system 110 while the client side of energy management environment 100 may include any number of customer sites 120, such as customer sites 120-1 through **120-*n***.

In one example, energy management system 110 may include certain functional components and/or modules that are installed and executing in memory 114 and managed by the one or more processors 112. Examples of functional components and/or modules of energy management system 110 may include, but are not limited to, certain core SOA components 210, a schedule builder module 212 that feeds an optimizer 214 (e.g., optimization software), a markets module 216, and a database 218. Energy management system 110 also includes a supervisory control and data acquisition (SCADA) system 220 as well as various servers 222 for supporting the SOA. The functional components and/or modules of energy management system 110 may communicate via an enterprise service bus 230. Enterprise service bus 230 manages "calls" in and out of energy management system 110. A set of adaptors (not shown) may be connected to enterprise service bus 230 for interfacing with any entities that are outside of energy management system 110, such as, but not limited to, the monitoring and control system 122 of any customer sites 120, energy regulatory agencies 150, ISOs/RTOs 152, rules information 154, energy price information 156, weather information 160, emissions regulatory agencies 162, and emissions information 164. The adaptors (not shown) are connected to enterprise service bus 230 for handling various communication protocols.

Energy management system 110 also includes a web interface 232. Web interface 232 may be, for example, any web browser that allows energy management system 110 to be accessed via a URL address. In addition to using enterprise service bus 230, the monitoring and control system 122 of any customer sites 120, energy regulatory agencies 150, ISOs/RTOs 152, rules information 154, energy price information 156, weather information 160, emissions regulatory agencies 162, and emissions information 164 may communicate with energy management system 110 via web interface 232. Additionally, the one or more operator portals 118 and customer portals 130 may communicate with energy management system 110 via web interface 232.

To integrate diverse monitoring and control systems 122 with energy management system 110, a physical connection from the monitoring and control systems 122 to network 170 is required. Therefore, a gateway 121 may be associated with each monitoring and control system 122 of customer sites 120. Gateway 121 may be any translation device between the output of energy management system 110, which is using a specified protocol, and one of any number of different BMS or BAS protocols and/or different energy asset device protocols. Accordingly, gateway 121 is installed at the physical location of the monitoring and control system 122 of a customer site 120. The presence of gateway 121 with each monitoring and control system 122 allows energy management system 110 to be substantially customer-agnostic by connecting common network protocols, such as, but not limited to, LONWORKS® (Echelon Corporation, San Jose, Calif.), BACNET® (ASHRAE, Atlanta, Ga.), and MODBUS® (Modbus Organization, Inc.), along with many proprietary network protocols.

In one example, gateway 121 may be a JACE® controller box that is available from Tridium, Inc (Richmond, Va.). JACE means Java Application Control Engine. In this example, energy management system 110 may communicate to the JACE® controller box via, for example, OBject EXchange (OBEX®) protocol (Seidio, Inc., Houston, Tex.). That is, energy management system 110 issues OBEX® commands to the JACE® controller box via the enterprise service bus 230 and/or web interface 232. Then, the JACE® controller box performs a translation and passes the commands to the monitoring and control system 122. Energy management system 110 is easily scalable via a network of gateways 121 (e.g., JACE® controller boxes) that are communicating with monitoring and control systems 122 of customer sites 120. Another example of gateway 121 may be the i.LON® interface (Echelon Corporation, San Jose, Calif.) that is available from Echelon Corporation (San Jose, Calif.).

In other examples, energy management system 110 may communicate with certain monitoring and control systems 122 natively. In this scenario, the presence of gateway 121 is optional.

In other examples, a gateway 121 may be connected to individual energy assets 126 and, therefore, energy management system 110 may communicate directly with individual energy assets 126.

In other examples, some customer sites 120 may not include a monitoring and control system 122. Therefore, a third party entity pulls the commands (e.g., schedule, bias signal) from the enterprise service bus 230 of energy management system 110. The third party then interprets and/or translates the information and passes the commands to the energy assets 126.

Core SOA components 210 manages the overall operation of energy management system 110. Core SOA components 210 may include any software functions as well as any servers that may be shared across, for example, schedule builder module 212, markets module 216, and/or any other cross-functional blocks.

Examples of shared software functionality of core SOA components 210 may include, but are not limited to, authorization and authentication functions, publish/subscribe functions, data management functions, eventing and alerting functions, session manager functions, administration functions, identity functions, and the like. Core SOA components 210 is not limited to the aforementioned software functionality only. Any other software functionality may be included in core SOA components 210.

Servers 222 may include, for example, an ancillary gateway server (not shown) for managing communication between ISOs/RTOs 152 and SCADA system 220, where SCADA system 220 may be communicating with the monitoring and control systems 122 of customer sites 120. For example, the ancillary gateway server (not shown) may be used to facilitate commands that are issued with respect to ancillary services, such as "regulation" and "synchronized reserve," as well as for acquiring meter data from customer sites 120 in the settlements process.

In an example of a "regulation" process, a certain ISO/RTO 152 may transmit a signal through an ISO/RTO interface (not shown) to the enterprise service bus 230 of energy management system 110. The ISO/RTO interface (not shown) is a component of energy management system 110. The signal is captured by the ancillary gateway server (not shown), which processes the information and makes certain decisions accordingly. The ancillary gateway server response is passed to the enterprise service bus 230; then core SOA components 210 returns a response back to the ancillary gateway server, again via the enterprise service bus 230. The ancillary gateway server then passes signals to SCADA system 220, which then passes the signals to the monitoring and control system 122 of customer site 120 to control the energy generation assets, such as a generator. The supervisory control aspect of this process is that SCADA system 220 is sending information to control an energy asset. The ancillary gateway server performs real-time monitoring and control. For example, the ancillary gateway server monitors whether energy management system 110 is up and running, whether SCADA system 220 is up and running, whether the customer's energy assets 126 are being controlled, and the like. The "synchronized reserve" process is substantially the same process and uses substantially the same components, but different signals are transmitted.

Servers 222 may also include an optimizer server (not shown), which is the server at which optimizer 214 resides. The optimizer server (not shown) may be used for managing the operations of optimizer 214. Servers 222 may also include a web server (not shown) for managing any information that may be accessed via the Internet. Servers 222 may also include a database server (not shown), which is the server at which database 218 resides. Servers 222 may also include an ESB server (not shown), for managing enterprise service bus 230. Servers 222 may also include a configuration server (not shown). A configuration server (not shown) may be used, for example, for managing customer configurations, building configurations, building zone configurations, energy assets configurations, user profiles, data configurations, any application configurations, and the like. Energy management system 110 is not limited to the aforementioned servers only. Any other servers may be included in energy management system 110.

Schedule builder module 212 may be a software component of energy management system 110 for collecting any information that may be useful for optimizing the operation schedule of any energy assets 126 of any customer site 120 for a chosen period of time. Useful information may include, but is not limited to, any information about the customer site 120 itself (e.g., building information and/or building zone information) and/or the location of the customer site 120, weather information 160, energy price information 156, solar gain information, and any information about the energy assets 126 of the customer site 120. Using the information that is collected, schedule builder module 212 creates a model of the environment at customer site 120 and then simulates the environment at customer site 120. Schedule builder module 212 then feeds a snapshot of the simulation results and any related information into optimizer 214, which then generates an optimized energy assets operating schedule for a chosen period of time. Additional details of an example of a schedule builder module 212 are described with reference to FIG. 13.

Optimizer 214 is an example of the optimization function of management system 110. Optimizer 214 may be optimization software for processing the simulation results and any related information from schedule builder module 212 and then generating an energy assets operating schedule that is optimized for reducing energy costs, reducing emissions costs, and/or generating revenue from energy markets. In various aspects, the optimization process performed by optimizer 214 includes (1) a calculation of BAU followed by (2) an optimization for minimizing overall energy costs with respect to BAU. The optimization process may be an iterative process. That is, optimizer 214 is used to create a schedule for the energy assets 126 that optimizes the energy usage, generation (if any), and storage (if any) of a customer site 120 for the purpose of reducing energy costs, reducing emissions costs, and/or generating revenue from energy markets. The optimized schedule covers a chosen period of time. In one example, optimizer 214 may be implemented using optimization software, such as the AIMMS optimization software from Paragon Decision Technology Inc. (Bellevue, Wash.). In another example, the optimizer 214 may be implemented using the IBM ILOG CPLEX Optimizer (http://www-01.ibm.com/software/integration/optimization/cplex-optimizer/).

Optimizer 214 is programmed to achieve the financial objective of minimizing cost with respect to the overall energy costs of a customer site 120. For example, optimizer 214 is programmed to provide solution sets with respect to (1) minimizing cost of deviation from BAU comfort levels, (2) minimizing cost of deviation from the emissions target, (3) minimizing cost of electric power production by the customer energy generating assets, (4) minimizing cost of electric power supply from the load serving entity or the electric distribution company, and (5) maximizing demand response (DR) revenue; all for a chosen period of time.

Stated mathematically, optimizer 214 can be implemented to provide solution sets with respect to minimizing energy costs of a customer site. In a non-limiting example, optimizer 214 can be implemented according to the following equations.

$$\text{Minimize}[T\$_{dev}+\text{Emission}\$+\text{Gen}\$+\text{Supply}\$-DR\$] \quad \text{Eq. 25}$$

where
- $T\$_{dev}$ = Cost of deviations from the business-as-usual comfort (i.e. temperature) level
- Emission\$ = Cost/value of deviations from the emission target
- Gen\$ = Cost of electric power production by the customer energy generating assets
- Supply\$ = Cost of electric power supply from the Load Serving Entity or the Electric Distribution Company $$DR\$ = \max(0,(CBL-\text{Load}))*(LMP-G\&T \text{ Rate}) \quad \text{Eq. 26}$$

where
- CBL = Customer baseline
- Load = Actual customer usage
- LMP = Locational Marginal Prices
- G&T Rate = Generation & Transmission Rate Additional details of Eqs. 25 and 26 are described with reference to FIG. 14.

One aspect of optimizer 214 is that in addition to using information (e.g., attributes and technical specifications) of energy assets 126 and of buildings (or any physical environment), optimizer 214 also uses weather information 160, energy price information 156, and emissions information 164 when generating an optimized operating schedule for customer sites 120. With respect to weather information (e.g., weather information 160), optimizer 214 may, for example, factor in the delta between the outside temperature and inside temperature of a building or group of buildings. Additionally, optimizer 214 may, for example, factor in the amount of cloudiness with respect to solar gain calculations.

With respect to energy price information, optimizer 214 may factor in hourly energy prices (e.g., day-ahead or real-time energy prices) for optimizing customer sites 120 with respect to generating revenue from energy markets. For example, optimizer 214 may use energy price information 156 to allow the operation of certain energy assets 126 at times of day when energy prices are lowest and/or to curtail (or reduce) the operation of certain energy assets 126 at times of day when energy prices are highest, thereby reducing energy costs of a customer site 120.

In another example, optimizer 214 may use energy price information 156 to indicate to customer sites 120 to charge batteries at times of day when energy prices are lowest and to utilize (discharge) the batteries at times of day when energy prices are highest; again, reducing energy costs of a customer site 120.

In yet another example, optimizer 214 may use energy price information 156 to generate optimized operating schedules for energy assets 126 that may be used to indicate to end-users 128 at customer sites 120 when to bid into any of the various wholesale electricity markets, such as (1) the energy market, (2) the day-ahead scheduling reserve market, (3) the capacity market, (4) the synchronized reserve market, and (5) the regulation market.

With respect to emissions information, optimizer 214 may use emissions information 164 to generate optimized operating schedules for energy assets 126 that may be used to indicate to end-users 128 at customer sites 120 opportunities to buy and/or sell emissions credits. In this way, customer sites 120 may have opportunity to reduce emissions and/or receive revenue from emissions trading.

Markets module 216 may be a software component of energy management system 110 for interacting with any entities in the energy markets, such as ISOs/RTOs, any/or with any entities in the emissions trading markets. For example, markets module 216 may include certain market interfaces, which may be any mechanisms for interfacing with the market. Further, markets module 216 may include a registration component that is used for registering energy assets in a particular market for committing assets. Additionally, markets module 216 may include a markets bidding component that is used to submit bids into certain energy markets. Additionally, markets module 216 may include an energy markets settlements component that is used to process settlements in any energy markets between, for example, ISOs/RTOs 152 and customer sites 120. Markets module 216 may also include an emissions market settlements component that is used to process settlements with respect to emissions trading, such as settlements between emissions regulatory agencies 162 and customer sites 120. Additional details of an example of a markets module 216 are described with reference to FIG. 17.

SCADA stands for supervisory control and data acquisition. It generally refers to industrial control systems, such as computer systems that monitor and control industrial, infrastructure, and/or facility-based processes. In energy management system 110, SCADA system 220 may be used to communicate directly with customer sites 120. SCADA system 220 may also communicate with other components of energy management system 110 via enterprise service bus 230. SCADA system 220 handles, for example, ancillary services, such as "regulation" and "synchronized reserve."

Figure 13:
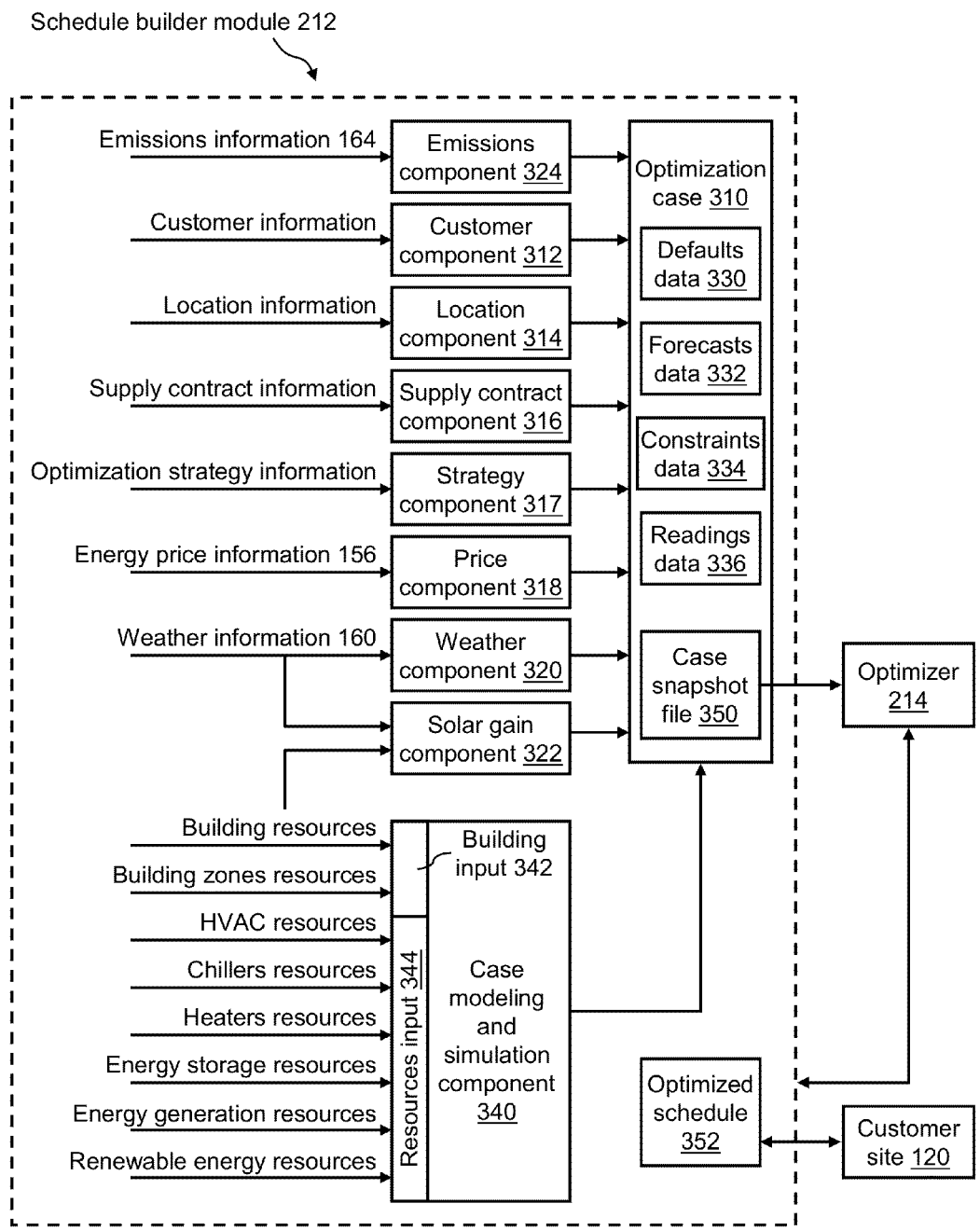
FIG. 13 illustrates a block diagram of a schedule builder module of the energy management system of FIG. 12, according to a principle herein.

FIG. 13 illustrates a block diagram of schedule builder module 212 of energy management system 110 of FIG. 11. Schedule builder module 212 may include any components for processing any information that may be useful with respect to creating an optimization case 310 with respect to energy assets. For example, schedule builder module 212 may include a customer component 312 for processing customer information (e.g., customer site 120 information), a location component 314 for defining and/or configuring the customer's location, a supply contract component 316 for processing supply contract information, a strategy component 317 for processing optimization strategy information, a price component 318 for processing energy price information 156, a weather component 320 for processing weather information 160, a solar gain component 322 for processing solar gain information, and/or an emissions component 324 for processing emissions information 164.

Customer component 312 may process customer information (e.g., customer site 120 information), such as, but not limited to, customer name and contact information, customer type information (e.g., a university, a business, a retailer, a hospital, a factory), building (s) occupancy information, miscellaneous load information (e.g., lighting, any electric powered equipment), and the like.

Location component 314 may be used for defining and/or configuring the customer's location. The definition of a customer's location is not limited to a geographic address. Rather, the customer's location may be any configuration of energy assets, buildings, and/or geographic locations. For example, the customer's location may be configured as one building; a groups of buildings; one energy asset; a group of energy assets; one energy asset for one building; one energy asset for multiple buildings; one monitoring and control system 122 per building; multiple monitoring and control systems 122 per building; one monitoring and control system 122 for multiple buildings; energy assets and/or buildings in one town, city, or state in combination with energy assets and/or buildings in another town, city, or state; and the like. Additionally, groups of energy assets or buildings may be in close physical proximity to each other or may be physically distant and even separated by time zones.

Supply contract component 316 may be used to process supply contract information, which is the service contract between the ISOs/RTOs 152 and customer sites 120.

Strategy component 317 may be used to process optimization strategy information. For example, the optimization strategy may be determined by the definition of a customer's location per location component 314. That is, the grouping of energy assets and/or buildings may determine the best optimization strategy for the case. Example strategies include, but are not limited to single optimization, iterative optimization, customer baseline (CBL) optimization, parametric estimation optimization, and so on.

Price component 318 may be used to process energy price information 156. For example, price component 318 may query ISOs/RTOs 152 for energy price information 156 with respect to any energy market in a certain geographic region, such as the day-ahead energy market and the real-time energy market.

Weather component 320 may be used to process weather information 160. For example, weather component 320 may query weather information 160 for current and/or predicted temperature and/or cloud cover information for a certain geographic location per location component 314. Per weather component 320 and/or weather information 160, optimizer 214 may factor in the delta between the outside temperature and inside temperature of a building or group of buildings. Additionally, per weather component 320 and/or weather information 160, optimizer 214 may factor in the amount of cloudiness with respect to solar gain calculations.

Solar gain (also known as solar heat gain or passive solar gain) refers to the increase in temperature in a space, object, or structure that results from solar radiation. The amount of solar gain increases with the strength of the sun, and with the ability of any intervening material to transmit or resist the radiation. With respect to schedule builder module 212, solar gain component 322 may process solar gain information about one or more buildings of customer site 120 per location component 314. For example, building-specific solar gain information, which is based on an analysis of the customer's building and/or buildings and weather information per weather component 320. That is, solar gain is determined by the direction and orientation of windows, direction and orientation of the sun (by day of the year), and amount of cloud cover. For example, the solar gain may be lowest when cloudy and highest when not cloudy, and anything in between. Again, optimizer 214 may factor in the amount of cloudiness with respect to solar gain calculations. Other factors of solar gain include building information (e.g., size, mass, type and thickness of building materials, R-factor, etc) and window information (e.g., type, size, thickness, direction, R-factor, etc).

Emissions component 324 may be used to query emissions regulatory agencies 162 for emissions information 164 with respect to any emissions market in a certain geographic region. For example, emissions component 324 processes emissions cap information, cost information for buying emissions credits, and/or price information for selling emissions credits for the geographic region of a certain customer site 120.

Optimization case 310 also includes defaults data 330, forecasts data 332, constraints data 334, and readings data 336. For each individual energy asset 126 of each customer site 120 a set of default settings is established, which is defaults data 330. For example, there is a set default settings for a certain HVAC unit, another set default settings for a certain chiller, another set default settings for a certain heater, and so on; all included in defaults data 330. Defaults data 330 may be considered static data. This is because the default settings remain substantially the same from day to day for a given energy asset.

For each individual energy asset 126 of each customer site 120 there is also a set of forecast settings, which is forecasts data 332. That is, forecasts data 332 includes forecast operating values for each individual energy asset 126. The forecasts data 332 is set up by the system operator 116. The forecasts data 332 may initially include default data and/or historical data. A system operator 116 may modify the initial contents of forecasts data 332 based on any current conditions. Forecasts data 332 may include a schedule, such as forecast data for every 15, 30, 45, or 60 minutes for a chosen period of time. Forecasts data 332 may be considered time series data. This is because the data may change over a time period.

In one example, the forecast values in forecasts data 332 are used to modify the default values in defaults data 330 and, thereby, achieve improved optimization with respect to reducing energy costs and/or generating revenue from the day-ahead and/or real-time energy markets. The forecast values in forecasts data 332 may cover the whole day or any portion of the day. For example, forecast values may be used between noon and 6 pm and the default values may be used for the rest of the day. In the optimization process performed by optimizer 214, a first pass of the process may be to optimize using the default settings in defaults data 330. Then a second pass of the process may be to optimize using the forecast settings in forecasts data 332.

Constraints data 334 may include any information for constraining the operation and/or use of energy assets 126 of a certain customer site 120. One example of constraints may be any constraints that are on a particular energy asset 126, such as minimum run time or startup time (e.g., ice making). Another example of constraints may be constraints about the availability of a certain energy asset 126, such as information from the customer that a chiller is going to be down between 2 pm and 4 pm or that the chiller is running at only 50% capacity. Yet another example of constraints may be the allowable minimum and maximum internal temperatures of buildings.

Readings data 336 are the actual readings from the customer's monitoring and control system 122. For example, readings data 336 may be meter readings, thermostat readings, any energy assets readings. When creating a case, system operators 116 may pull any useful readings from readings data 336 and use these values as a baseline value into the optimizer. Further, system operators 116 may monitor actual real-time readings. Then based on actual readings from readings data 336, system operators 116 may make certain adjustments to any energy asset 126 and then rerun the optimization. Additionally, meter readings in readings data 336 may be used for parametric estimation.

Schedule builder module 212 may also include a case modeling and simulation component 340 for processing any information about buildings and/or energy assets of a customer site 120 and then models and simulates the environment. That is, case modeling and simulation component 340 is used to simulate a model of energy assets 126 and their operation in a given environment over a chosen period of time given certain input information and/or variables. For example, case modeling and simulation component 340 may include a building input 342 for receiving any type of building information (e.g., location, size, mass, # of floors, type and thickness of building materials, R-factor, etc) and/or building zones information (e.g., zone 1=floor 1, zone 2=floor 2, zone 3=floor 3, etc). Additionally, case modeling and simulation component 340 may include an energy assets input 344 for receiving any type of information about energy assets 126, such as, but not limited to, any operating specifications and/or attributes of, for example, HVAC assets, chillers assets, heaters assets, energy storage assets (i.e., thermal and electric storage), energy generation assets, and/or renewable energy assets.

The aforementioned information about energy assets 126 may originate from a customer (i.e., customer site 120). That is, the attributes and/or technical specifications of each energy asset 126 may be supplied by the customer site 120 and initially entered manually. However, in other examples, a simulation components library of predefined assets may exist that provides a simulation model of any types, brands, and/or models of energy assets. In this example, the customer may supply only the types, brands, and/or models of its energy assets and then case modeling and simulation component 340 may pull the information from the simulation components library when building an optimization case 310. In one example, the simulation components library includes industry-standard XML representations of any types, brands, and/or models of energy assets 126.

Using the aforementioned information and/or variables, case modeling and simulation component 340 creates a model of the customer site 120 (e.g., a building or group of buildings per location component 314 and associated energy assets 126) and simulates the environment at the customer site 120 for a chosen period of time. Schedule builder module 212 generates a case snapshot file 350 that contains a snapshot of the simulation results from case modeling and simulation component 340 and all other information collected by and/or included in optimization case 310. Case snapshot file 350 is fed into optimizer 214. Optimizer 214 uses a two step process to process the information in case snapshot file 350 and generate a solution set in the form of an optimized schedule 352. The optimized schedule 352 is for a chosen period of time, such as one 24-hour period (i.e., one calendar day), and includes settings information on a predetermined interval, such as every 15, 30, 45, or 60 minutes. The optimized schedule 352 from optimizer 214 is returned to schedule builder module 212. Schedule builder module 212 may then deploy the optimized schedule 352 to a customer site 120. Additional details of an example of a process of creating and optimizing a schedule for managing energy assets of any energy-consuming and/or energy-producing environment are described with respect to FIG. 16.

Figure 14:
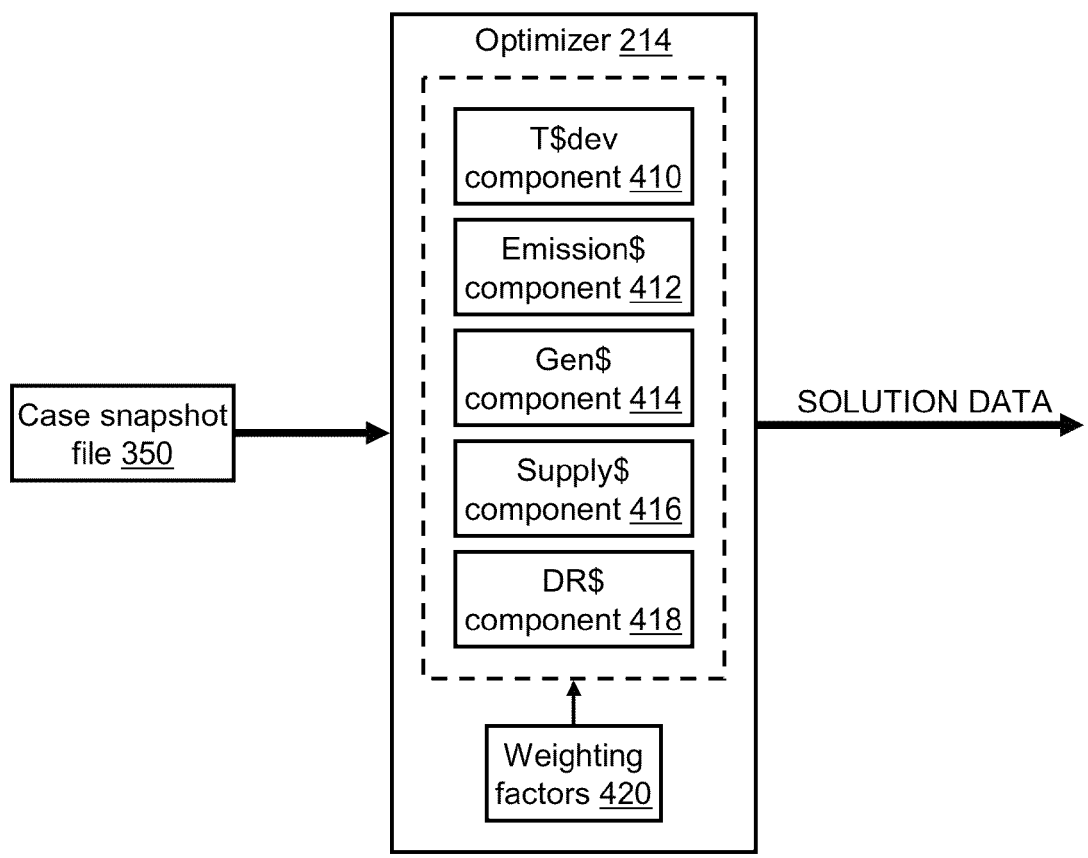
FIG. 14 illustrates a block diagram of an optimizer of the energy management system of FIG. 12, according to a principle herein.

FIG. 14 illustrates a block diagram of optimizer 214 of energy management system 100 of FIG. 11. Optimizer 214 is implemented as multiple mathematical sub-functions according to Eqs. 25 and 26 (also included above)

$$\text{Minimize}[T\$_{dev}+\text{Emission}\$+\text{Gen}\$+\text{Supply}\$-DR\$] \qquad \text{Eq. 25}$$

where
- $T\$_{dev}$=Cost of deviations from the business-as-usual comfort (i.e. temperature) level
- Emission$=Cost/value of deviations from the emission target
- Gen$=Cost of electric power production by the customer energy generating assets
- Supply$=Cost of electric power supply from the Load Serving Entity or the Electric Distribution Company $$DR\$=\max(0,(CBL-\text{Load}))*(LMP-G\&T\text{ Rate}) \qquad \text{Eq. 26}$$

where
- CBL=Customer baseline
- Load=Actual customer usage
- LMP=Locational Marginal Prices
- G&T Rate=Generation & Transmission Rate While Eq. 25 is a mathematical expression for calculating a minimized economic cost, those skilled in the art will recognize that by inverting the signs in the equation the mathematical expression may be used for calculating a maximized economic benefit, as follows.

$$\text{Maximize}[DR\$-T\$_{dev}-\text{Emission}\$-\text{Gen}\$-\text{Supply}\$] \qquad \text{Eq. 27}$$

Accordingly, optimizer 214 may include a $T\$_{dev}$ component 410, an Emission$ component 412, a Gen$ component 414, a Supply$ component 416, and a DR$ component 418.

$T\$_{dev}$ component 410 is used to calculate the cost of deviations from the business-as-usual comfort (BAU) (i.e. temperature) level. In one example, defaults data 330, which may indicate the default settings for each individual energy asset 126 of the customer site 120, may be the basis of determining the BAU comfort level of the environment at the customer site 120. For example, during cold weather months the BAU comfort level during the day may be a thermostat setting of 72° F., while the BAU comfort level at night may be a thermostat setting of 60° F. Similarly, during warm weather months the BAU comfort level during the day may be a thermostat setting of 72° F., while the BAU comfort level at night may be a thermostat setting of 80° F.

Additionally, both financial and non-financial considerations may be incorporated into the optimization function.

For example, with respect to T$_{dev}$ which is the cost of deviations from the business-as-usual comfort (i.e. temperature) level, "comfort" may have an assigned economic value, such as raising the thermostat by 1° F. from business-as-usual is $100. More specifically, one setting of the optimization function is to assign a non-zero positive economic value (or penalty) for per unit deviation from the business-as-usual comfort level. However, another setting of the optimization function is to define a maximum deviation (i.e., a hard constraint) from the business-as-usual comfort that is allowed in the optimization process. For example, a hard constraint may be that the thermostat cannot be raised more than 4° F. from business-as-usual. For this setting, the economic value may be assigned a $0 value.

Emission$ component 412 is used to calculate the cost/value of deviations from the emission target. Emission$ component 412 may use manufacturer specifications about the energy assets 126 of the customer site 120 with respect to the emission of pollutants and/or GHG. Additionally, Emission$ component 412 may use published information about the local energy grid (e.g., energy grid 140) with respect to its emission of pollutants and/or GHG. Further, Emission$ component 412 may use emissions information 164 to determine the emissions cap as well as to determine when the price to buy emissions credits is lowest and when the price to sell emissions credits is highest.

Gen$ component 414 is used to calculate the cost of electric power production by the customer energy generating assets.

Supply$ component 416 is used to calculate the cost of electric power supply from the Load Serving Entity or the Electric Distribution Company. Supply$ component 416 processes any information with respect to reducing energy costs by optimizing energy usage, generation, and storage.

DR$ component 418 is used to perform the calculations of Eq. 26, as follows.

$$DR\$ = \max(0, (CBL - \text{Load})) * (LMP - G\&T\text{ Rate}), \quad \text{Eq. 26}$$

where
 CBL=Customer baseline
 Load=Actual customer usage
 LMP=Locational Marginal Prices
 G&T Rate=Generation & Transmission Rate DR$ component 418 processes any information with respect to generating revenue from energy markets. For example, DR$ component 418 may use energy price information 156 to determine when energy prices are lowest and highest.

With respect to increasing revenue from energy markets, a main function of optimizer 214 is to generate a demand response (DR) solution for the chosen period of time. Demand response (also known as load response) is end-use customers reducing their use of electricity in response to power grid needs, economic signals from a competitive wholesale market or special retail rates. Wholesale electricity markets provide opportunities for end-use customers to realize value for reducing their demand for electricity or generating electricity. Demand response is an integral part of (1) the energy market, (2) the day-ahead scheduling reserve market, (3) the capacity market, (4) the synchronized reserve market, and (5) the regulation market. Demand response can compete equally with generation in these markets.

Energy Market—

Economic Load Response programs enable demand resources to voluntarily respond to locational marginal prices (LMP) by reducing consumption and receiving a payment for the reduction. Using the day-ahead alternative, qualified market participants may offer to reduce the load they draw from the energy grid system in advance of real-time operations and receive payments based on day-ahead LMP for the reductions. The economic program provides access to the wholesale market to end-use customers through curtailment service providers (CSPs) to curtail consumption when LMPs reach a level where it makes economic sense. Other aspects of the energy market are discussed in greater details below.

Day-Ahead Scheduling Reserve Market—

The Day-Ahead Scheduling Reserve Market (DASR) is a market-based mechanism to procure supplemental, 30-minute reserves on the energy grid system. The market is intended to provide a pricing method and price signals that can encourage generation and demand resources to provide day-ahead scheduling reserves.

Capacity Market—

Using the capacity market, demand resources can offer demand response as a forward capacity resource. Under this model, demand response providers can submit offers to provide a demand reduction as a capacity resource in the forward capacity resource auctions. If these demand response offers are cleared in the forward capacity resource auction, the demand response provider will be committed to provide the cleared demand response amount as capacity during the delivery year and will receive the capacity resource clearing price for this service.

Synchronized Reserve Market—

The Synchronized Reserve Market provides members with a market-based system for the purchase and sale of the synchronized reserve ancillary service. Demand resources that choose to participate in the Synchronized Reserve Market must be capable of dependably providing a response within 10 minutes and must have the appropriate metering infrastructure in place to verify their response and compliance with reliability requirements and market rules. Synchronized reserve service supplies electricity if the grid has an unexpected need for more power on short notice. The power output of generating units supplying synchronized reserve can be increased quickly to supply the needed energy to balance supply and demand; demand resources also can bid to supply synchronized reserve by reducing their energy use on short notice. Other aspects of the Synchronized Reserve Market are discussed in greater details below.

Regulation Market—

Regulation service corrects for short-term changes in electricity use that might affect the stability of the energy grid system. It helps match generation and load and adjusts generation output to maintain the desired frequency. Curtailment Service Providers (CSPs) that bid demand reductions into the Regulation Market must meet all the requirements of regulation, including the real-time telemetry requirement. Other aspects of the regulation market are discussed in greater details below.

While energy management system 110 may provide customer sites 120 optimization with respect to maintaining suitable comfort levels, reducing energy costs, and/or increasing revenue from energy markets, emissions is another consideration of the process. This is because customer sites 120 are not allowed to produce excessive emissions while maintaining suitable comfort levels, reducing energy costs, and/or increasing revenue from energy markets. Accordingly, Emission$ component 412 processes any information with respect to reducing emissions and/or generating revenue from emissions trading.

Further, because optimizer 214 includes multiple subfunctions, it may include certain weighting factors 420 that give importance to each objective. For example, there may be a weighting factor with respect to T$$_{dev}$ component 410, a weighting factor with respect to Emission$ component 412, a weighting factor with respect to Gen$ component 414, a weighting factor with respect to Supply$ component 416, and a weighting factor with respect to DR$ component 418. In one example, if reducing emissions is more important to the customer site 120 than reducing energy costs, the weighting factor for Emission$ component 412 may be greater than the weighting factor for Supply$ component 416.

Optimizer 214 may have, for example, a day-ahead mode and a real-time mode of operation. Optimizer 214 is set to day-ahead mode when performing optimizations with respect to the day-ahead energy market. Optimizer 214 is set to real-time mode when performing optimizations with respect to the real-time energy market.

While in a chosen mode of operation, optimizer 214 reads in all information with respect to T$$_{dev}$ component 410, Emission$ component 412, Gen$ component 414, Supply$ component 416, and DR$ component 418. Optimizer 214 also reads in weighting factors 420. Optimizer 214 assigns the weighting factors 420 to each of T$$_{dev}$ component 410, Emission$ component 412, Gen$ component 414, Supply$ component 416, and DR$ component 418 and performs the calculations of each sub-function substantially simultaneously. Continuing the example, if the weighting factor for Emission$ component 412 is greater than the weighting factor for Supply$ component 416, then the SOLUTION DATA, which is the output of optimizer 214, provides an operating schedule for the energy assets 126 of the customer site 120 that is optimized more for minimizing emissions and/or maximizing revenue from emissions trading and optimized less for reducing energy costs.

Based on information processed by T$$_{dev}$ component 410, Emission$ component 412, Gen$ component 414, Supply$ component 416, and/or DR$ component 418 the SOLUTION DATA of optimizer 214 includes information for generating an optimized schedule 352, which is an optimized operating schedule of energy assets 126.

In addition to an optimized operating schedule of energy assets 126, the information in the resulting optimized schedule 352 may include other information. In one example, SOLUTION DATA and/or optimized schedule 352 may indicate to shift energy usage to times of day when energy prices are lowest and to reduce and/or curtail energy usage at times of day when energy prices are highest. Similarly, SOLUTION DATA and/or optimized schedule 352 may indicate to shift energy generation to times of day when energy prices are highest and to reduce and/or curtail energy generation at times of day when energy prices are lowest. Accordingly, SOLUTION DATA and/or optimized schedule 352 may indicate an optimal operating schedule for energy assets 126 at the customer site 120 for minimizing energy consumption, thereby reducing energy costs.

In another example, SOLUTION DATA and/or optimized schedule 352 may indicate times of day for reducing energy consumption below the customer site 120's CBL, which provides opportunity to earn revenue from energy markets. Likewise, SOLUTION DATA and/or optimized schedule 352 may indicate times of day for supplying energy back to the grid (via energy generation assets), which also provides opportunity to earn revenue from energy markets. Accordingly, SOLUTION DATA and/or optimized schedule 352 may indicate an optimal operating schedule for energy assets 126 at the customer site 120 for maximizing revenue from energy markets.

In yet another example, SOLUTION DATA and/or optimized schedule 352 may indicate times of day for reducing energy consumption and/or reducing energy generation and, thereby, reduce the amount of emissions produced, which provides opportunity to earn revenue from emissions trading. Accordingly, SOLUTION DATA and/or optimized schedule 352 may indicate an optimal operating schedule for energy assets 126 at the customer site 120 for minimizing emissions and/or maximizing revenue from emissions trading.

Simplified Asset Model—Light Bulb Example

As an example, simplified for illustrative purposes, an enterprise customer is considered, having precisely one energy resource: a light bulb. The light bulb may be switched on at full power (100% of maximum brightness), may be switched off entirely (0% of maximum brightness), or may be adjusted, e.g. with a dimmer switch, to draw any amount of power between these two extremes. For the sake of simplicity the percentage of maximum brightness realized by the light bulb is assumed to be equal to the percentage of maximum load drawn by the light bulb at all values of brightness.

The customer in the present example pays a fixed retail rate for electricity, $1/kwh, and the light bulb draws 1 kw at full power, for a net cost of $1/hr. When switched off, the light bulb draws 0 kw at a cost of $0/hr. At partial dimming the light bulb draws a fraction of full power, e.g. at 70% brightness the light bulb draws 0.7 kw at a cost of $0.70/hr.

Additionally, a default pattern of usage is stipulated. Between the hours of 9 a.m. to 5 p.m. everyday, the light bulb is on at full power, and between the hours of 12 a.m. to 9 a.m. and 5 p.m. to 12 a.m., the light bulb is off entirely. This usage pattern represents the customer's load in the absence of any additional market incentive to alter the usage pattern, which is referred to as a customer baseline (CBL) of electricity usage for the client. This usage pattern also is known as a business-as-usual (BAU) scenario.

Unlike the client's fixed price for electricity, the cost to purchase electricity in the wholesale markets may fluctuate up and down. Similarly, at certain times, the demand response markets may be willing to pay the client to reduce its electricity consumption. The amount that this reduction in consumption is worth in the demand response markets generally varies roughly according to the variations in the cost of electricity in the wholesale markets.

The customer thus has the opportunity to make money in the demand response markets if the client is willing to reduce its electricity usage below its CBL at a specified time. For example, the customer may submit a bid to the market promising to cut the customer's load by 0.4 kw between the hours of 2 p.m. and 3 p.m. the following day, in return for compensation of $0.80. Assuming this bid is accepted, the customer could then proceed to dim the light bulb at 2 p.m. the next day from 100% brightness to 60% brightness, thus reducing its load from 1 kw to 0.6 kw for a net reduction of 1 kw−0.6 kw=0.4 kw. At 3 p.m., the customer would then be free to turn the brightness back up to 100% without penalty. As a result of this operation, the customer would be paid $0.80 for the load reduction provided. In addition, the customer would recognize savings on its electricity bill. By using 0.4 kw less over the course of an hour, the customer would have used 0.4 kwh less electricity, for an additional savings of $0.40. The total net monetary value to the customer for this operation would thus be $0.80+$0.40=$1.20.

An additional tactic the customer may employ is to shift load in time. If, for example, the customer wants to have 8 hours of use of the light bulb for a day, but the customer has some flexibility as to the hours at which that light is used, the customer could, for example, turn the light on at 8 a.m. instead of 9 a.m., turn it off between 12 p.m. and 1 p.m. (e.g., while the customer goes out for lunch) and turn the light on again between the hours of 1 p.m. and 5 p.m. The customer could thus reduce its usage between 12 p.m. and 1 p.m. from 100% brightness to 0% brightness, corresponding to a 1 kwh reduction. The customer in this case would have a 1 kw INCREASE compared to baseline usage between 8 a.m. and 9 a.m., for a net increase/decrease of 0 kwh of electricity used for the day. Accordingly, the customer's retail rate cost for electricity would be unchanged for the day. Supposing, however, that the demand response markets were willing to pay for load reduction at a rate of $2/kw between 12 p.m. and 1 p.m., the customer could nevertheless bid to provide 1 kw of load reduction at that time and would realize a net monetary value from load shifting equal to $2.

Representing Behavior Change in a Convenience/Cost Function

In order to determine how the customer should utilize its energy resources in light of operational and physical limitations, convenience and/or comfort-related preferences, and financial considerations such as energy costs and demand response revenues, an optimization process may be employed. All of the customer's considerations, including non-monetary concerns such as convenience and/or comfort, may be modeled as having an associated monetary value. Representing convenience and/or comfort-related preferences involves assigning a "cost," for the purpose of calculation, associated with change in behavior of a customer, relative to the customer's business-as-usual operating schedule for its energy asset(s).

Such changes in behavior may include allowing a temperature set point for an HVAC system to be set higher or lower than usual. The set point may be changed, e.g., to reduce the electric load drawn by the HVAC system at a particular time, thereby saving energy, resulting in lower energy bills and reduced emissions. The reduction in electric load also may support a demand response bid, providing additional revenue. The tradeoff for these financial benefits is that the actual temperature in a building served by the HVAC may deviate from the desired temperature. The temperature deviation may cause physical discomfort to people who are in the building at the time. The temperature deviation also may pose operational risks to an enterprise, e.g., when the temperature in a computer server room is allowed to rise, thereby threatening efficient operation of the computers in the room and increasing the risk of components overheating, which could lead to increased response times, unscheduled downtime, or equipment repair and replacement costs.

As noted previously, operational and physical limitations may be provided to the optimizer as constraints on the optimization, such as a maximum permissible temperature. The optimizer also may take as input, however, a monetary cost function associated with deviation from BAU operations, such as deviation of the temperature set point within operationally permissible limits. For example, a customer may determine that a deviation in temperature of one degree over an hour in a particular building is worth $100 to the customer. Thus, if the customer were offered more than $100 to allow this deviation for an hour, the customer would accept the offer, but the customer would not be willing to accept an offer of less than $100. In some examples a cost function may be a linear cost function, such than an additional deviation of one degree, i.e. two degrees of temperature rather than one, is worth $200, three degrees are worth $300, and so on. Alternative examples may include other types of functions as well. For example, the cost function may be exponential, rather than linear (e.g., cost=deviation squared). Thus, the cost for additional deviation would always be greater than the cost of previous deviation. Another alternate cost function is an inverse exponential function, such that there is a high initial cost for deviation from BAU operations, but once the decision to deviate has been reached, additional deviation is less of a problem. It should be noted that cost functions may be used in combination with hard operational constraints, as well. For example, a customer may choose to accept $100/hr for each degree of temperature deviation from the BAU set point, but only up to a maximum of five degrees of deviation.

Any other proposed change in behavior from the BAU scenario may be represented with a cost function, as well. Load shifting in time (discussed above) may present an inconvenience that the customer is willing to tolerate, but only for a certain minimum level of reward. Running a diesel generator to provide electricity rather than drawing the electricity from the grid may have additional costs beyond the financial operational costs such as fuel and maintenance costs. For instance, the diesel generator may produce a large amount of undesired noise, which the customer is willing to accept, but only if the price is right. These and any other appropriate changes in behavior may be represented jointly in a cost function.

Optimization

As discussed above, examples according to the principles herein may perform a mathematical optimization to determine an operating plan for a customer's energy assets that maximizes revenues, minimizes expenses, and accounts for comfort-related concerns. A mathematical optimization takes two sets of inputs: 1) an objective function, defining the value that is to be optimized (generally, either maximized or minimized), and 2) a set of constraints defining the set of acceptable scenarios for the optimizer to consider. In order to provide an objective function and a set of constraints that can produce a useful plan for operating energy assets, we also will want 3) a mathematical model of the physical properties of the energy assets that will define the variables used to define the objective function and the constraints. Each of these three elements will be discussed in turn.

Objective Function

For the light bulb example discussed above, the customer may optimize its usage of the single light bulb by solving to maximize the following non-limiting example objective function:

$$\int_0^T [DR\$(t) - C(t) + \alpha(t)(100 - DIM(t))] dt \qquad \text{Eq. 28}$$

where T is a constant representing the value of the variable t, representing time, at the end of the time period to be optimized, DR$(t) is the amount of money received from payments for demand response performed at time t, C(t) is the retail electricity cost paid by the customer to consume energy at time t, α(t) is a convenience/comfort factor representing the importance to the customer of powering the light bulb at time t, and 100-DIM is the percentage of maximum brightness that the light bulb realizes at time t.

The definite integral above represents a continuous system for which any of demand response values, costs, comfort values, and brightness settings all may vary between any arbitrary points in time. In practice, it is advantageous for purposes of calculation to convert this integral over continuous functions into an associated approximation represented by a summation over discrete functions as follows:

$$\sum_{t=0}^{T} [DR\$(t) - C(t) + \alpha(t)(100 - DIM(t))] \qquad \text{Eq. 29}$$

where t takes a series of discrete values evenly distributed between 0 and T.

Generally speaking, this objective function represents the idea that the customer will seek to maximize the customer's economic utility by maximizing revenues and minimizing costs. As noted above, non-economic factors such as comfort constraints (e.g., the HVAC system should not let the temperature in the building stray too far from a predetermined set point) may be modeled in economic terms by assigning an economic "cost" to deviations.

The objective function is optimized subject to any constraints that may exist on the system. These constraints may be physical constraints, such as maximum or minimum settings of energy asset equipment (e.g., the light bulb cannot dim below 30% of maximum brightness). The constraints also may be customer-driven constraints relating to operational requirements and preferences (e.g., the light bulb must be on from 1 p.m. to 3 p.m. every day).

To show how this optimization might work in practice, the example of a single light bulb asset, described above, will now be explained further in the context of a variety of scenarios.

Scenario 1

In a first exemplary scenario, the customer provides a constraint requiring that the light bulb must be on at least 9 hours per day out of the 10 hours from 8 a.m. to 6 p.m. The baseline usage is for the light bulb to be on from 8 a.m. to 6 p.m. and off at all other times. To further simplify this example, the light bulb is assumed always to be either on at 100% brightness, of completely off (i.e., 0% brightness). Further, a(t) is assumed to be zero, eliminating the comfort term from the equation altogether. The comfort constraint in this case is modeled instead by the requirement that the light bulb be on for 9 hours.

The real-time price for the utility provider to supply electricity to the customer may vary throughout the day. For example, the price may be $0.01/kwh at 8 a.m., 9 a.m. and 10 a.m., $0.05/kwh at 11 a.m., $0.12/kwh at 12 p.m. and 1 p.m., $0.16/kwh at 2 p.m., $0.18/kwh at 3 p.m., and $0.01/kwh again at 4 p.m. and 5 p.m. The customer's retail rate for electricity may be a continuous $0.10/kwh throughout the day. At times when the retail rate exceeds the price to the utility provider, the utility provider can expect to make money by providing electricity to the customer. At times when the price to the utility provider exceeds the retail rate, however, providing electricity to the customer becomes a losing proposition for the utility provider. At such times, the utility provider has a financial incentive to try to get the customer to reduce its load by, e.g., agreeing to a demand response contract.

The value of the demand response contract may be equal to the price to the utility provider to provide electricity (referred to as the Locational Marginal Price, or "LMP"). The rationale for such a valuation is that the transaction is equivalent to the utility provider "buying back" electricity from the customer at prevailing market rates. Alternative valuations are possible, however. For example, the value may be equal to the LMP discounted by the generation and transmission (or "G&T") rate, which is a value representing a cost associated with creating electricity and delivering it. The formula chosen for setting the value of a demand response contract generally is dictated by a regulatory authority having responsibility for regulating the demand response market.

These data points may now be used to maximize (expression 5) to solve for the customer's optimal schedule of energy asset usage and demand responses. In this greatly simplified example, the customer's constraints allow for the light bulb to be turned off at most for one hour, but there is no penalty for the one hour cutback. Thus baseline energy consumption of 10 hours of light bulb use would cause C(t) to be $0.10 at all values of t (10 hours, 8 a.m. to 5 p.m.), so that the sum over the day of C(t) would be 10*$0.10=$1.00. Reducing energy consumption by turning the light bulb off for one hour reduces C(t) from $0.10 to $0.00 for that particular hour, so that the sum over the day of C(t) is 9*$0.10=$0.90.

Considering the DR$ term in (expression 5), the optimal solution can now be determined by looking at the LMP values throughout the day. Because DR$ is equal to the LMP value at the hour when the light bulb is turned off, the optimal solution is to turn the light bulb off at the time when the LMP is the highest. In this example, this occurs at 3 p.m., when the LMP is $0.18. Thus the optimal operating schedule will be to have the light bulb on during the hours of 8 a.m. through 2 p.m., turn the light bulb off at 3 p.m., and the light bulb is on again at 4 p.m. and 5 p.m. The customer bids 1 hour of 1 kwh demand response at 3 p.m.

Under the optimized schedule, the customer's total economic utility for the day, as defined by (expression 5), is the total demand response revenue minus the total retail cost of electricity, or $0.18−9*$0.10=−$0.72 (i.e., a total cost of $0.72). The total economic utility for the day of baseline electricity usage is, by comparison, $0.00−10*$0.10=−$1.00 (i.e., a total cost of $1.00). And so by optimizing the customer's energy usage schedule and demand responses, net savings of $0.28 are realized ($0.10 from retail electricity cost reduction and $0.18 in demand response revenue).

Scenario 2

In a second exemplary scenario, the customer also has a second energy asset, a fuel cell. The fuel cell can generate energy by consuming fuel at a generation cost of $0.12/kwh. The customer's baseline usage and the hourly LMP are the same as in Example 1, above. The customer's net utility in this example can be modeled as follows:

$$\sum_{t=0}^{T} [DR\$(t) - C(t) - GenC(t) + \alpha(t)(100 - DIM(t))] \quad \text{Eq. 30}$$

where GenC(t) is the cost associated with generating electricity from the fuel cell at time t. Because the customer's cost to generate energy from the fuel cell, $0.12/kwh, is greater than the customer's retail energy rate, $0.10, the customer generally cannot reduce its energy costs by drawing energy from the generator instead of from the electrical grid. Indeed, such systems conventionally have been employed as fail-safe systems to be used in cases where there is a blackout and electricity is temporarily unavailable from the grid.

Due to the possibility of bidding reduced load at the meter into the demand response markets, however, it may in some cases be to the customer's economic benefit to draw electricity from a generator such as a fuel cell instead of from the electrical grid. When the customer draws energy from the generator rather than the grid, and simultaneously earns demand response revenue in exchange for the reduced load, the customer saves money if the amount earned from demand response exceeds the difference between the generation cost and the retail cost (i.e., DR$(t)>GenC(t)−C(t)). In the present example, GenC(t)−C(t) is $0.12−$0.10=$0.02 for all values of t from 8 a.m. to 5 p.m. Assuming that DR$(t)=LMP(t) when the customer bids 1 kwh of load reduction into the demand response market at time t (i.e, the customer shuts the light bulb off or powers the light bulb from the generator for the hour), the customer will stand to improve its economic utility by running the generator and bidding power into the demand response market whenever LMP(t) exceeds $0.02.

Thus at 8 a.m., 9 a.m., 10 a.m., 4 p.m. and 5 p.m., when LMP(t) is $0.01, the customer would not be advised to run the generator. For the hours 11 a.m. through 3 p.m., however, LMP(t) exceeds $0.02, and running the generator and bidding load reduction into the demand response markets is a winning proposition. In practice, the demand response markets might not accept a bid when LMP(t), because suppliers are able to provide energy to the customer at less than the customer's retail rate, and thus the suppliers make more money when the customer uses more energy. In the present example, this implicates only 11 a.m., when LMP(t) is $0.05 (i.e., greater than $0.02, but less than $0.10). For the hours of 12 p.m., 1 p.m., 2 p.m. and 3 p.m., when LMP(t) is $0.12, $0.12, $0.16 and $0.18 respectively, the customer will be advised to run the generator instead of drawing energy from the grid. This operation will cost $0.12/hr in generation costs, but will save $0.10/hr in retail energy costs and also earn between $0.12/hr and $0.18/hr from demand response, for a total economic benefit of between $0.22/hr and $0.30/hr. The total economic benefit thus equals DR$(t)−GenC(t) [for t=12 p.m–3 p.m]= ($0.12+$0.12+$0.16+$0.18)+4*($0.10−$0.12)=$0.50.

In this example there is still one more variation from the customer baseline that can be employed to improve the customer's overall economic utility. The comfort constraints allow for the light bulb to be off for one hour during the day, saving the customer the retail cost of energy for that hour (i.e., $0.10). This hour could be any hour the customer prefers. The total economic benefit from optimizations is $0.50+$0.10=$0.60. Thus instead of spending $1.00 on electricity for the day, the customer sees net expenses of $1.00−$0.60=$0.40 for the day. (Note that if demand response is an option for the hour when LMP(t) is $0.05, the customer will be able to improve on this by $0.05, for total net expenses of $0.35.)

Emissions Considerations

Figure 15:
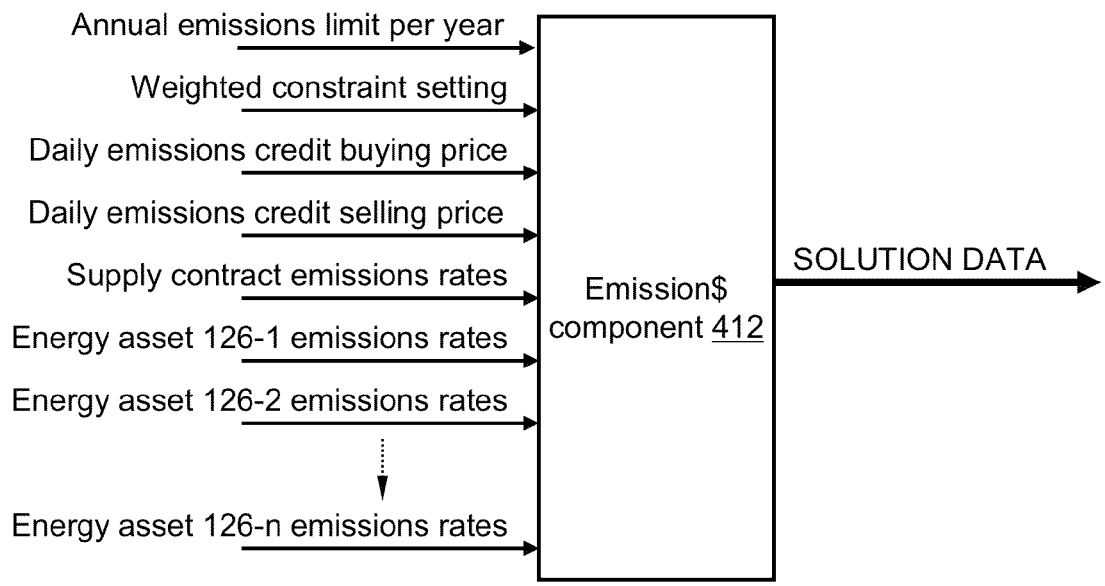
FIG. 15 illustrates additional details of an emissions component of the energy management system of FIG. 11, according to a principle herein.

FIG. 15 illustrates more details of Emission$ component 412 of energy management system 110 of FIG. 11. In one example, Emission$ component 412 is designed to optimize emissions production of customer sites 120 with respect to three types of emissions (1) COx emissions (e.g., carbon monoxide and carbon dioxide emissions), (2) NOx emissions (e.g., nitrogen dioxide and related pollutant emissions), and (3) SOx emissions (e.g., sulfur dioxide and related pollutant emissions). Emission$ component 412 is not limited to processing COx, NOx, and SOx emissions only. Emission$ component 412 may be used for processing any types of emissions.

One feature of Emission$ component 412 is to perform optimization to minimize emission costs and maximize emission related revenues. This optimization is based, for example, on (1) yearly target emissions per emission type per customer site 120, (2) a hard constraint or a weighted deviation, (3) price to buy each emissions credit in the market, (4) revenue gained from selling each emissions credit in the market, (5) emission rate for each emission type of supply electricity (e.g., the local energy grid's emission rates), and (6) emission rate for each emission type of each fuel-consuming energy asset 126 at the customer site 120 (e.g., a heater's emission rates, a diesel generator's emission rates, etc). Another feature of Emission$ component 412 is to compare the customer site 120 emissions footprint of an optimized schedule vs. BAU (business as usual) schedule to show how much less emissions are produced using the optimized schedule.

Accordingly, FIG. 15 shows that the input data of Emission$ component 412 may include, but is not limited to, the annual emissions limit per year (i.e., the cap), a weighted constraint setting, the daily emissions credit buying price, the daily emissions credit selling price, the supply contract emissions rates, and the individual emissions rates for all fuel-consuming energy assets 126 at the customer site 120. For example, FIG. 15 shows energy asset 126-1 emissions rates through energy asset 126-n emissions rates.

The annual emissions limit per year (i.e., the cap) is the maximum emissions allowed (e.g., annually) for a given customer site 120. The cap is set by a regulatory body. Each customer site 120 must ensure that it does not exceed its individual cap. Emissions programs may be mandatory or voluntary. Therefore, Emission$ component 412 may have a weighted constraint setting. For example, the weighted constraint may be set to 0, which means do not enforce the emission target (i.e., ignore compliance); set to 1, which means enforce emission target as a soft constraint (i.e., voluntary compliance); or set to 2, which means enforce emission target as a hard constraint (i.e., mandatory compliance). The daily emissions credit buying price is the price to buy an emissions credit at a given customer site 120. The daily emissions credit selling price is the price to sell an emissions credit at a given customer site 120. Accordingly, Table 1 shows an example of the type of emission constraint data that may be input to Emission$ component 412.

TABLE 1

Emission constraint data

| Data Item | Description |
| --- | --- |
| CustomerName | Customer name or ID |
| DayID | Day ID string |
| Cox_Target | Daily COx emission target in lbs (tons, etc) |
| Cox_Cost | Daily emission cost in $/lbs (ton, etc) for COx emission production |
| Cox_CreditPrice | Daily COx emission credit price in $/lbs (ton, etc). |
| Cox_AllowancePrice | Daily COx emission allowance price in $/lbs (ton, etc). |
| Cox_TargetType | 0 - Do not enforce COx emission target<br>1 - Enforce COx emission target as soft constraint<br>2 - Enforce COx emission target as hard constraint |
| Repeat for NOx | 0 - Do not enforce COx emission target<br>1 - Enforce COx emission target as soft constraint<br>2 - Enforce COx emission target as hard constraint |
| Repeat for SOx | 0 - Do not enforce COx emission target<br>1 - Enforce COx emission target as soft constraint<br>2 - Enforce COx emission target as hard constraint |

Emissions are produced by two categories of energy sources (1) local utilities (e.g., energy grid 140) and (2) any fuel-consuming energy assets 126 of customer sites 120, which are the end users.

With respect to local utilities, the energy supply originates from a mix of generation portfolios. Accordingly, there is industry-published data of the emissions contents of the energy supplied by the local utility for a given customer site 120, which is the supply contract emissions rates. For example, for each MWh generated at a certain utility, the amount/MWh of COx, NOx, and SOx emissions produced is known and published. Accordingly, Table 2 shows an example of the type of supply contract emissions data that may be input to Emission$ component 412.

TABLE 2

Supply contract emissions data

| Data Item | Description |
|---|---|
| COx Rate | Rate Decimal in lbs (tons, etc)/MWh. The carbon emission rate of the supply contract |
| NOx Rate | Rate Decimal in lbs (tons, etc)/MWh. The nitrogen emission rate of the supply contract |
| SOx Rate | Rate Decimal in lbs (tons, etc)/MWh. The sulfur emission rate of the supply contract |

With respect to fuel-consuming energy assets 126, for each type of fuel (e.g., heating fuel oil, diesel fuel, propane gas, and natural gas) there is an emissions value for a unit of fuel consumed. Examples of energy assets 126 that consume fuel may include, but are not limited to, oil fired heaters, gas fired heaters, gas turbines, and industrial diesel generators. For any individual energy asset 126, the total number of units of fuel consumed for a chosen period of time is used to calculate the amount of emissions produced by that asset. For any individual customer site 120, the emissions for a chosen period of time of all fuel-consuming energy assets 126 is totaled to calculate the total amount of emissions produced at the customer site 120.

An example of a fuel-consuming energy asset 126 is a heater. Therefore, the emissions rate for each unit of fuel consumed by the heater is an input to Emission$ component 412. For example, the COx, NOx, and SOx emissions rates for each MBtu of natural gas consumed by the heater are input to Emission$ component 412. Another example of a fuel-consuming energy asset 126 is a diesel generator. Therefore, the COx, NOx, and SOx emissions rates for a gallon of diesel fuel consumed by the generator are input to Emission$ component 412. This emissions rate information may be supplied by the manufacturer of the particular energy asset 126. The emissions rate for each type of fuel is a predetermined industry standard rate. Accordingly, Tables 3 and 4 show an example of the type of heater data and generator data, respectively, that may be input to Emission$ component 412.

TABLE 3

Heater static data

| Data Item | Description |
|---|---|
| COx Rate | Decimal in lbs (tons, etc)/MBtu of fuel. The carbon emission rate of the heater fuel |
| NOx Rate | Decimal in lbs (tons, etc)/MBtu of fuel. The nitrogen emission rate of the heater fuel |
| SOx Rate | Decimal in lbs (tons, etc)/MBtu of fuel. The sulfur emission rate of the heater fuel |

TABLE 4

Generator static data

| Data Item | Description |
|---|---|
| COx Rate | Rate Decimal in lbs (tons, etc)/Gal (cfm, ton, etc) of fuel. The carbon emission rate of the generator fuel |
| NOx Rate | Decimal in lbs (tons, etc)/Gal (cfm, ton, etc) of fuel. The nitrogen emission rate of the generator fuel |
| SOx Rate | Decimal in lbs (tons, etc)/Gal (cfm, ton, etc) of fuel. The sulfur emission rate of the generator fuel |

Tables 5 through 11 show examples of the types of solution data that may be generated by Emission$ component 412. That is, Tables 5 through 11 show an example of the output of Emission$ component 412.

TABLE 5

Case summary solution data

| Data Item | Description |
|---|---|
| COx_Production | COx production in lbs |
| COx_Cost | Daily cost for COx emissions |
| NOx_Production | NOx production in lbs |
| NOx_Cost | Daily cost for NOx emissions |
| Sox_Production | SOx production in lbs |
| Sox_Cost | Daily cost for SOx emissions |

TABLE 6

Market demand resource solution data

| Data Item | Description |
|---|---|
| Cox | Produced COx emission of the market demand resource |
| NOx | Produced NOx emission of the market demand resource |
| Sox | Produced SOx emission of the market demand resource |

TABLE 7

Customer solution data

| Data Item | Description |
|---|---|
| Cox | Produced COx emission by the customer |
| COx_Cost | Interval cost in $/lbs (ton, etc) for COx emission production |
| NOx | Produced NOx emission by the customer |
| NOx_Cost | Interval cost in $/lbs (ton, etc) for NOx emission production |
| Sox | Produced SOx emission by the customer |
| Sox_Cost | Interval cost in $/lbs (ton, etc) for SOx emission production |

TABLE 8

Supply contract solution data

| Data Item | Description |
|---|---|
| Cox | Produced COx emission by the supply contract |
| NOx | Produced NOx emission by the supply contract |
| Sox | Produced SOx emission by the supply contract |

TABLE 9

Heater time dependent data

| Data Item | Description |
|---|---|
| COx | COx emission in lbs (ton, etc) produced by a baseboard heater |
| NOx | NOx emission in lbs (ton, etc) produced by a baseboard heater |
| SOx | SOx emission in lbs (ton, etc) produced by a baseboard heater |

TABLE 10

Generator solution data

| Data Item | Description |
|---|---|
| COx | Produced COx emission by the generator |
| NOx | Produced NOx emission by the generator |
| SOx | Produced SOx emission by the generator |

TABLE 11

Emission constraints solution data

| Data Item | Description |
|---|---|
| CustomerName | Customer name or ID |
| DayID | Day ID string |
| Cox | Produced COx emission by the customer |
| Cox_Credit | COx credit in $/lbs (ton, etc)., the amount below the target |
| Cox_Allowance | COx emission allowance in $/lbs (ton, etc), the amount above the target |
| Cox_Cost | Daily emission cost in $/lbs (ton, etc) for Cox emission production |
| Cox_CreditValue | Daily credit value in $/lbs (ton, etc) for Cox emission production |
| COxAllowancecost | Daily allowance cost in $/lbs (ton, etc) for Cox emission production |
| Repeat for NOx | Daily allowance cost in $/lbs (ton, etc) for Cox emission production |
| Repeat for SOx | Daily allowance cost in $/lbs (ton, etc) for Cox emission production |

With respect to Tables 1 through 11, all information thereof exists for each time interval (e.g., every 30 minutes) of the operating schedule for the chosen period of time. Emission$ component 412 may calculate the time intervals of the day that produce the most and least amount of emissions. Additionally, Emission$ component 412 may calculate the deviation from the emissions cap.

Graphical user interface (GUI) screens (not shown) associated with Emission$ component 412 may be used to present customer-level information for a certain period of time. For example, for a certain customer site 120, GUIs may be provided for displaying the total COx, NOx, and SOx emissions (with the capability to drill down to hourly data), BAU emissions vs. optimized emissions, emissions credits bought, and emissions credits sold. Also, GUIs of Emission$ component 412 may be used to present energy asset-level information for a certain period of time. For example, for a certain energy asset 126, GUIs may be provided for displaying the total COx, NOx, and SOx emissions (with the capability to drill down to hourly data), and BAU emissions vs. optimized emissions.

In summary, Emission$ component 412 monitors the cap, while at same time determines the need to buy emissions credits and/or sell emissions credits. Emission$ component 412 optimizes for minimizing emissions costs. In one scenario, a customer site 120 may increase energy consumption (therefore increasing emissions) and buy emissions credits. In another scenario, a customer site 120 may reduce energy consumption (therefore reducing emissions) and sell emissions credits. Therefore, Emission$ component 412 may output one of three solutions (1) use exactly the emissions cap amount (operate at the cap limit), (2) buy emissions credits, or (3) sell emissions credits—all based on financial values in energy markets and emissions markets.

Operating Schedules and Optimization

Figure 16:
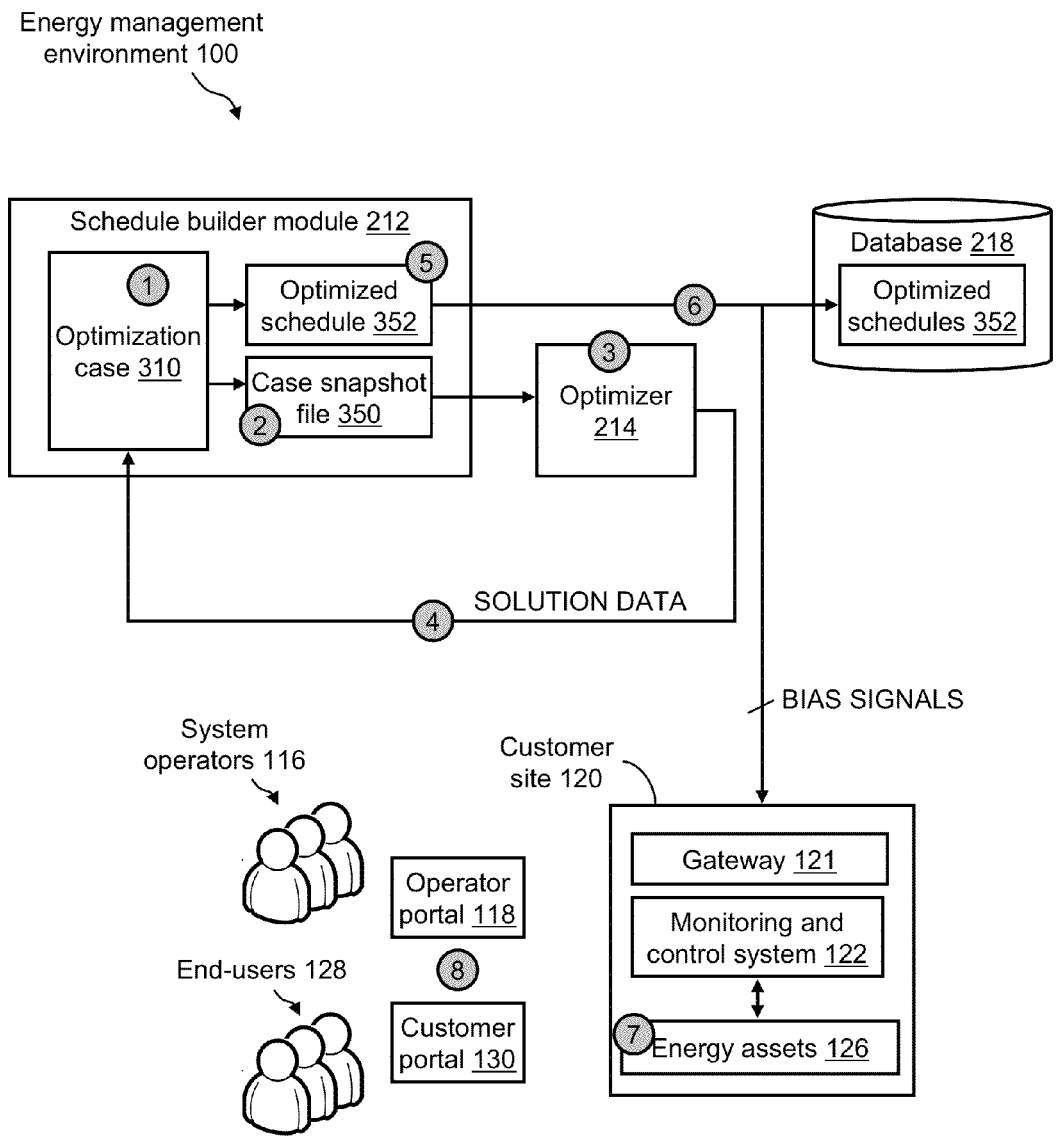
FIG. 16 illustrates a block diagram of a portion of the energy management environment and energy management system of FIG. 12 in which a process of creating and optimizing a schedule for managing energy assets is implemented, according to a principle herein.

FIG. 16 illustrates a block diagram of a portion of energy management environment 199 and energy management system 110 of FIG. 11 in which a process of creating and optimizing a schedule for managing energy assets is implemented. In this example, the process of creating and optimizing a schedule for managing energy assets of any energy-consuming and/or energy-producing environment for a chosen period of time may include, but is not limited to, the following steps.

At step 1, schedule builder module 212 is used to collect, compile, and/or process, for example, the information described in FIG. 13. That is, schedule builder module 212 pulls in all the information from customer component 312, location component 314, supply contract component 316, strategy component 317, price component 318, weather component 320, solar gain component 322, emissions component 324, defaults data 330, forecasts data 332, constraints data 334, readings data 336, and/or the simulation results created via case modeling and simulation component 340 into a single object, which is optimization case 310, that may be published to optimizer 214.

At step 2, the schedule builder module 212 generates a case snapshot file 350 that contains a snapshot of the simulation results from case modeling and simulation component 340 and all other information collected by and/or included in optimization case 310. For example, case snapshot file 350 includes attributes of all the energy assets 126 as well as other information, such as energy price information 156, weather information 160, and emissions information 164. Case snapshot file 350 is fed into optimizer 214. Further, the information in case snapshot file 350 is based on the strategy determined by strategy component 317. In one example, case snapshot file 350 may be a comma-separated values (CSV) file. This CSV file is written into the queue of the enterprise service bus 230 of energy management system 110. The enterprise service bus 230 may use, for example, File Transfer Protocol (FTP) to transmit the CSV file to the optimizer server (not shown), which is where optimizer 214 resides.

At step 3, optimizer 214 reads in the case snapshot file 350 and performs a two step process. The first step is to calculate how the environment responds on a normal day using the default settings of energy assets and with no outside intervention by energy management system 110. The result of the first pass may be called the CBL or BAU schedule. Additionally, optimizer 214 indicates the financial cost with respect to the CBL or BAU schedule. The second step is to run optimization with certain operating changes that may be entered by a system operator 116 of energy management system 110. The second step also considers weather conditions, energy prices, and emissions credits prices. Again, optimizer 214 indicates the financial cost of the optimized operating schedule, preferably showing the financial benefit thereof as compared with the first optimization pass.

Upon completion of the two steps, optimizer 214 generates a set of SOLUTION DATA for optimizing the operation and/or control of energy assets 126 for a chosen period of time with respect to (1) maintaining suitable comfort levels, (2) significantly reducing energy costs (3) significantly increasing revenue from energy markets (4) significantly reducing emissions, and/or (5) significantly increasing revenue from emissions trading. That is, optimizer 214 generates a set of SOLUTION DATA for the energy assets 126 that optimizes the energy usage, generation (if any), and storage (if any) of a customer site 120 for the purpose of reducing energy costs, reducing emissions costs, and/or generating revenue from energy markets. Accordingly, a main function of optimizer 214 is to achieve the financial objective of minimizing cost with respect to the overall energy costs of a customer site. Therefore, SOLUTION DATA includes the results of the combination of multiple sub-functions (according to equation 1), such as, but not limited to, the following.

a. cost of deviation from business-as-usual (BAU) comfort levels,
b. cost of deviation from the emissions target,
c. cost of electric power production by the customer energy generating assets, d. cost of electric power supply from the load serving entity (e.g., energy grid) or the electric distribution company, and e. demand response (DR) revenue.

At step 4, the SOLUTION DATA from optimizer 214 is transmitted back to schedule builder module 212.

At step 5, the SOLUTION DATA is formatted as an optimized schedule 352. The optimized schedule 352 is for a chosen period of time, such as one 24-hour period (i.e., one calendar day), and includes settings information for a customer site 120. The settings may be provided on a predetermined interval, such as every 15, 30, 45, or 60 minutes.

The SOLUTION DATA from optimizer 214 may be interpreted by schedule builder module 212 and the result may be a BIAS SIGNAL that is transmitted to the customer's monitoring and control system 122. That is, because there may be an assumption that the energy assets 126 are operating at their individual default settings, energy management system 110 need only transmit any changes with respect to the default values. For example, if the default thermostat setting in a certain building zone is 70° F. and optimizer 214 determines that the thermostat setting should be 72° F. from 9-11 am, then a BIAS SIGNAL of +2° F. for the time period of 9-11 am is transmitted from energy management system 110 to the customer's monitoring and control system 122. Likewise, if the default thermostat setting is 70° F. and optimizer 214 determines that the thermostat setting should be 69° F. from 2-4 pm, then a BIAS SIGNAL of −1° F. for the time period of 2-4 pm is transmitted from energy management system 110 to the customer's monitoring and control system 122. There may be, for example, one BIAS SIGNAL per building and/or per building zone. Any BIAS SIGNAL is an additional input to the customer's monitoring and control system 122.

In other examples, in addition to the BIAS SIGNAL that is transmitted to the customer's monitoring and control system 122, a signal may be transmitted to a particular energy asset 126. For example, a signal may be transmitted to a chiller to indicate whether to charge or discharge ice. Further, a signal may be transmitted to a battery to indicate whether to charge or discharge the battery.

In the scenario in which the optimization strategy is iterative, process steps 1 through 5 may be repeated until suitable case optimization is achieved. Further, optimized schedule 352, along with constraints, may be passed back and forth between energy management system 110 and a certain customer site 120 and optimized multiple times before the end-user 128 accepts.

At step 6, once a suitable optimized schedule 352 is successfully achieved, the optimized schedule 352 is saved in database 218 and also deployed to the monitoring and control system 122 of the customer site 120. That is, a BIAS SIGNAL for each building zone is transmitted to the customer's monitoring and control system 122.

At step 7, once deployed, the energy assets 126 of the customer site 120 are operated and/or controlled according to the information in optimized schedule 352 for the chosen period of time.

At step 8, system operators 116 may use operator portal 118 to monitor and/or control energy assets 126 according to optimized schedule 352. Additionally, end-users 128 may use customer portal 130 to monitor and/or process information about the energy assets 126.

In certain examples, energy management system 110 of energy management environment 100 may be able to aggregate energy assets. For example, energy management system 110 has certain subscription of "regulation" customer sites 120 and of "synchronized reserve" customer sites 120. If an ISO/RTO 152 has a need for 500 kW and energy management system 110 has two customer sites 120 that can each supply 250 kW, energy management system 110 may aggregate the two sources into one 500 kW asset. In this way, the two customer sites 120 can participate in the market in a way that they otherwise could not. More particularly, energy management system 110 allows ISOs/RTOs 152 to be customer-agnostic and energy management system 110 can perform the aggregation to meet the demand. Currently, ISOs/RTOs 152 may require knowledge about every specific regulated asset. However, an aspect of energy management system 110 may be the capability to publish an amount of regulated assets to ISOs/RTOs 152 and then perform aggregation without ISOs/RTOs 152 having knowledge of specific assets.

In certain examples, energy management system 110 of energy management environment 100 may be able to aggregate energy assets. For example, energy management system 110 has certain subscription of "regulation" customer sites 120 and of "synchronized reserve" customer sites 120. If an ISO/RTO 152 has a need for 500 kW and energy management system 110 has two customer sites 120 that can each supply 250 kW, energy management system 110 may aggregate the two sources into one 500 kW asset. In this way, the two customer sites 120 can participate in the market in a way that they otherwise could not. More particularly, energy management system 110 allows ISOs/RTOs 152 to be customer-agnostic and energy management system 110 can perform the aggregation to meet the demand. Currently, ISOs/RTOs 152 may require knowledge about every specific regulated asset. However, an aspect of energy management system 110 may be the capability to publish an amount of regulated assets to ISOs/RTOs 152 and then perform aggregation without ISOs/RTOs 152 having knowledge of specific assets.

In certain examples, energy management system 110 of energy management environment 100 may be able to aggregate emissions credits. For example, if a certain customer site 120 has need to buy 1 emissions credit and two other customer sites 120 each have 0.5 emissions credits to sell, energy management system 110 may aggregate the two selling customer sites 120 to meet the need of the buying customer site 120. In this way, energy management system 110 can perform the aggregation to meet the demand for emissions credits, which allows emissions regulatory agencies 162 to be customer-agnostic.

Figure 17:
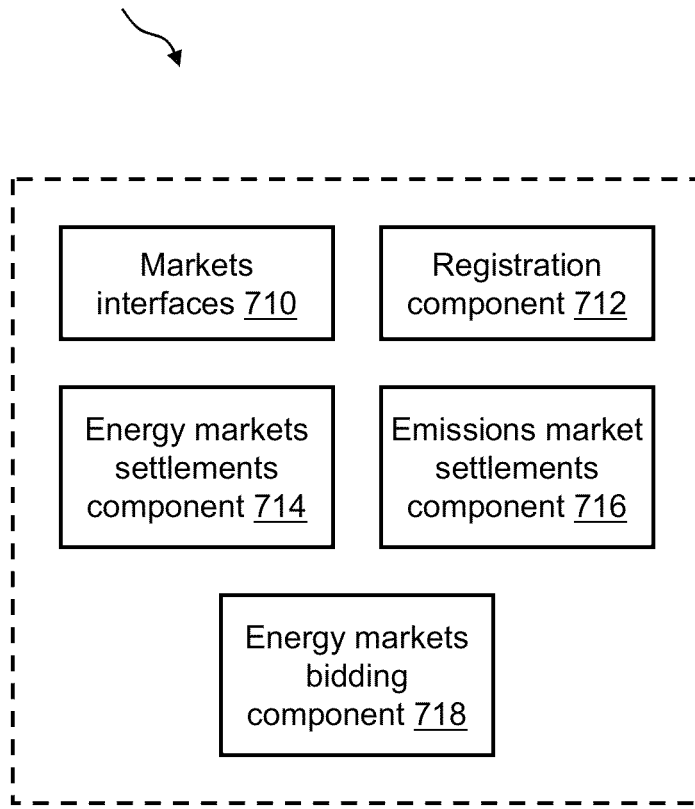
FIG. 17 illustrates a block diagram of a markets module of the energy management system of FIG. 12, according to a principle herein.

FIG. 17 illustrates a block diagram of markets module 216 of energy management system 110 of FIG. 11. Markets module 216 is used for interacting with any entities in the energy markets, such as ISOs/RTOs 152. For example, markets module 216 may include certain markets interfaces 710, which may be any mechanisms for interfacing with the market. Markets interfaces 710 may be used to interface with ISOs/RTOs 152 for handling settlement processes in energy markets. Additionally, markets interfaces 710 may be used to interface with emissions regulatory agencies 162 (or associated brokers) for handling settlement processes in emissions markets.

Markets module 216 may also include a registration component 712. Registration component 712 is used for registering energy assets in a particular market for committing assets. Markets module 216 may further include an energy markets settlements component 714. Energy markets settlements component 714 is used for managing the process of settlements reconciliation in any energy markets between, for example, ISOs/RTOs 152 and customer sites 120. Markets module 216 may also include an emissions market settlements component 716. Emissions market settlements component 716 is used to process emissions trading settlements and credit transfers, such as settlements between emissions regulatory agencies 162 (or associated brokers) and customer sites 120 and credit transfers between two customer sites 120.

While FIG. 17 shows two separate settlements components (e.g., energy markets settlements component 714 and emissions market settlements component 716), in other examples, a single settlements component may be used to handle both types of settlements.

Markets module 216 may also include an energy markets bidding component 718. Energy markets bidding component 718 may be, for example, an entry tool by which system operators 116 may submit bids into certain markets, such as, but not limited to, (1) the energy market, (2) the day-ahead scheduling reserve market, (3) the capacity market, (4) the synchronized reserve market, and (5) the regulation market. Based on the outcomes of this bidding process, energy markets settlements component 714 may be used to process financial settlements between, for example, ISOs/RTOs 152 and consumer sites 126.

Following is a description of the different markets, including energy markets and regulation markets, to illustrate how each market can affect the operation of any of the energy assets described herein.

Dynamic Virtualization

Dynamic virtualization is an integrated solution for energy generation and storage involving energy assets, such as batteries and solar generators. This uses a version of examples with virtual partitioning of an energy storage asset. Dynamic virtualization can be used to co-optimize energy storage assets and solar generation across different energy markets or other uses. These markets or uses may include (1) electric energy provided over the grid to the energy market, and (2) the ancillary services market (which may include regulation, which is focused on regulation of power frequency and voltage on the grid) or (3) use of the storage device to maintain power quality at the owners' facilities.

Dynamic virtualization uses examples of systems with the virtual partitioning of the battery or other type of energy storage asset into virtual separate batteries, each virtual energy storage asset being allocated to separate markets or functions, such as participating in the energy market, and the ancillary services (regulation) market or use to maintain power quality at the premise. The virtual partition of the batteries is not physical, but is instead an allocation of energy storage asset capacity to various markets or uses. This virtual partition by allocation is dynamic in that it can be constantly changed in response to changing price points and performance requirements during the day.

There are rapid swings in load on the spot electric energy market. In order to maintain electrical balance on the grid and regulate consistent power and voltage on the grid over short periods of time, for example, over periods of four seconds, fifteen seconds, or one minute, the grid operator sends out signals to change generation to match the load changes. Batteries are particularly well suited to respond to these short response time signals.

With examples of the principles herein, energy storage assets such as batteries can be applied to swing between the markets for energy and ancillary services for regulation of the grid or for the maintenance of power quality at the energy storage asset owner's facility. In the past, batteries were not purchased and installed for the purpose of providing regulation services, because batteries tend to be too expensive for this purpose alone. Most regulation services now come from gas powered generators providing about 1-10 megawatts, and these energy assets take time to turn on and off. Industrial batteries, however, are instant on and off and usually provide power in the 1 megawatt range—and can respond to grid operator signals in milliseconds.

In the past, energy storage and energy storage asset facilities were usually purchased with the intent to provide backup power for the owners, in case the electric power grid goes down or temporarily provides inadequate power. However, once the battery or other type of energy storage assets are installed to satisfy backup capacity for the owner, they may also to some extent be active in the regulation market to regulate the power and voltage on the grid, and in the energy market, to sell power into the grid in response to real-time pricing changes (or to cut the user's demand on the grid). For example, energy storage assets may discharge to the grid during high LMP price hours.

Energy storage assets may include batteries, ice units, compressed air, or other technologies to store energy on site by users and generators of power. Batteries may be of any type, including lithium ion, lead acid, flow batteries, dry cell batteries, or otherwise.

Solar generators of power may include solar panels, solar cells, any other photovoltaic power generator, or any means for generating power from sunlight. This may also include generation of electricity from steam or similar use of liquid to gas phase generation from sunlight, to generate electricity.

The energy market involves generating power, distributing power into the grid, and drawing power out of the grid, each at a price. This is measured in terms of megawatt hours that are the amount of power delivered. Energy is delivered for sustained periods of time, such as for 15 minutes or more.

The capacity market is measured in terms of megawatts of capacity. In this market, a seller makes their facilities available to generate electricity when needed and holds them in reserve for that purpose, but may never actually distribute energy into the grid rather than just be on-call. This, in effect, pays the seller to be available and impacts the reliability of the grid.

The ancillary market includes regulation of frequency and voltage in the grid, and the provision of an operating reserve. The regulation of the voltage in the grid involves discharging energy into the grid or absorbing energy from the grid in small increments, frequently, for short periods of time, and very rapidly.

Smart grid services increasingly rely on new technologies such as renewable energy and large-scale storage resources. Unfortunately, the life-cycle costs associated with such resources, when taken individually, are still high compared with more traditional forms of energy production. In addition, the desired proliferation of distributed and renewable resources on the power grid introduces new threats to its reliable operation, as they are subject to unpredictable drops in output, such as when the wind stops blowing. Consequently, both economic and reliability issues introduce substantial obstacles to a high penetration of those technologies in the power grid.

By themselves, storage resources such as electrical batteries are presently high cost options. Likewise, photovoltaic generation and wind turbines are comparatively quite expensive and their intermittency creates new strains on the power grid.

However, when optimally managed by various examples disclosed herein to provide timely support to the power grid, the net cost of electrical storage can be substantially reduced, as the result of payments by the grid operator (ISO/RTO) provides for facilities that can be called on to provide such support. Also, combining energy storage with intermittent generation makes technologies such as wind and solar more predictable on the grid, and hence, more valuable.

Examples, including dynamic virtualization, can dramatically improve the economics of renewable generation and storage technologies, by co-optimizing their operation to participate in the various energy and ancillary services (including regulation) markets and thus maximize their economic benefits.

Examples focus on the economics of batteries and energy storage and, by providing energy resource optimization and a gateway to the wholesale markets, can help facility managers deploy a comprehensive energy storage solution that can cost-effectively meet an organization's business objectives.

More broadly, when optimally coupling energy storage with renewable generation, various examples redefine the economics of such resources, while providing firm, dispatchable virtual generation that supports the reliability objectives of the power grid. Thus, by integrating distributed resources into virtual generation via system operator dispatch, examples can help enable the acceleration of renewable energy generation technologies such as solar and wind.

Systems Including Energy Storage Assets

Large-scale storage is widely seen as a necessary piece of the smart grid and a key component of America's electricity future. This recognition is driven by the following factors: (1) the growing adoption of intermittent renewable power sources; (2) state and nationwide budget shortfalls, leading local governments to seek cost-effective solutions for maintaining America's aging infrastructure; and (3) the widespread belief that electric vehicles ("EVs") will materially grow their market share over the next 5 to 15 years.

In this context, stakeholders have been looking for ways to accelerate the development and implementation of grid-level storage. Effective battery and other energy storage asset solutions can take unpredictable energy resources and turn them into reliable power, while matching electricity supply to demand; they play a crucial role in fostering microgrids and distributed generation, viable alternatives to expanding the U.S.'s power infrastructure; and they can address the new and unique concerns created by EVs, such as helping to maintain grid stability and giving utilities and grids more control over energy dispatch.

A key concern with batteries has long been their high upfront cost and long payback periods. Various examples address this by providing battery-owners a robust gateway to the wholesale electricity markets, thus unlocking new streams of revenues that increase their return on investment. This may also apply to other types of energy storage assets.

Various examples provide processor-executable instructions (including software solutions) that optimizes participation in wholesale markets by providing energy storage asset owners with dynamic virtualization, a service that continuously re-partitions the energy storage asset for different markets and uses, chiefly real-time energy, and regulation, and power quality control, in an optimized manner, based on pricing and weather data, retail electricity rates, and characteristics of the energy storage asset and its host site.

For large retailers and supermarkets, backup generation is a necessary but often expensive proposition. The nation's largest big box chains have taken a variety of approaches to minimizing the costs of providing substitute power in the case of an emergency or brownout; but for many stores, their only choice to date has been inefficient and costly diesel generators.

Examples with dynamic virtualization optimally manage an energy storage asset's state of charge based on the revenue producing opportunities in the wholesale market, as well as the organization's business objectives, such as providing backup power to critical loads for a given period of time.

Thus, when paired with these examples, the energy storage asset becomes an energy resource that will concurrently: (1) participate in the energy markets by providing a way to shift the net load of a facility from high- to low-price periods; (2) participate in the frequency regulation market by responding to real-time signals from the grid operator; (3) participate in other wholesale markets, such as energy and synchronized reserve; and (4) provide reactive/voltage support to the microgrid/distribution grid.

Examples enable the energy storage asset to maximize revenues from the various wholesale markets, while maintaining its ability to achieve its main objective of providing a reliability service to the organization. To achieve this, examples herein describe virtualization of the energy storage asset and creating dynamic "energy storage asset partitions," in a manner similar to the way computing resources are virtualized. Through its optimization capability, an example determines in hourly increments which portion of the controller output (including its capacity), and hence the energy storage asset capacity (including its SOC), can be allocated to the energy and regulation markets respectively, while maintaining sufficient reserve to meet the forecasted backup requirements. The optimal control (to perform the optimization described herein) can take into account the forecasted and real-time hourly prices for each of the markets, along with the time and weather dependent backup requirements of the facility. When combined with other resources such as renewable generation, backup generation or demand response, the examples described herein can extract the maximum value of all such resources while meeting the organization's reliability, comfort, and sustainability objectives.

Following is a description of the different markets, including energy markets and regulation markets, to illustrate how each market can affect the operation of an energy storage asset.

Regulation Market

In a non-limiting example, capacity of the energy storage asset may be committed to the regulation market to maintain the frequency and/or voltage on the power line. For example, system operators seek to maintain the system frequency at very near to a nominal frequency of around 60 Hz in the U.S. or around 50 Hz in some other countries (including countries in the European Union). If the frequency is too high, there is too much power being generated in relation to load. A system operator would send a signal to participants in the regulation market to increase their load, or ask for generation to be reduced, to keep the system in balance. If the frequency is too low, then there is too much load in the system, and the system operator would send a signal asking for generation to be increased or the load reduced. A grid operator may use a real-time communication signal to call for either a positive correction (referred to in the industry as "regulation up") or negative correction (referred to as regulation down"). If load exceeds generation, the frequency and voltage tend to drop. The ISO/RTO system operator would relay a signal requesting regulation up. If, however, generation exceeds load, the frequency tends to increase. The ISO/RTO system operator would relay a signal requesting regulation down (including asking for reduced generation).

The regulation market may seek commitment of a system on an hourly basis. However, the ISO/RTO system operator may relay regulation signals for regulation up and/or regulation down at much shorter timescales. For example, during the commitment period, the adjustments of regulation may take place minute-by-minute, on the order of a minute or a few minutes, or on the order of a few seconds (e.g., at 2-second or 4-second intervals). Traditional regulation applies to slower responding energy storage assets (e.g., assets with about 5 minutes response time), such as but not limited to chillers. Faster responding energy storage assets, such as but not limited to batteries, can respond within about 2 seconds. In an example, the objective cost function may include a term to performance incentives offered for fast responding energy storage assets. To participate in the regulation market, a resource may receive and may need to respond to a regulation signal generated by the grid operator approximately every 2 seconds. (In some territories, this rule may be relaxed somewhat for batteries.) The energy storage asset responds to this signal with a percentage of its maximum resource capability that is bid into the regulation market. Examples receive and respond to this signal and distribute it among the various resources participating in the regulation market within a given price zone, based on the results produced by an optimizer If the ISO/RTO system operator sizes the regulation signals to adequately balance the signal in the long run, the charge of the energy storage asset may merely fluctuate around its initial state of charge when it started to provide regulation. That is, the proportion of the available state of charge of the energy storage asset that is committed for use to provide regulation may be delivered at variable charge rates or discharge rates. Adequately balanced regulation signals should neither completely deplete nor fill the energy storage asset.

In a non-limiting example, the regulation price may be set at average values of around $30-$45/MW per hour, with hourly rates fluctuating around this average value. Some regulation markets may pay simply for the commitment of an available capacity of the energy storage asset during a time period, such as for an hour, with a separate payment for the total amount of energy ultimately provided. Thus, payment at the regulation price may be made for the period of commitment, even if the system is not called upon to provide regulation during the commitment period.

There may also be additional payment from the energy market for energy generated, based on the wholesale electricity market price (the LMP).

Operating characteristics of the energy storage asset include power (or its instantaneous delivery capability in kW) and the energy stored in the energy storage asset (or the amount of power it can generate over one hour, or kWh). In a non-limiting example, a battery rated at 1.5 MW power and 1.0 MWh energy storage capacity will be able to provide 1.5 MW power for a total period of 40 minutes (60×⅔₁.₅). Thus, if the owner bids 1.5 MW into the regulation market for a given hour, a 50% discharge signal over 2 seconds could decrease the battery's charge level by 0.8 kWh (1.5 MW×⅟₁₈₀₀ hrs).

As part of a certification for participating in the regulation market, the ISO/RTO system operator may verify that the energy storage asset is capable of responding to the regulation bid into the market. The ISO/RTO system operator may require that the energy storage asset be able to be charged/discharged at its full enrolled amount, when receiving a +/−100% regulation signal within a duration of 10 minutes. In the 1.5 MW example above, the battery charge would be increased/decreased by +/−250 kWh (1.5 MW×⅙ hr).

For example, assuming that the energy storage asset starts with an initial state of charge of 50% at time t=0. Ideally, the regulation signal is "net zero," meaning that the quantity of charged/discharged energy averages to zero over a given 24-hour period. In reality, the state of charge of the energy storage asset may at times drift to the limits of the energy storage asset's recommended state of charge. If the state of charge exceeds some adjustable maximum or minimum values, various examples include compensating by exiting the regulation market for the next hour and bringing the energy storage asset back to its initial set-point.

In an example, the operating schedule that is generated according to an implementation of an apparatus herein specifies intervals of time when the energy storage asset may be committed to the regulation market. During these time periods, the operating schedule may additionally indicate the points during these intervals of time where energy may be bought to charge the energy storage asset if its state of charge falls below a desirable limit, or where excess energy may be sold if the state of charge is too high. This discharge can contribute to a short-term demand response action in the real-time energy market.

Energy Market

To participate in the energy market, the energy storage asset should to be able to provide the "as bid" energy into the real-time market for the next hour. Various examples compute the optimal charge or discharge signal in anticipation of or in response to the economic signals, while maintaining minimum and maximum constraints on the state of charge of the energy storage asset. When combined with other controllable resources, such as renewable generation or advanced lighting and HVAC systems, examples extract the maximum economic value of each resource, given external factors and constraints. For example, examples can use an energy storage asset to compensate for the intermittency of renewable generation, and can include demand response actions to help maintain the balance.

Figure 18:
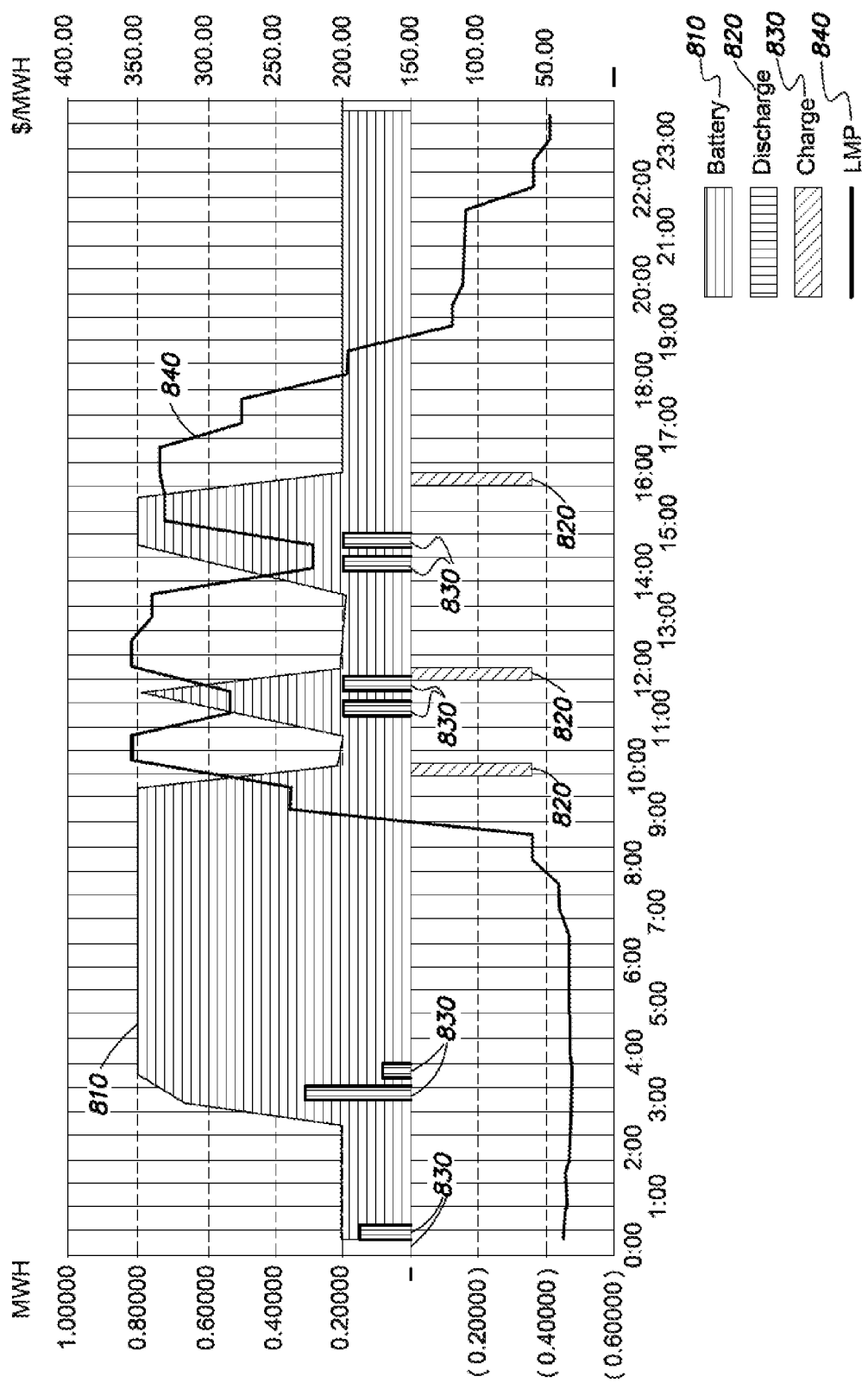
FIG. 18 shows an example of an implementation based on an operating schedule, according to a principle described herein.

FIG. 18 shows an example energy storage asset optimization in response to economic signals and performance needs. The horizontal axis is time over a 24 hour cycle. The left vertical axis is megawatt hours. The right vertical axis shows price in dollars per megawatt hours. The volume under the line battery 810 shows the stored capacity in the battery. The three lines below the horizontal axis shows the discharge 820 from the battery. The seven vertical lines 830 above the horizontal axis shows charging to the battery 830. The line 840 shows the LMP energy price throughout the 24-hour cycle to which indicated energy assets are responding. In this example, examples determine the optimized hourly charge and discharge schedule of a 1.5 MW/1.0 MWh battery in response to an LMP price signal. The optimization is further constrained to maintain a 200 kWh minimum capacity for backup purposes, and a maximum capacity of 800 kWh to maintain charge/discharge cycle efficiency.

Spinning Reserve Market

To participate in the spinning reserve market, the energy storage asset should to be able to commit resources to provide power during unplanned outages of base load generators. Spinning reserve is generation capability that can provide power to the grid immediately when called upon by the ISO/RTO and reach full capacity within 10 minutes. The energy storage asset needs to be electrically synchronized with the grid, e.g., through the controller, to participate in this market. Revenue in the spinning reserve market is for capacity rather than energy. It requires quick response but makes low total energy demand. Requests in the spinning reserve market may be made around 20-50 times per year.

Revenue for the spinning reserve market may be determined based on the ability of an energy storage asset to provide power during an unplanned event, such as a generator failure. Revenue may also be derived based on the amount of energy (MWh) that is generated during active participation in the spinning reserve market, such as based on the electricity wholesale price.

Market Based on Voltage/VAR Ancillary Service

To participate in a market based on a voltage/VAR ancillary service, certain resources of the energy asset may be committed to provide for voltage control and/or VAR control.

The voltage/VAR ancillary service seeks to maintain reliability and power quality. It may appear at the microgrid level or feeder level of a distribution system.

A voltage control ancillary service assists in maintaining system voltages within an acceptable range (120 volts±about 5% or 220 volts±about 5%) to customers served by a feeder. For example, if the supply line voltage fluctuates by some amount, resources of the energy asset may be committed to adjust the distribution primary voltage so that the distribution primary voltage also does not drift out of the acceptable range. In another example, if the current (ampere) flowing on the feeder increases during peak load conditions, the voltage along the feeder may decrease due to an increase in current flow, resulting in decreased voltage for customers that are further from the substation end of the feeder. Here, resources of the energy asset may be committed to raise the line voltage under peak load conditions to account for any increased voltage drop. If instead the feeder is lightly loaded, the voltage drop may be lower, and resources of the building asset may be committed to lower the voltage to avoid possible high voltage conditions.

VAR refers to the reactive power (measured in volt-ampere reactive (VARs)). VAR is the electrical energy that energizes capacitive components and inductive components in a power system. A non-limiting example of a capacitive component is overhead conductors, which are continuously charged and discharged by an alternating current (AC) waveform. Non-limiting examples of inductive components are electric motors and transformers, which can store energy in magnetic fields that are used for device operation. By reducing the amount of VARs flowing on the distribution feeder, an electricity supplier can reduce electrical losses and improve the voltage profile along the feeder. Where reactive power varies throughout the day, the capacitive components of a energy asset that are equipped with switches can be placed in or out of service as needs vary during the day. These capacitive components of the energy asset may be equipped with controllers. A system, apparatus, or method may be used to determine when to switch the switches on or off. For example, when the voltage at the location of the capacitive component is low, the operating schedule determined according to a principle herein may include instructions for the controller to close the switch to place the capacitive component in service. When the voltage is high, the operating schedule may include instructions for the controller to open the switch to remove the capacitive component from service.

Revenue from a market based on the voltage/VAR ancillary service may be determined based on the ability of an energy storage asset of the energy asset(s) to be used to provide the voltage controls and/or the VAR controls. In an example, the voltage/VAR control may apply in a microgrid application at the microgrid bus level, which may introduce a reliability cost to the computation of the net-energy-related cost.

Co-Optimization Across Multiple Markets and/or Ancillary Services

As described above, the economic signal can be a driver for the average charge status of the energy storage asset. It responds to price signals that are averaged on an hourly basis. The regulation signal can be seen as having a "bias" effect over the average charge, in response to the regulation commands. Examples co-optimize the energy storage asset charge by first economically optimizing the charge status of the energy storage asset, then allocating the balance of the available power to the regulation market, on an hourly basis.

By adding user-adjustable upper and lower constraints to the optimized energy storage asset charge, examples take into account reliability objectives (e.g. backup) and charge/discharge cycle efficiency. Other constraints can be added, based on the type of energy storage asset technology used, to maximize charge/discharge round trip efficiency, and optimize energy storage asset life versus energy storage asset replacement costs.

In addition to co-optimizing a storage resource at a given location, examples have the capability to perform a global optimization across multiple customers within the same price zone, and disaggregate the regulation and economic signals among the various customers. In particular, this gives customers that do not have the minimum energy storage asset capacity required the ability to participate in the regulation market.

Co-Optimization with Other Distributed Resources

With various examples, distributed resources can earn maximum economic benefit through co-optimization. Co-optimization of various resources on one site results in accelerated payback for all assets, and this, in turn, accelerates the market-wide penetration of these resources.

Figure 19:
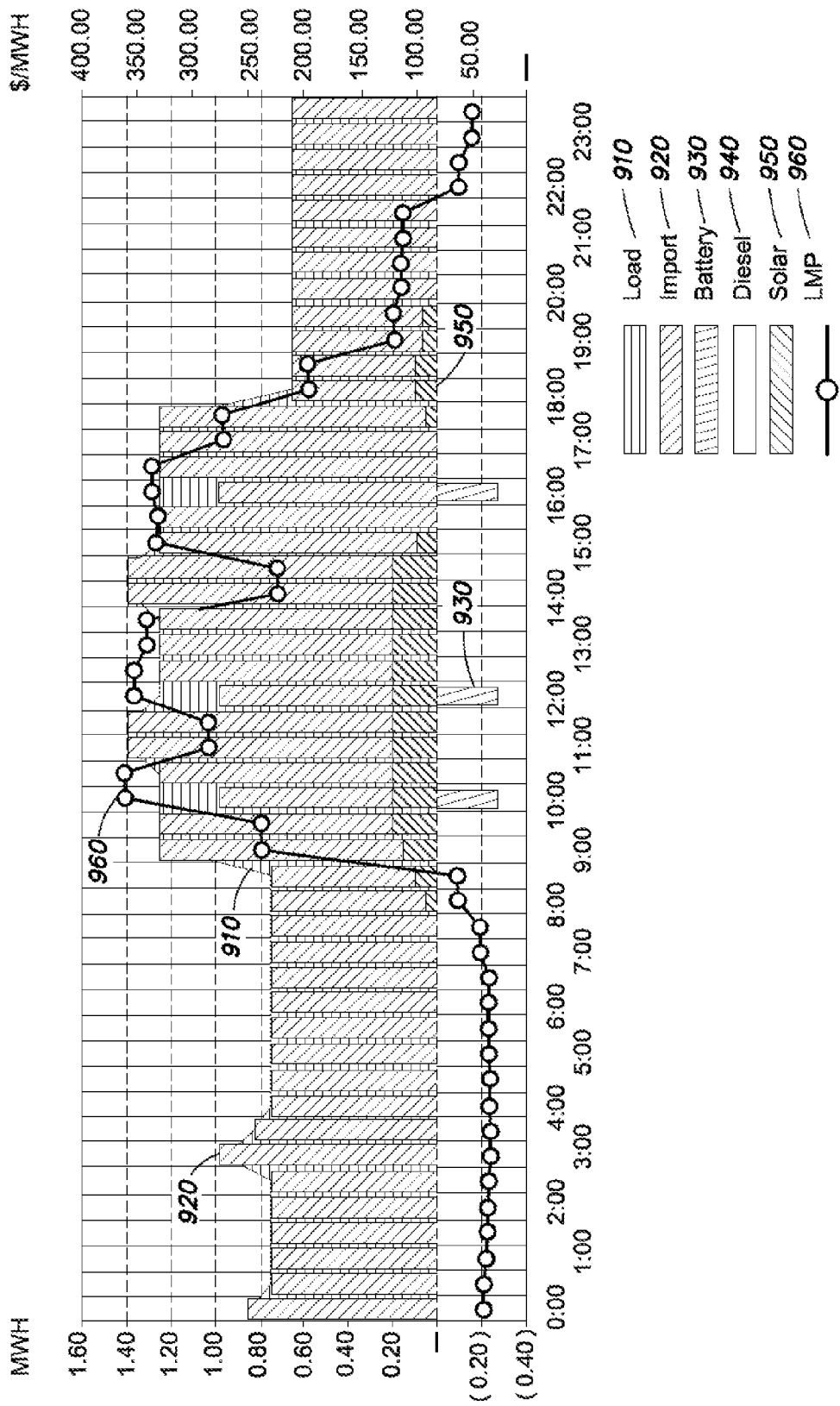
FIG. 19 shows an example energy storage asset optimization according to a principle described herein.

FIG. 19 shows an example generation schedule for battery-photovoltaic co-optimization. FIG. 19 shows an example where the same battery used in the previous example in FIG. 18 is combined with 0.5 MW of PV (solar-photovoltaic) generation. The horizontal axis shows the time in the 24-hour cycle. The left vertical axis shows megawatt hours. The right vertical axis shows price in dollars per megawatt hours. The load 910 is the electric load on the facilities. The import of power 920 shows the power imported into the facilities from the grid. The battery 930 shows the three bars below the horizontal axis for the power discharge from the batteries at specific times. The diesel 940 is not shown because diesel generation is not used in this co-optimization because of its relative price. The solar 950 shows the power used by the system and/or stored in the batteries from the solar generator or photovoltaic generator at various times. The LMP line 960 shows the fluctuating price for electricity during the 24-hour cycle.

Example Energy Storage Assets

Various examples are technology agnostic and can optimize any storage installation. However, certain forms of storage, such as compressed air and ice storage, are currently not recognized as applicable resources for some regulation markets.

Aided by significant private investment, grid-scale batteries have significantly reduced in cost over the past decade. Different technologies appear to have converged around a similar price: with batteries offered at roughly $1-2 per Watt, and $1-2 per Watt-hour, before Balance of Plant ("BoP") costs. (Watts [W, kW, MW] are a measure of power, i.e., the charge and discharge rate of an energy storage asset. Watt-hours [Wh, kWh, MWh] are a measure of energy, i.e., the storage capacity of an energy storage asset.) At these prices, energy storage asset owners and lessees can use examples to achieve a positive return over the installed life while meeting their sites' backup needs.

Below is a brief overview of each different types of energy storage assets:

Lithium-Ion Battery

This "power battery" is well-suited for regulation with high efficiency and hybrid opportunities. However, it has a high cost and little data exists to corroborate lifespan claims Quoted prices include $2 million for a 1 MW/1 MWh unit, and $1.5 million for a 1 MW/250 kWh unit.

Lithium-Ion (Li-Ion) batteries are receiving great attention because they are the preferred battery for electric vehicles. Presently, Li-Ion batteries are among the most expensive of the storage options available. This may change, as many companies are pouring resources into new Li-Ion variants; however, some suggest that the chemical characteristics of Li-Ion cells make it difficult to significantly reduce their cost. Additionally, Li-Ion is a new technology so that no company has empirically demonstrated Li-Ion's lifespan. Companies have tried to allay these concerns through "accelerated testing" that charge/discharge the battery more rapidly, but this does not provide full insight into how well Li-Ion batteries perform over time.

Li-Ion batteries are very dense and therefore very small compared to other technologies. One manufacturer's 1 MW/1 MWh unit, for example, has dimensions of 8'×20'. In comparison, a quoted lead-acid unit with similar specs has dimensions of 40'×70'.

Hybrid opportunities for Li-Ion batteries are discussed in the flow battery section.

Lead-Acid Battery

This battery is the lowest-cost option with long lifespan and proven technology. However, it is physically large with high maintenance and limited depth of discharge.

Quoted prices include $896,000 for a 1 MW/2 MWh unit, and $512,000 for a 1 MW/500 kWh unit.

Lead-Acid batteries, which have the same chemistry as a car battery, are proven for long-lasting grid applications. One manufacturer's 1 MW/1.4 MWh unit lasted for 12 years, from 1996-2008, as both a provider of voltage support and a backup power source, before the battery cells were replaced. The original power electronics of that installation still function, and the unit is running with a new set of lead-acid cells.

A downside of lead-acid batteries is that they are very heavy and very large. This is why they are not being considered as much for EVs, and this poses other logistical challenges for metropolitan installations. Lead-acid batteries are also considered to be high maintenance. They need to be kept within a narrow temperature range, and therefore require their own building (for industrial power uses), as well as periodic upkeep. Also, lead-acid batteries are typically oversized because exceeding the lower bounds of their state of charge can damage the cells. They are best for regulation or voltage support, and as backup if sized explicitly for that purpose.

Flow Batteries

These batteries can be fully charged and discharged without damage to the battery. Also, "hybridization" is possible. However, this "energy battery" limits regulation market opportunities and has low round-trip efficiency.

Quoted prices include $1.15 million for a 1 MW/1 MWh battery.

Flow batteries are energy batteries, i.e., they are best suited for backup electricity, but their chemistry limits their ability to provide high-MW regulation. The typically configured flow battery takes 4 hours to charge/discharge, and flow batteries have lower round-trip efficiencies than other types (roughly 75% in contrast to Li-Ion's 90%). With flow batteries, a tank is filled with electrolyte fluid that flows through solid cell stacks located at the top of the unit. The liquid solution never degrades, but the cells need to be replaced every 5 or 6 years. The cost of cell replacement is 10-15% of the total unit.

The electrochemical characteristics prohibit them from power-dense applications, unless they are oversized and paired with a large inverter, or "hybridized" with another battery technology. Hybridization can be provided by some suppliers in conjunction with a well-established power electronics provider. One manufacturer has created a system that allows its "energy" batteries to be paired with "power" batteries, like lithium-ion, connected through a single inverter. A leading lithium-ion battery manufacturer recently announced a plan to provide a similar Li-Ion/flow battery unit for grid-scale applications.

Dry Cell Technology

This power battery is good for the regulation market. However, it has very small recommended depth of charge/discharge and is expensive.

Quoted prices include $1.5 million for a 1.5 MW/1 MWh battery, plus 30% extra for BoP ("Balance of Plant").

These batteries provide high power-to-energy ratios that make them attractive for regulation, so long as they remain within a fairly narrow range of state of charge. These batteries are not meant to fully charge or discharge and pushing their recommended operating parameters affects their lifespan. Ideal state of charge is 20-80%. Because of these constraints, these batteries would need to be oversized to provide backup. These batteries are more expensive than cheaper options such as lead-acid.

Based on their characteristics, these batteries are likely suited for projects whose primary objective is not backup power, but rather systems support. They provide high-MW regulation, can address voltage sag concerns, and can be recharged by regenerative braking. However, when their state of charge limitations are taken into account, they appear to be a costly technology, even in comparison to lithium-ion.

Ice Units

The thermal storage capacity of an ice unit can be used according to the principles herein as an energy storage asset.

Ice units can be used to modify how a building asset is cooled, including how energy is consumed for cooling/air conditioning. An ice unit generally consists of a thermally-insulated storage tank that attaches to a building asset's air-conditioning system. The unit makes ice (generally at night when supply costs tend to be lower) and uses that ice during the day to deliver cooling directly to the building asset's existing air conditioning system. Storage tanks can be on the order of hundreds of gallons of water (e.g., about 450 gallons) of water. The water is frozen by circulating refrigerant through copper coils within or surrounding the tank. The condensing unit then turns off, and the ice is stored until its cooling energy is needed. During the higher temperature daytime hours, the power consumption of air conditioning and demand levels on the grid, increase. The ice unit may be used to replaces the energy-demanding compressor of a building asset's air conditioning unit. The melting ice of the ice unit, rather than the air conditioning unit, can be piped around the building asset to cool it.

Compressed Air

The storage capacity of compressed air can be used according to the principles herein as an energy storage asset.

For example, compressed air energy storage (CAES) technology provides a way to store compressed air, using energy generated at lower cost at one time, and use that compressed air at another time when energy costs are higher. For example, energy generated during periods of low energy demand periods (such as during off-peak electricity usage as night) may be released at on-peak times to meet higher demand. The CAES system may be located where there is large, accessible air-storage pockets or caverns, such as but not limited to mines and underground formations. The air may be compressed using electrically powered turbo-compressors. The compressed air stored in these pockets may be later fed to, e.g., gas-fired turbine generators to generate electricity during on-peak, higher-priced time periods. In another example, the compressed air is expanded using turbo expanders or air engines that are driving electrical generators to generate electricity.

In another example, the thermal storage capacity of compressed air can be used according to the principles herein as an energy storage asset.

Using a heat exchanger, it is possible to extract waste heat from the lubricant coolers used in types of compressors, and use the waste heat to produce hot water. Depending on its design, a heat exchanger can produce non-potable or potable water. When hot water is not required, the lubricant can be routed to the standard components for lubricant cooling. The hot water can be used in central heating or boiler systems, or any other application where hot water is required. Heat exchangers also offer an opportunity to produce hot air and hot water, and allow the operator some flexibility to vary the hot air to hot water ratio.

Controller for an Energy Storage Asset

The controllers for the energy storage assets described herein can be used to vary the input to or output from the energy storage assets. When the controller functions as a converter, it converts the AC signal to a DC signal. That DC signal may be used to charge the energy storage asset. When the controller functions as an inverter, it converts one type of voltage (direct current (DC)) into another type of voltage (alternating current (AC)). Since the electricity supplier generally supplies 110 or 220 volts AC on the grid, the conversion may typically be from 12 volts DC to 110 or 220 volts AC. In another example, the output of the controller may be different, depending on the type of load on the system. Inverters called utility intertie or grid tie may connect to energy generating assets such as solar panels or wind generator, and can feed their output directly into the inverter. The inverter output can be tied to the grid power.

In a non-limiting example, the inverter takes the DC output from the energy storage asset and runs it into a number of power switching transistors. These transistors are switched on and off to feed opposite sides of a transformer, causing the transformer to think it is getting an AC signal. Depending on the quality and complexity of the inverter, it may put out a square wave, a "quasi-sine" (sometimes called modified sine) wave, or a true sine wave. The quality of the quasi-sine wave can vary among different inverters, and also may vary somewhat with the load.

The virtual partitioning of the energy storage asset described facilitates partitioning between energy and regulation participation. The partitioning can be based on the available capacity of the controller (i.e., the inverter/converter). The SOC of the energy storage asset may be used to provide a constraint within the optimization for determining the optimal charge/discharge strategy for participation in these two different markets. As a non-limiting example, an operating schedule generated according to the principles herein can indicate the optimal charge/discharge strategy for the controller, including on an hourly basis, in response to or anticipation of projected LMPs. The balance of the inverter capacity of the controller may be made available to the regulation market at its shorter timescales (e.g., at the 2-second or minute-by-minute time intervals described above). The proportion of the controller output (and hence the energy storage asset) committed to the energy market and the remaining proportion of the energy storage asset committed to the regulation market are co-optimized based on the economic benefit derived from the two markets, and subject to the SOC constraints. The operating schedules generated based on any of the principles described herein, and in any of the example, can suggest the proportion of the controller output committed to the energy market and to the regulation market in a given time interval t (less than time period T), and for what length of time. the proportion of the controller output committed to the energy market and to the regulation market in a given time interval t (less than time period T). For example, for a controller with a 1 MWatt inverter capacity, the principles herein can be used to generate an operating schedule that suggests the proportion of the controller's 1 MWatt inverter capacity that can be committed to the energy market and to the regulation market in a given time interval t to generate the energy-related revenue.

Energy Generating Assets

Examples of energy generating asset applicable to the apparatus and methods herein include photovoltaic cells, fuel cells, gas turbines, diesel generators, flywheels, electric vehicles and wind turbines.

Electric storage has the potential to address some of the attributes of renewable energy generation. The intermittent nature of energy generating assets, including solar generation, may present some difficulty for grid operators. For example, weather events can make energy output of energy generating assets, including photovoltaic cells or wind turbines, difficult to predict. As renewable generators make up a growing share of regional generation portfolios, grid operators may require greater real-time visibility of distributed generation and benefit from a resource's ability to control bi-directional power flow. Adding storage to distributed generation achieves new levels of responsiveness not seen with existing systems.

According to principles described herein, the operating schedule generated for a system that includes a controller, an energy storage asset and an energy generating asset can firm up intermittent renewable generation into dispatchable generation. The operating schedule can provide for renewable generation forecasting based on the forecasted weather conditions.

Dynamic virtualization can be beneficial to sites that utilize both energy storage assets and energy generating assets. For example, by integrating weather data, price forecasts, and expected site load, examples can accurately predict a solar array's output, determine how much solar generation should be captured by an energy storage asset, and dispatch the energy storage asset at the time of day that optimizes revenues derived from wholesale market participation.

By passing energy through an energy storage asset and exhibiting real-time control, power can be delivered strategically and act as a price-responsive resource in the various wholesale markets. In effect, storage allows the maturation of energy generating assets as a resource that provides discrete power-flow to the grid that is controllable, quantifiable, and dispatchable. Solar power and its generation can be costly. Through dynamic virtualization the value of renewable generation can be increased by improving the resource with electric storage.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that inventive embodiments may be practiced otherwise than as specifically described. Inventive embodiments disclosed herein are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments of the disclosure can be implemented in any of numerous ways. For example, some embodiments may be implemented via one or more controllers, which may employ hardware, software or a combination thereof. In some embodiments discussed herein, one or more controllers may be implemented, at least in part, as a state machine.

When any aspect of an embodiment is implemented at least in part in software, the software code can be executed on any suitable processor or collection of processors, whether provided in a single device or computer or distributed among multiple devices/computers.

In this respect, various aspects of the disclosure, may be embodied at least in part as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium or non-transitory medium) encoded with one or more programs that, when executed on one or more computers or other processors, perform methods that implement the various embodiments of the technology discussed above. The computer readable medium or media can be transportable, such that the program or programs stored thereon can be loaded onto one or more different computers or other processors to implement various aspects of the present technology as discussed above.

The terms "program" or "software" are used herein in a generic sense to refer to any type of computer code or set of computer-executable instructions that can be employed to program a computer or other processor to implement various aspects of the present technology as discussed above. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification, unless clearly indicated to the contrary, should be understood to mean "at least one."

The phrase "and/or," as used herein in the specification, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in claims, shall have its ordinary meaning as used in the field of patent law.

As used herein in the specification and claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the specification and claims, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus for determining an operating schedule for at least one energy asset operated by an energy customer of an electricity supplier, so as to generate energy-related revenue, over a time period T, associated with operation of the at least one energy asset according to the operating schedule, wherein the energy-related revenue available to the energy customer over the time period T is based at least in part on a wholesale electricity market, the apparatus comprising:
   at least one communication interface;
   at least one memory to store processor-executable instructions and an objective function for the at least one energy asset, wherein the at least one energy asset comprises at least one energy consuming asset, wherein the objective function facilitates a determination of the operating schedule for the at least one energy asset based at least in part on an operation characteristic of the at least one energy asset and a forecast wholesale electricity price associated with the wholesale electricity market; and
   at least one processing unit, communicatively coupled to the at least one communication interface and the at least one memory, wherein upon execution of the processor-executable instructions, the at least one processing unit:
   A) determines the operating schedule for the at least one energy asset using the objective function and a customer baseline (CBL) energy profile for at least one energy consuming asset of the energy assets, over the time period T;
      wherein the CBL energy profile is computed based on applying a business-as-usual (BAU) operating schedule for the at least one energy consuming asset to a mathematical model of the operation of the at least one energy consuming asset; and
   B) controls the at least one communication interface to transmit to the energy customer the operating schedule for at least one energy asset determined in A), and/or controls the at least one memory so as to store the determined operating schedule.

2. The apparatus of claim 1, wherein the mathematical model comprises at least one differential equation modeling at least one of a material composition of the at least one energy consuming asset, a thermal property of the at least one energy consuming asset, an occupancy of the at least one energy consuming asset, and an ambient temperature of the at least one energy consuming asset.

3. The apparatus of claim 1, wherein the mathematical model models at least one of a thermal property, a mechanical property, and an electrical property of the at least one energy asset based on the BAU operating schedule.

4. The apparatus of claim 1, wherein the mathematical model comprises at least one differential equation modeling the physical operation of the at least one energy consuming asset.

5. The apparatus of claim 1, wherein the at least one energy asset is at least one building.

6. The apparatus of claim 1, wherein the operation characteristic of the at least one energy asset is a load use schedule.

7. The apparatus of claim 6, wherein the load use schedule imposes a maximum allowable load drawn by the at least one energy consuming asset over a time interval that is less than time period T.

8. The apparatus of claim 7, wherein the load use schedule impose a different value of maximum allowable load at different intervals during time period T.

9. The apparatus of claim 6, wherein the operation characteristic of the at least one energy consuming asset is an energy consumption profile as a function of time of the at least one energy consuming asset.

10. The apparatus of claim 6, wherein the at least one energy consuming asset is a controllable energy consuming asset, and wherein the operation characteristic of the at least one controllable energy consuming asset is a set point.

11. The apparatus of claim 1, wherein, upon execution of the processor-executable instructions, the at least one processing unit determines the operating schedule for the at least one energy asset using the objective function in A) by minimizing a net energy-related cost over the time period T,
   wherein the net-energy related cost is based at least in part on:
      an electricity consumption by the at least one energy consuming asset; and
      the CBL energy profile; and
   wherein the energy-related revenue available to the energy customer is based at least in part on the minimized net energy-related cost.

12. The apparatus of claim 11, wherein the net energy-related cost is specified as a difference between an electricity supply cost and a demand response revenue over the time period T.

13. The apparatus of claim 1, wherein the at least one processing unit determines the operating schedule for the at least one energy asset determined in (A) as at least one bias signal, and controls the at least one communication interface in (B) to transmit to the energy customer the at least one bias signal.

14. The apparatus of claim 1, wherein the at least one processing unit controls the at least one communication interface in (B) to transmit to the energy customer the at least one bias signal at regular time intervals during the time period T.

15. An apparatus for determining an operating schedule for at least one energy asset operated by an energy customer of an electricity supplier, so as to generate energy-related revenue, over a time period T, associated with operation of the at least one energy asset according to the operating schedule, wherein the energy-related revenue available to the energy customer over the time period T is based at least in part on a wholesale electricity market, the apparatus comprising:
   at least one communication interface;
   at least one memory to store processor-executable instructions and an objective function for the at least one energy asset, wherein the at least one energy asset comprises at least one energy consuming asset, wherein the objective function facilitates a determination of the operating schedule for the at least one energy asset based at least in part on an operation characteristic of the at least one energy asset and a forecast wholesale electricity price associated with the wholesale electricity market; and
   at least one processing unit, communicatively coupled to the at least one communication interface and the at least one memory, wherein upon execution of the processor-executable instructions, the at least one processing unit:
   A) determines the operating schedule for the at least one energy asset using the objective function and a customer baseline (CBL) energy profile for at least one energy consuming asset of the energy assets, over the time period T;
  wherein the CBL energy profile is computed based on applying a business-as-usual (BAU) operating schedule for the at least one energy consuming asset to a mathematical model of the operation of the at least one energy consuming asset, and
  wherein the CBL energy profile is an energy consumption profile as a function of time for the at least one energy consuming asset; and
  B) controls the at least one communication interface to transmit to the energy customer the operating schedule for at least one energy asset determined in A), and/or controls the at least one memory so as to store the determined operating schedule.

16. The apparatus of claim 15, wherein, upon execution of the processor-executable instructions, the at least one processing unit determines the operating schedule for the at least one energy asset using the objective function in A) by minimizing a net energy-related cost over the time period T,
  wherein the net-energy related cost is based at least in part on:
    an electricity consumption by the at least one energy consuming asset; and
    the CBL energy profile; and
  wherein the energy-related revenue available to the energy customer is based at least in part on the minimized net energy-related cost.

17. The apparatus of claim 16, wherein the net energy-related cost is specified as a difference between an electricity supply cost and a demand response revenue over the time period T.

18. The apparatus of claim 17, wherein the economic demand response revenue over the time period T is determined based on the forecast wholesale electricity price, an electricity consumption by the at least one energy consuming asset, and the CBL energy profile for the at least one energy consuming asset.

19. The apparatus of claim 18, wherein:
  the at least one energy consuming asset includes at least one controllable energy consuming asset; and
  in A), the at least one processing unit determines both the operating schedule for the at least one energy based at least in part on minimizing the net energy-related cost, over the time period T, associated with the electricity consumption by the at least one controllable energy consuming asset.

20. The apparatus of claim 17, wherein the economic demand response revenue over the time period T is determined based on the forecast wholesale electricity price and a difference between the electricity consumption by the at least one controllable energy consuming asset and the CBL energy profile for the at least one controllable energy consuming asset.

* * * * *